(12) United States Patent
Hara et al.

(10) Patent No.: US 7,835,049 B2
(45) Date of Patent: Nov. 16, 2010

(54) REPRODUCING APPARATUS AND REPRODUCING METHOD

(75) Inventors: Masaaki Hara, Tokyo (JP); Mikio Sugiki, Kanagawa (JP); Kazutatsu Tokuyama, Tokyo (JP); Mitsuru Toishi, Kanagawa (JP); Kenji Tanaka, Tokyo (JP); Kazuyuki Hirooka, Gunma (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 11/947,637

(22) Filed: Nov. 29, 2007

(65) Prior Publication Data

US 2008/0144147 A1 Jun. 19, 2008

(30) Foreign Application Priority Data

Dec. 14, 2006 (JP) ............................. 2006-337511

(51) Int. Cl.
  *G03H 1/20* (2006.01)
(52) U.S. Cl. ........................................ 359/12; 382/100
(58) Field of Classification Search ................ 359/1–35
  See application file for complete search history.

(56) References Cited

U.S. PATENT DOCUMENTS 5,625,471 A * 4/1997 Smith ........................... 359/30
5,949,055 A * 9/1999 Fleet et al. ................... 235/469
6,344,909 B1 * 2/2002 Grossetie et al. ............... 359/9
7,012,749 B1 * 3/2006 Mendlovic et al. ........... 359/560
2009/0262406 A1 * 10/2009 Hara ........................... 359/11
2009/0316240 A1 * 12/2009 Hara ........................... 359/33
2010/0142016 A1 * 6/2010 Cable et al. .................... 359/9

FOREIGN PATENT DOCUMENTS

JP    2006107663    4/2006
JP    2006154012    6/2006

* cited by examiner

*Primary Examiner*—Stephone B Allen
*Assistant Examiner*—Jennifer L. Doak
(74) *Attorney, Agent, or Firm*—K&L Gates LLP

(57) ABSTRACT

In a reproducing apparatus adapted to reproduce data recorded on a holographic recording medium, a reference light generator generates reference light for illuminating the holographic recording medium, and a coherent light generator generates coherent light having an intensity greater than the absolute value of a minimum amplitude of a reproduced image and having a phase equal to the phase of the reproduced image. An image signal acquisition unit senses the reproduced image produced by illuminating the holographic recording medium with the reference light and the coherent light, and acquires an image signal based on the reproduced image. A square root calculation unit calculates the square root of each of values constituting the image signal. A removal unit removes the component of the coherent light from the calculated square root, whereby the data recorded on the holographic recording medium is correctly reproduced.

9 Claims, 30 Drawing Sheets

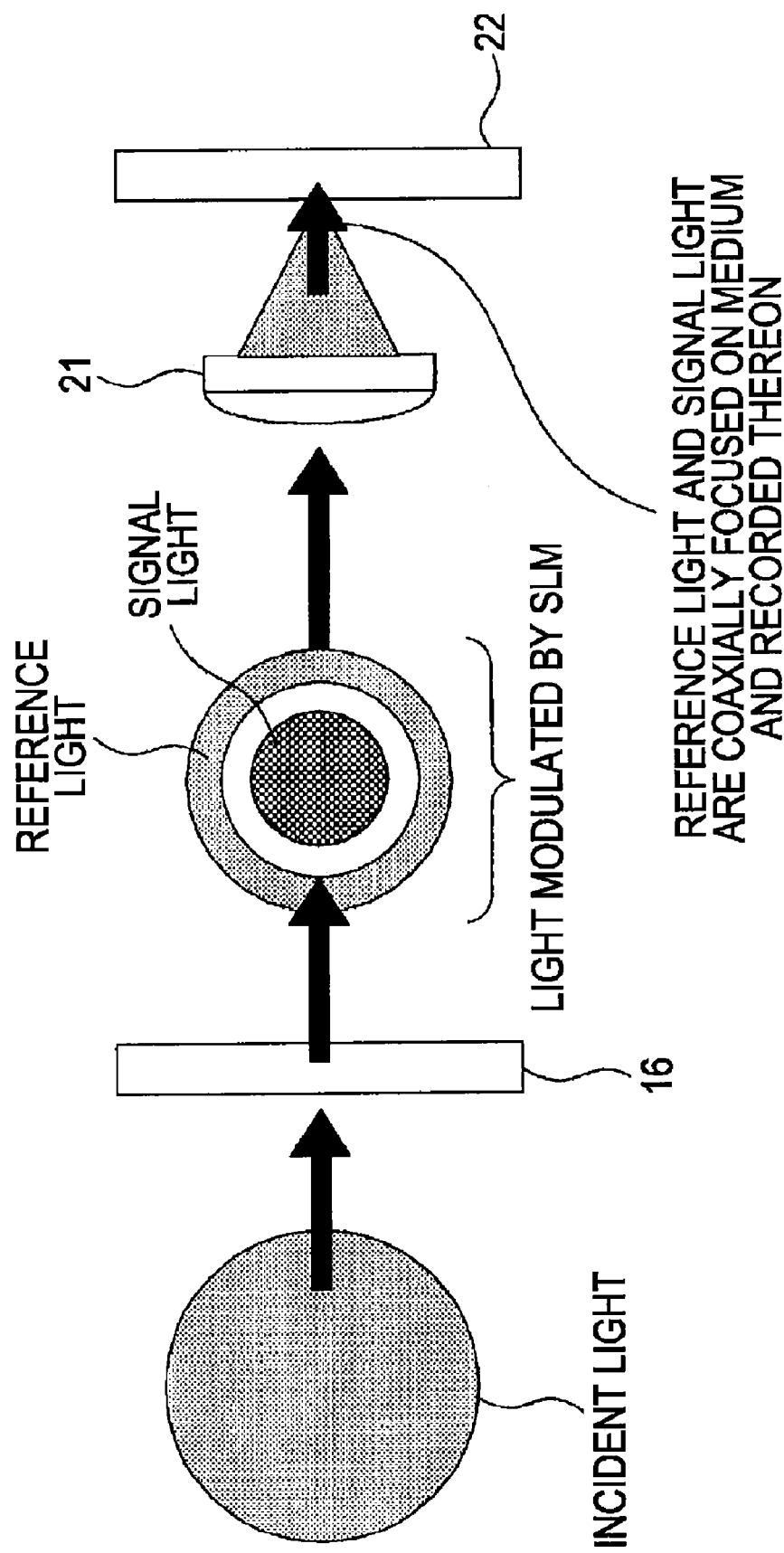

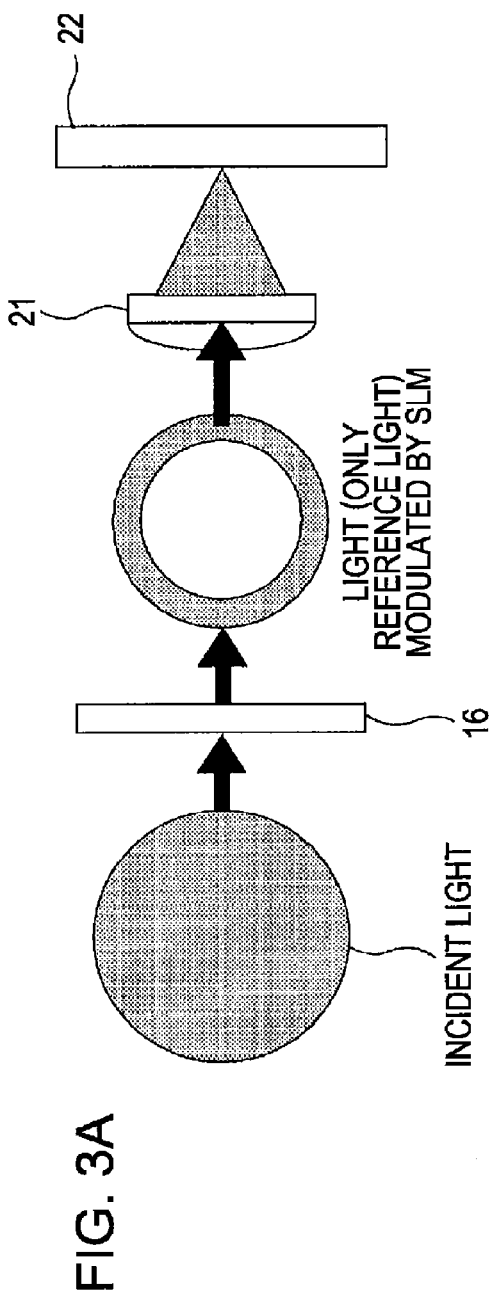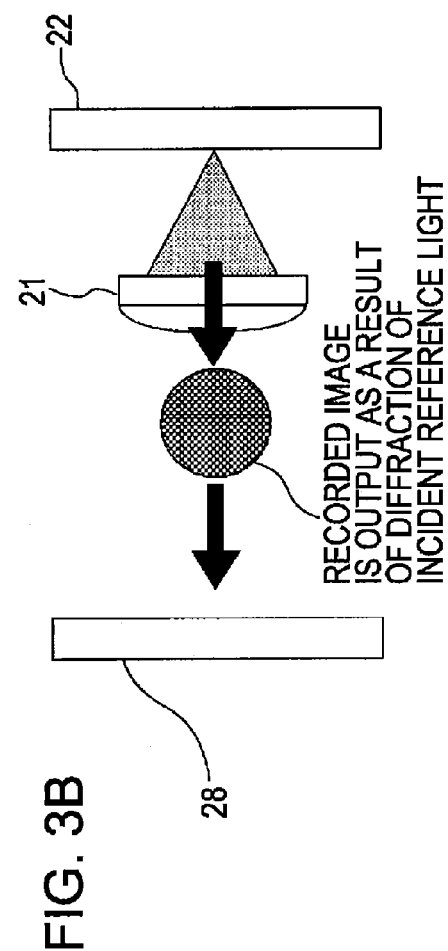
FIG. 3A
FIG. 3B

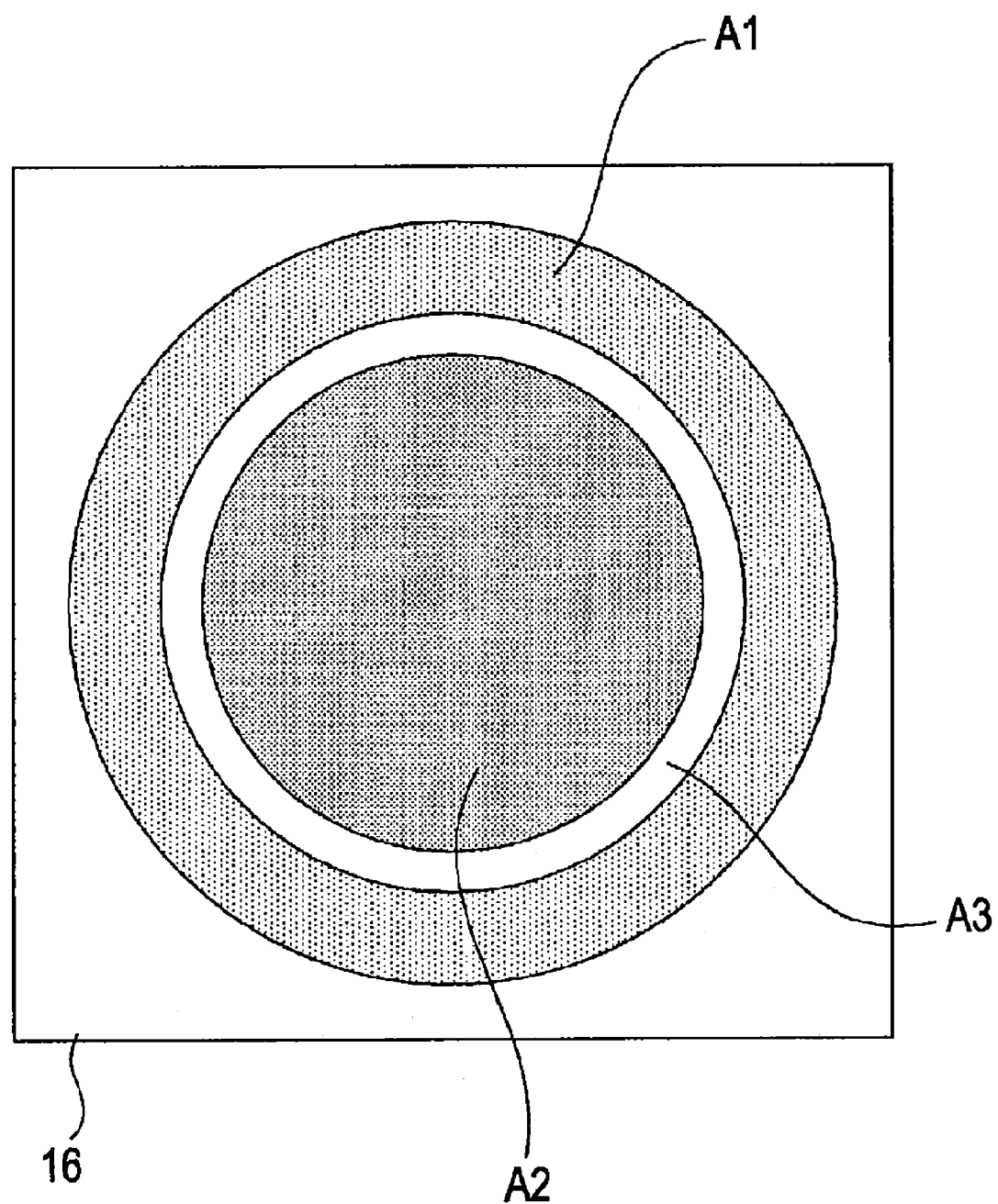

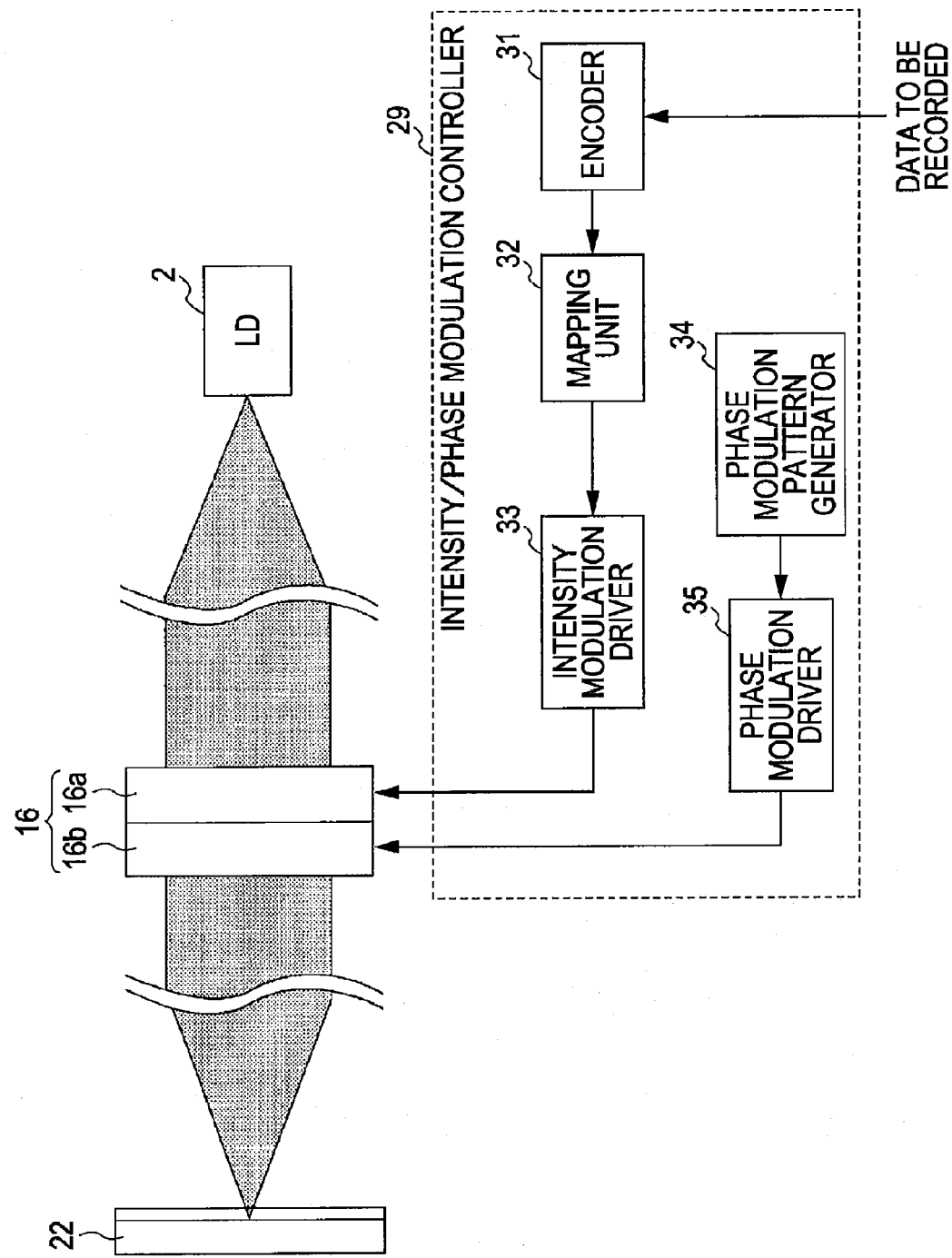

VOLTAGE: OFF
(PHASE: d × nh)

VOLTAGE: ON
(PHASE: d × nv)

WHITE: 1
BLACK: 0

WHITE: +1
GRAY: 0
BLACK: −1

WHITE: 1
BLACK: 0

WHITE: +1
GRAY: 0
BLACK: −1

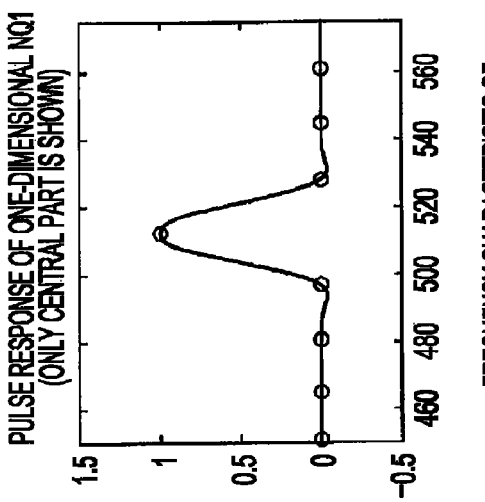
FIG. 10A
r=0.0
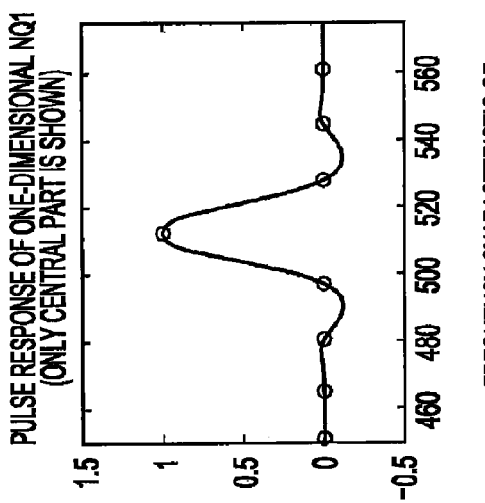
FIG. 10B
r=0.5
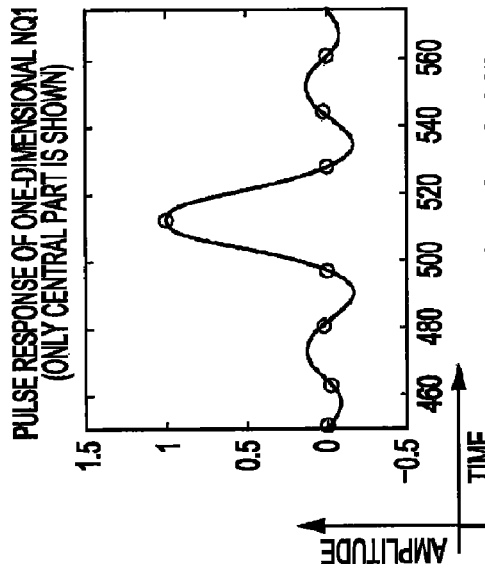
FIG. 10C
r=1.0
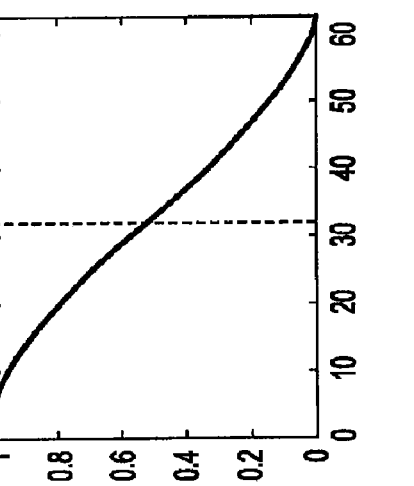
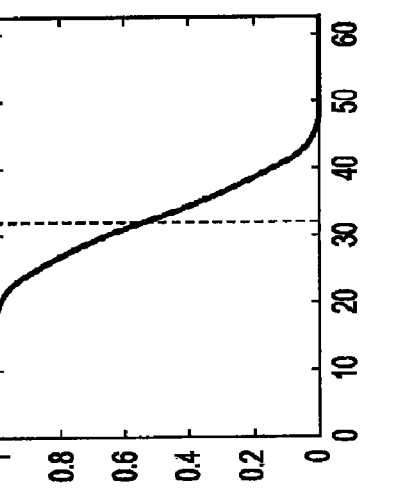
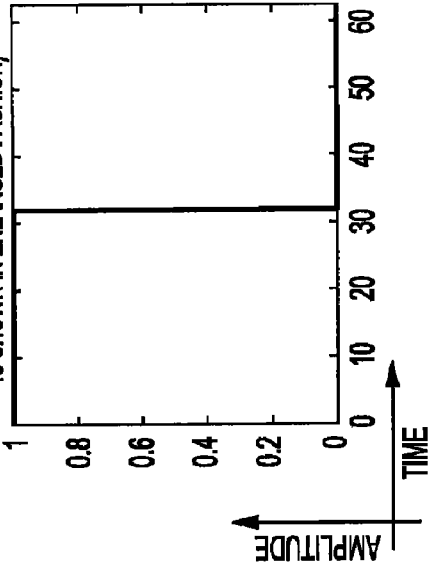

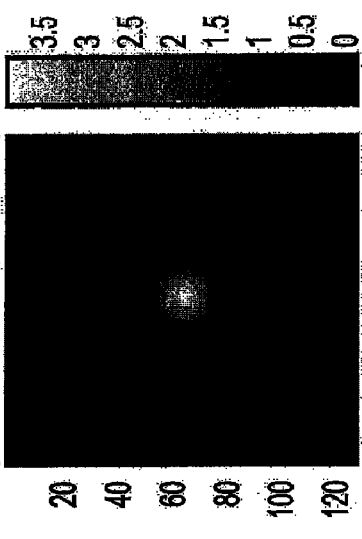
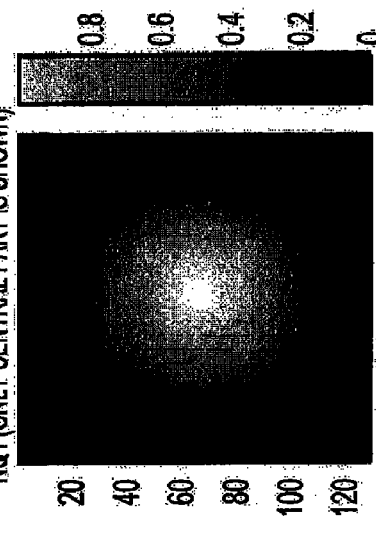
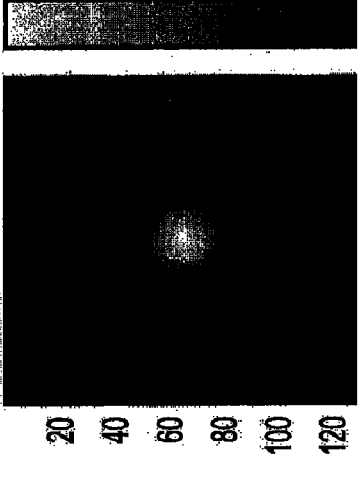
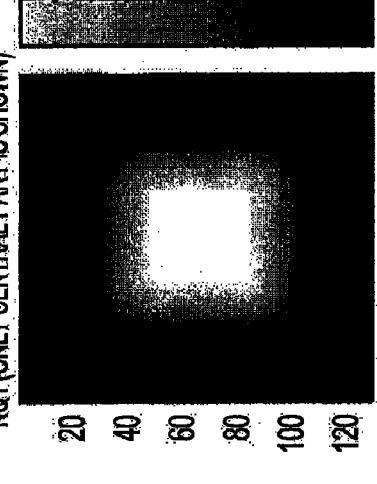
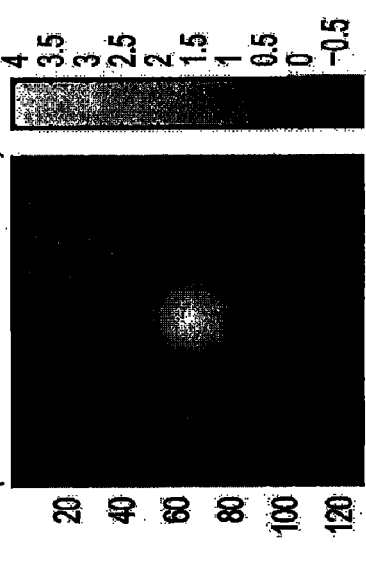
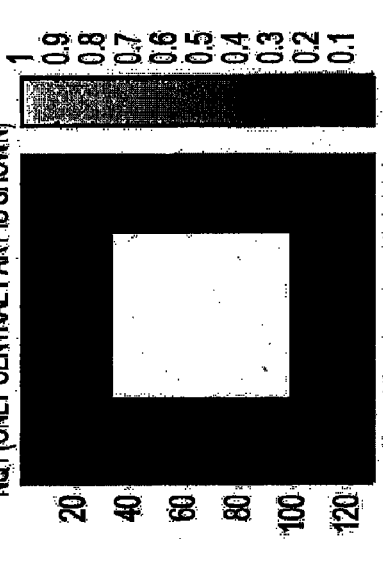
FIG. 12A  r=0.0
FIG. 12B  r=0.5
FIG. 12C  r=1.0

WHITE: 1
BLACK: 0

WHITE: +1
GRAY: 0
BLACK: −1

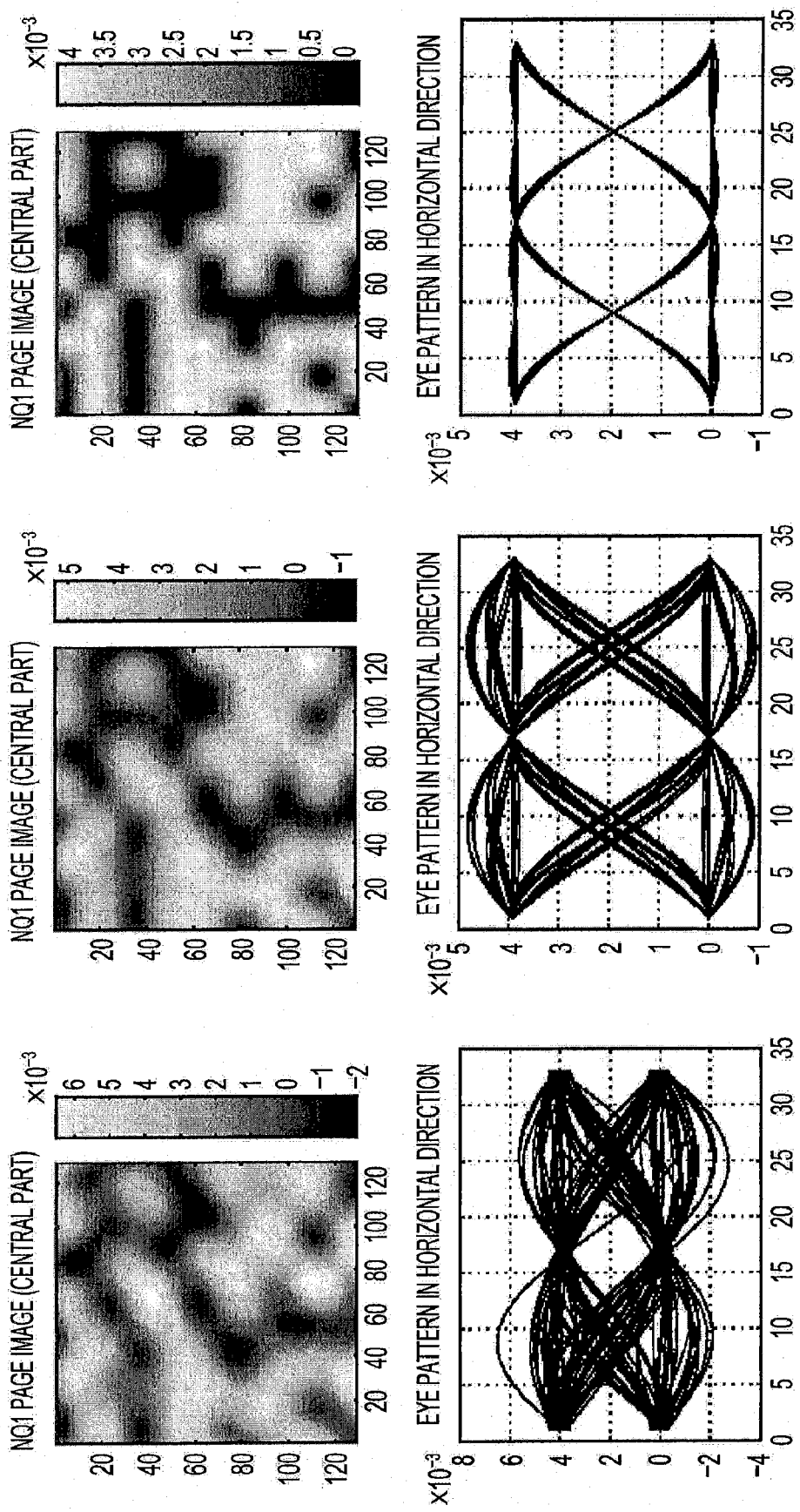

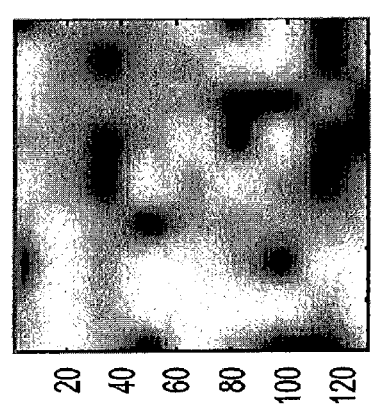
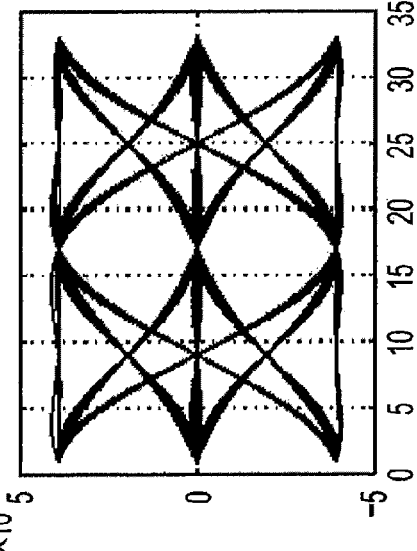
FIG. 18A
r=0.0
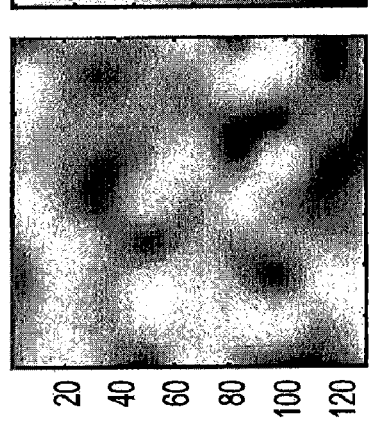
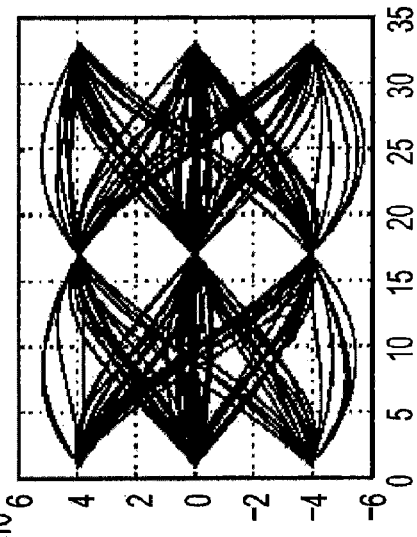
FIG. 18B
r=0.5
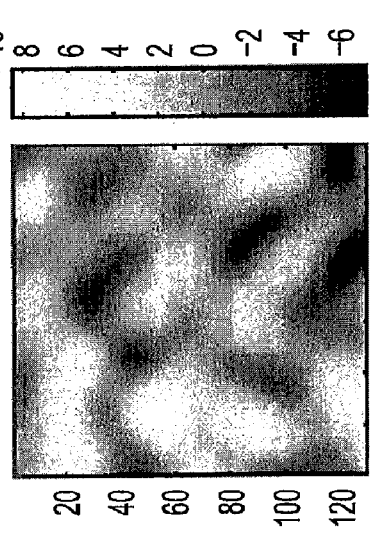
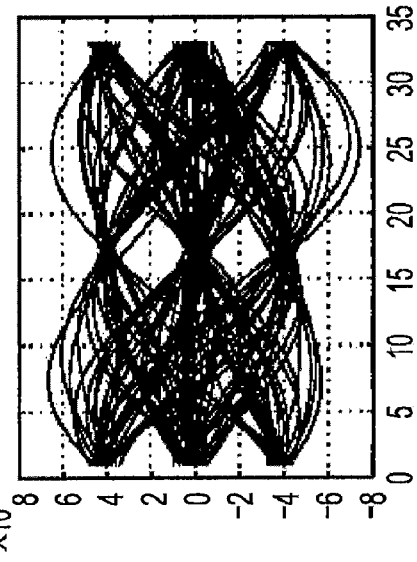
FIG. 18C
r=1.0

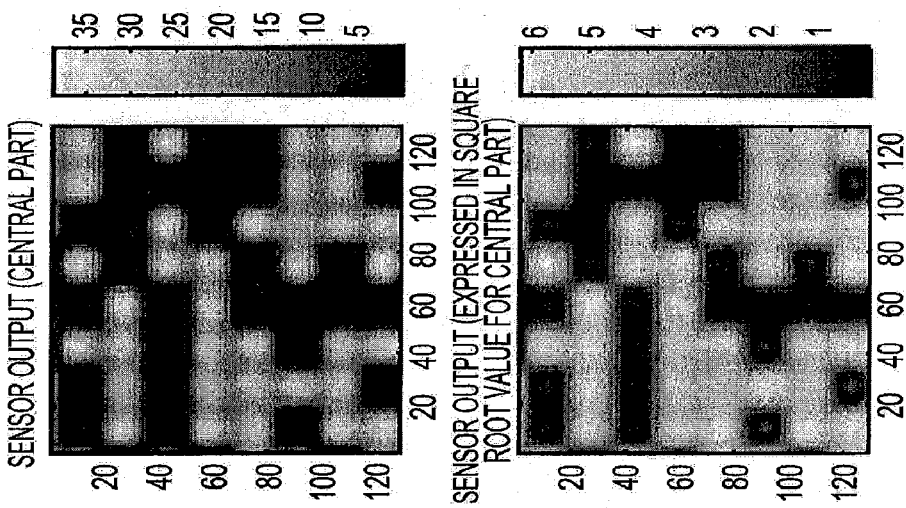
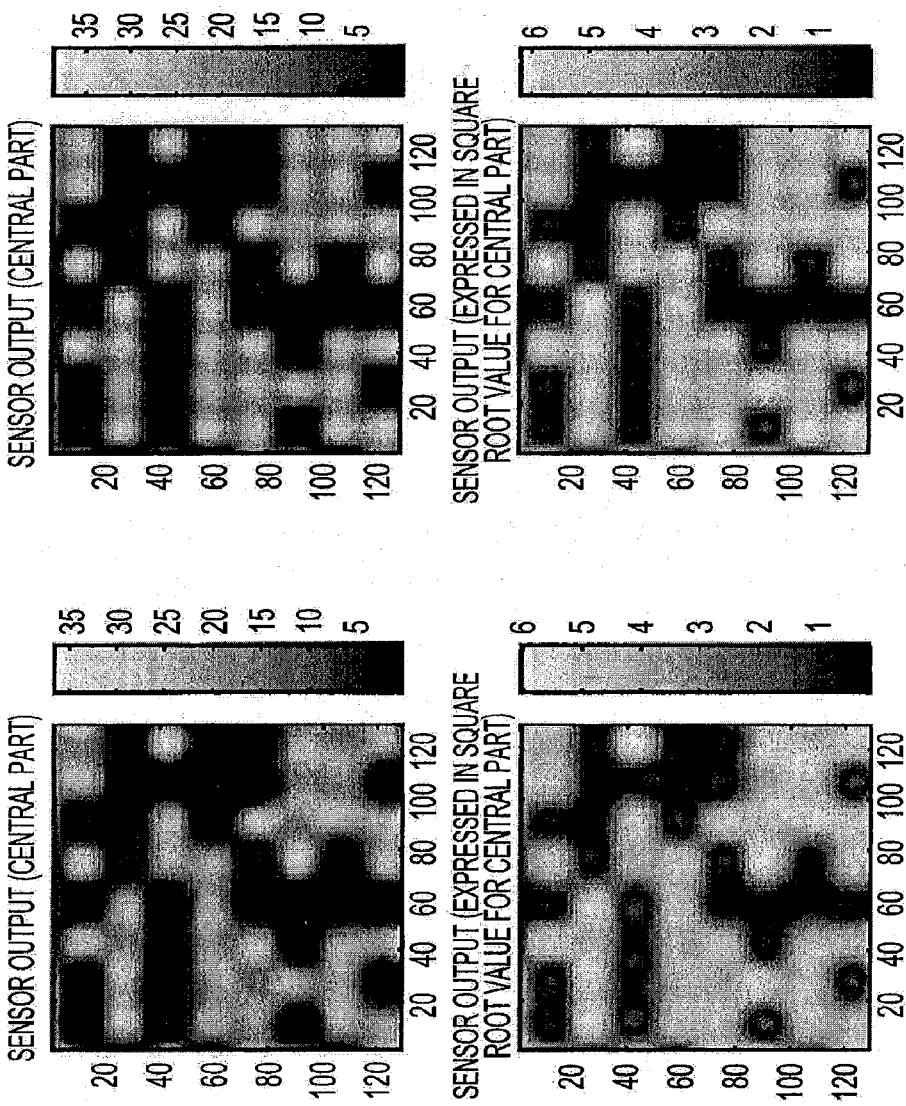
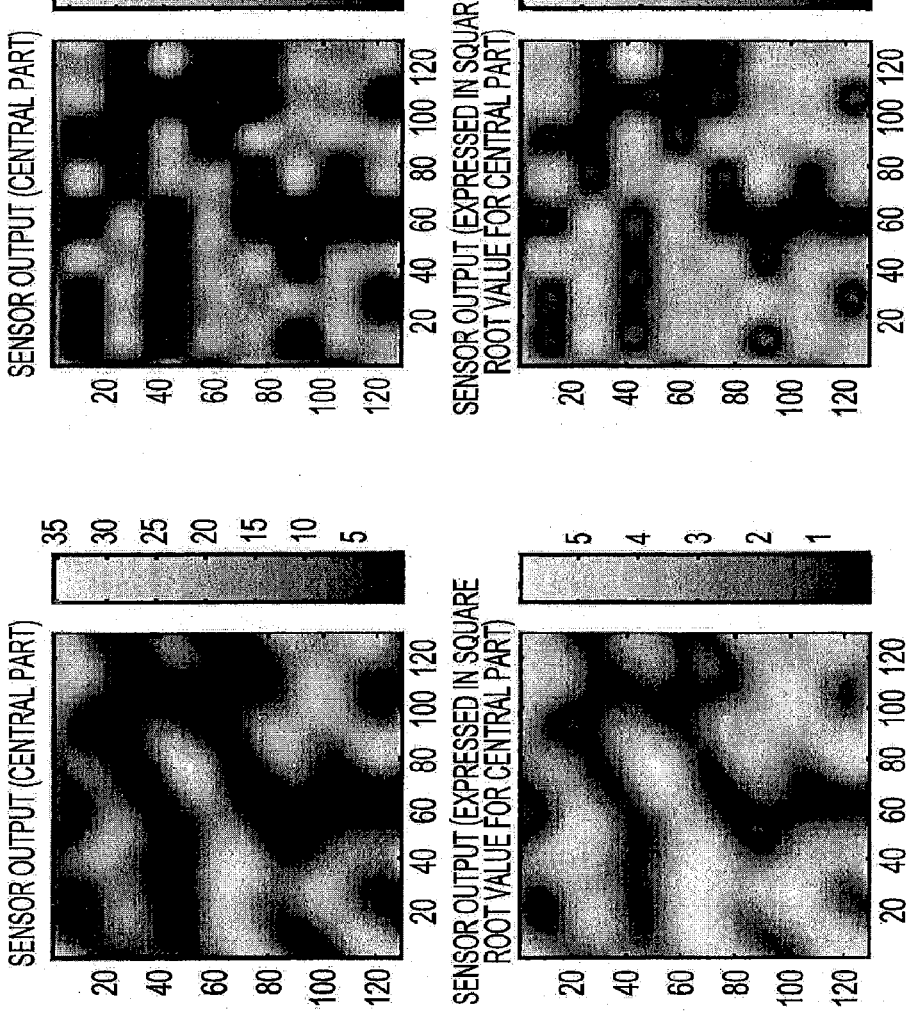
FIG. 19A APERTURE=1.0
FIG. 19B APERTURE=1.5
FIG. 19C APERTURE=2.0

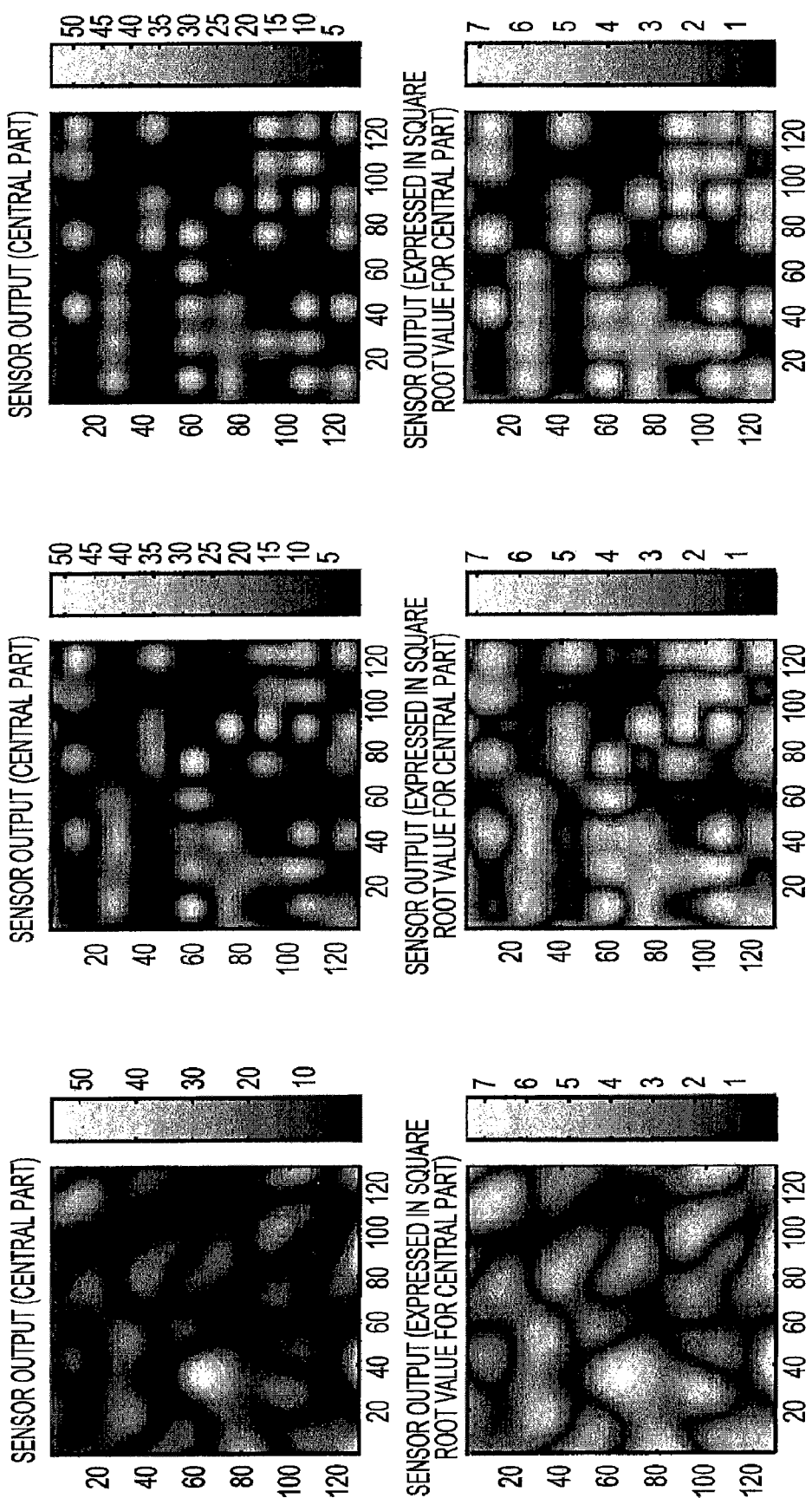

FIG. 21C
APERTURE=2.0
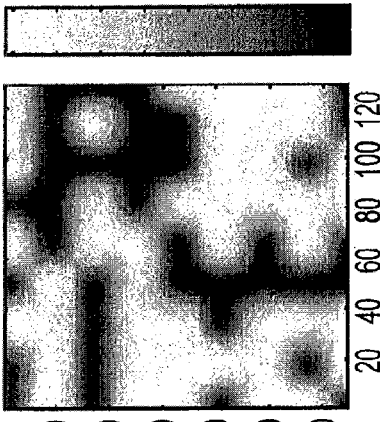
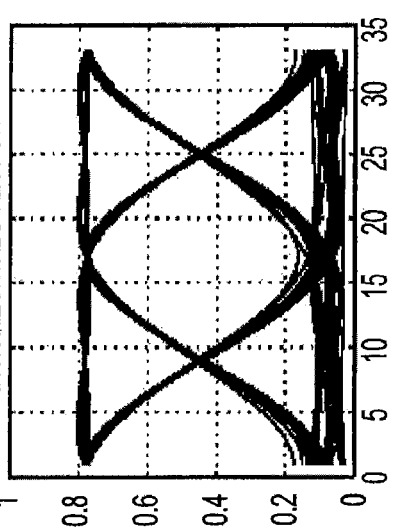
FIG. 21B
APERTURE=1.5
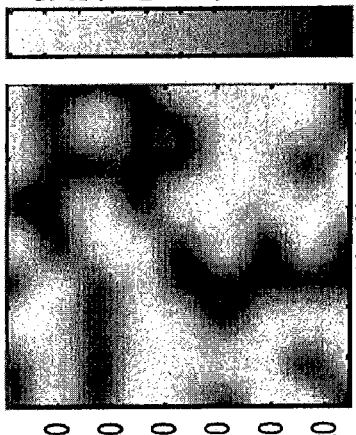
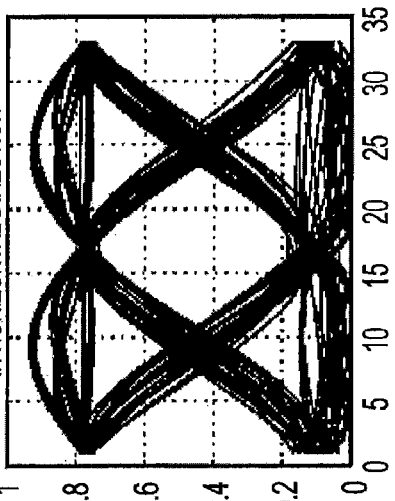
FIG. 21A
APERTURE=1.0
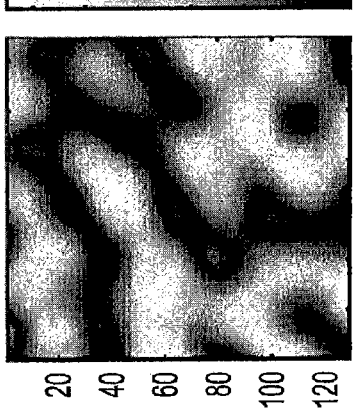
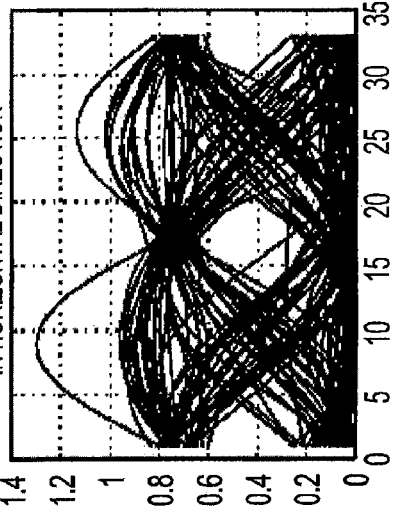

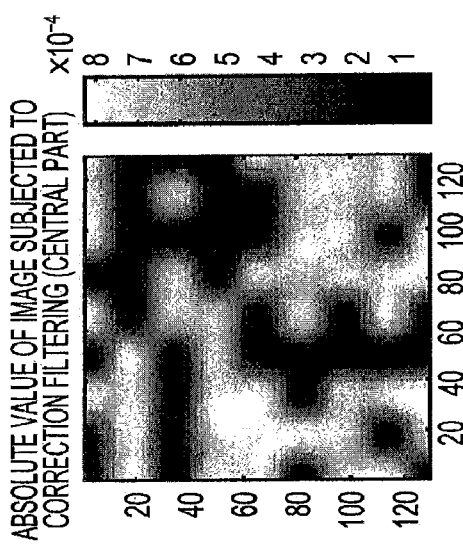
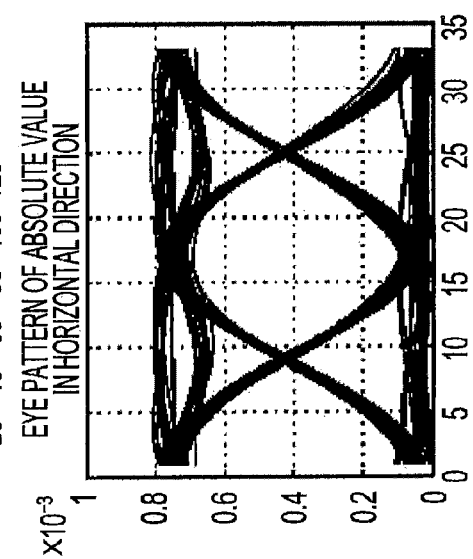
FIG. 22A
APERTURE=1.0
FIG. 22B
APERTURE=1.5
FIG. 22C
APERTURE=2.0
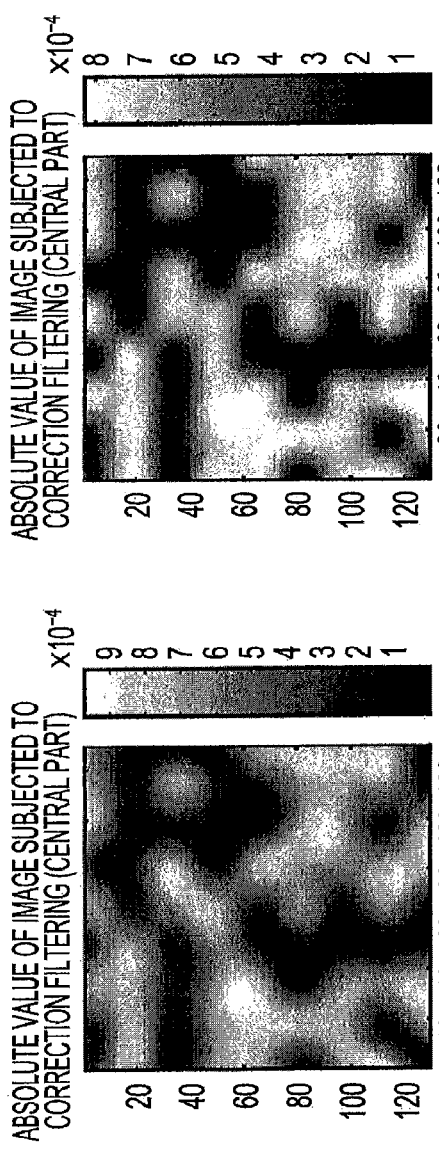
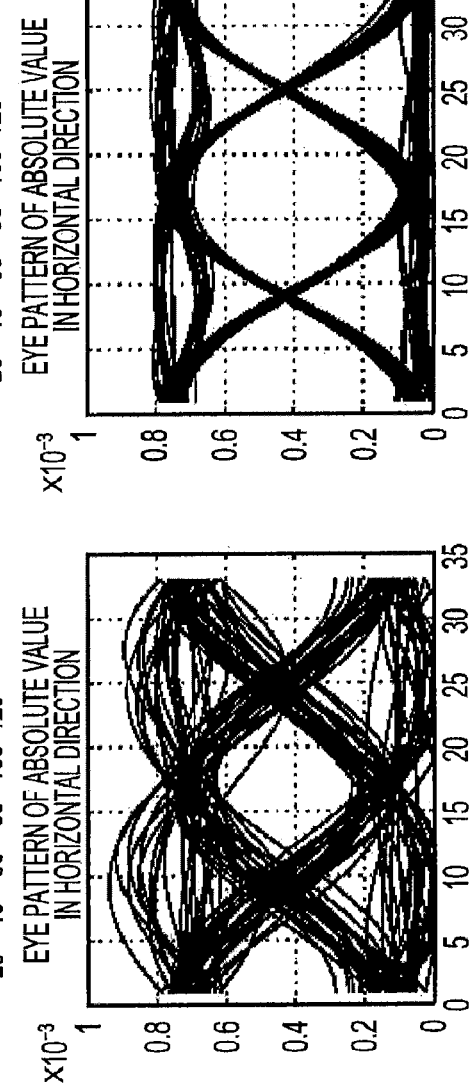
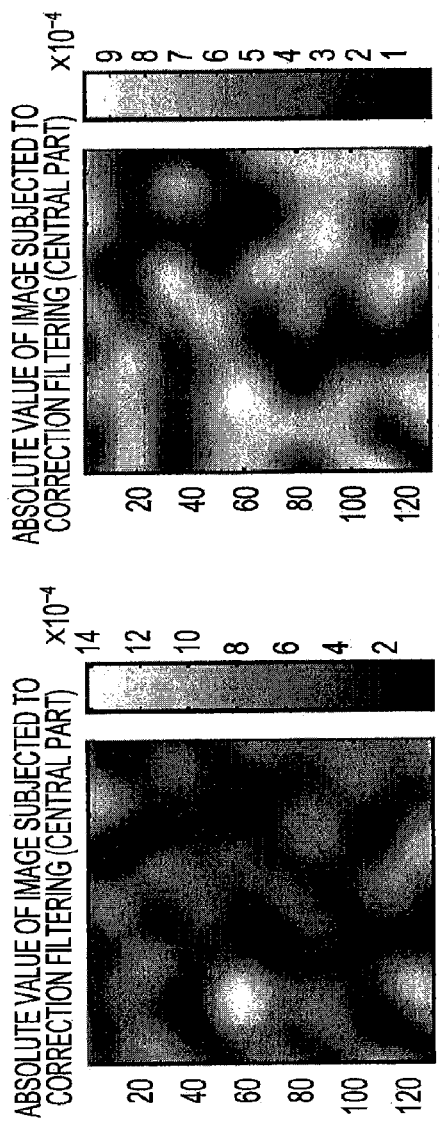
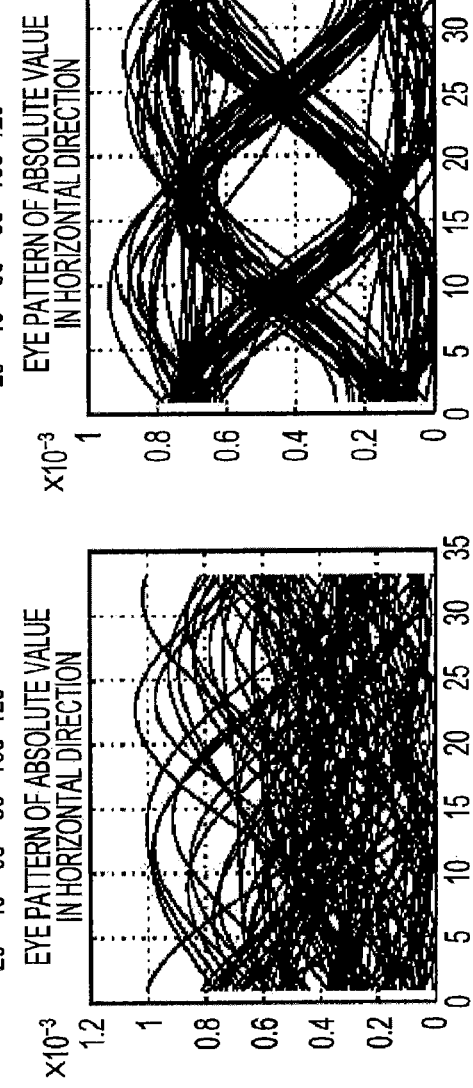

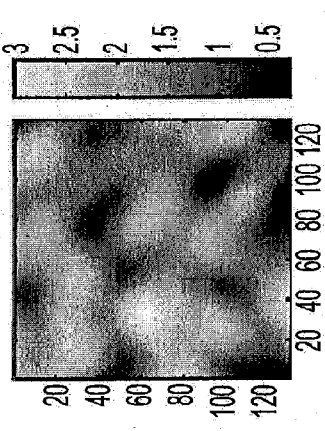
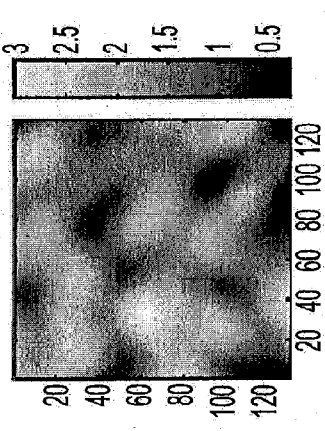
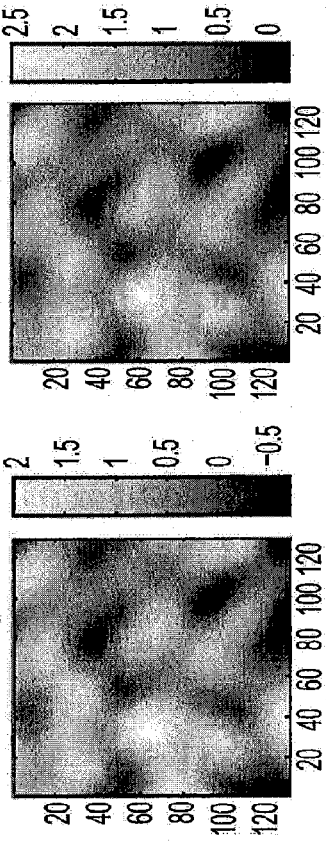
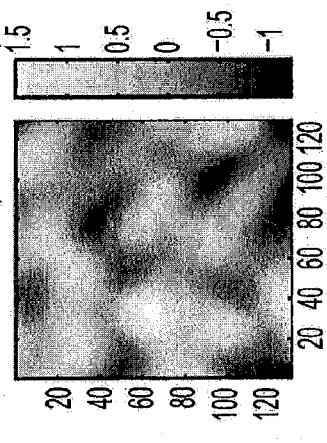
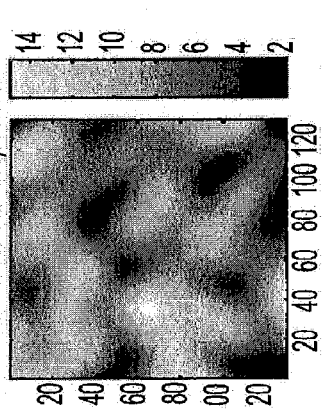
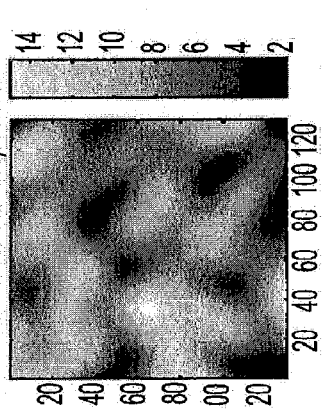
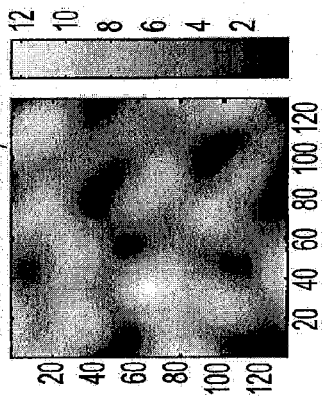
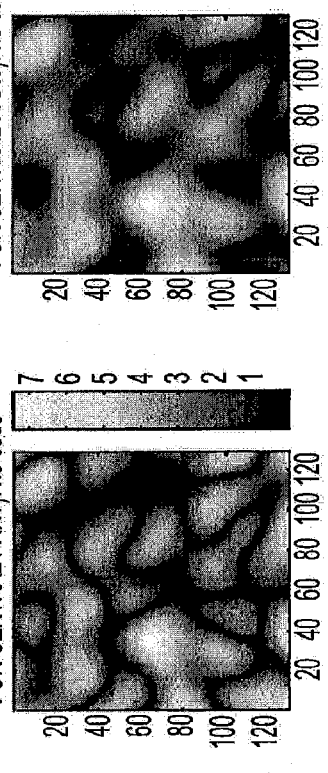
FIG. 23A ADDITION AMOUNT=0.0
FIG. 23B ADDITION AMOUNT=0.5
FIG. 23C ADDITION AMOUNT=1.0
FIG. 23D ADDITION AMOUNT=1.5

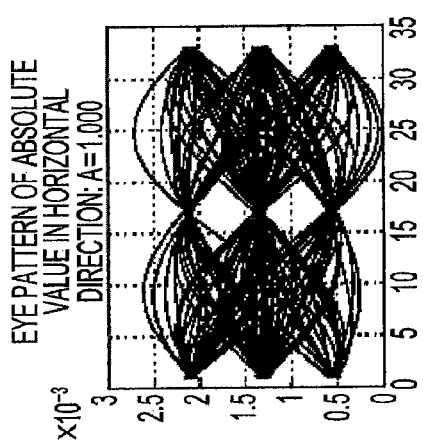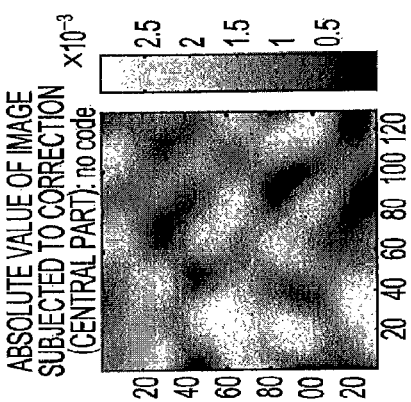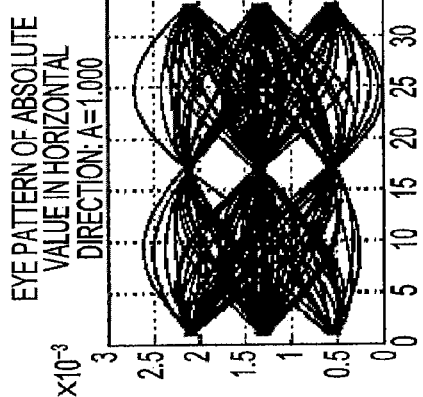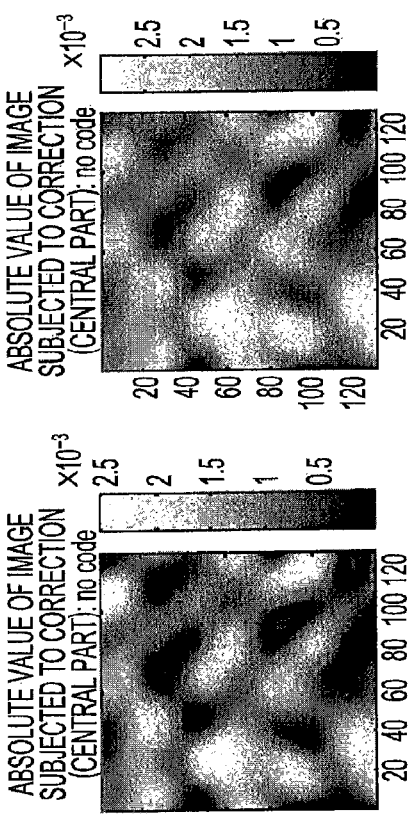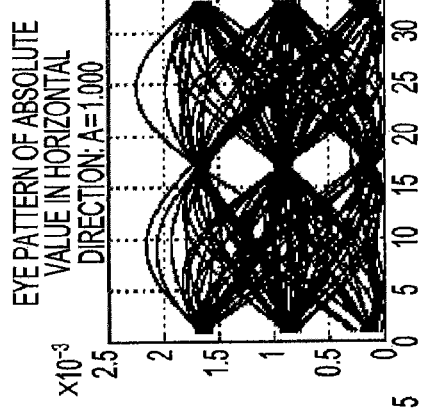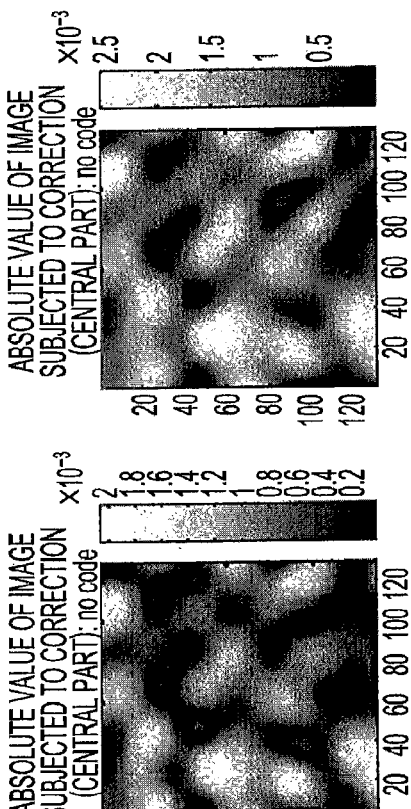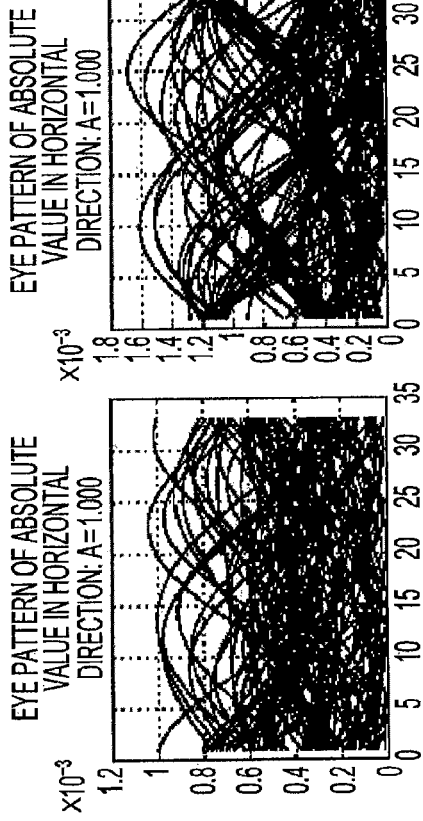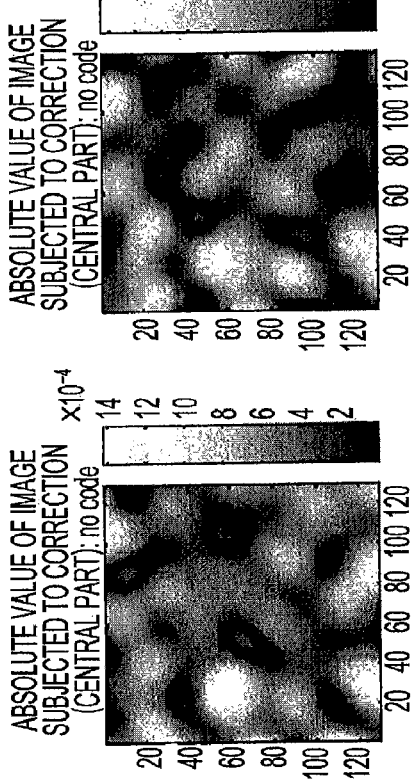
FIG. 24A ADDITION AMOUNT=0.0
FIG. 24B ADDITION AMOUNT=0.5
FIG. 24C ADDITION AMOUNT=1.0
FIG. 24D ADDITION AMOUNT=1.5

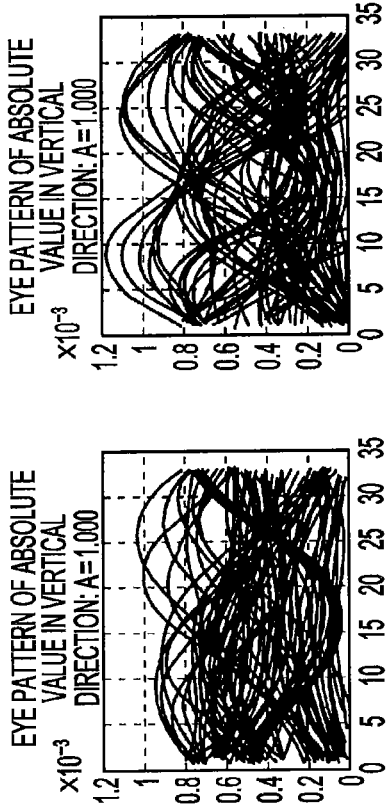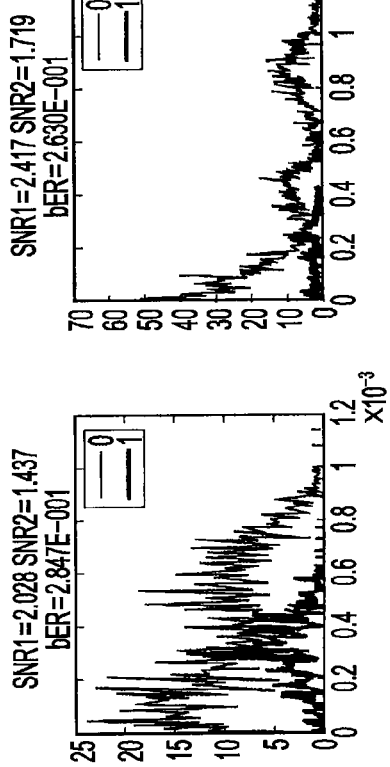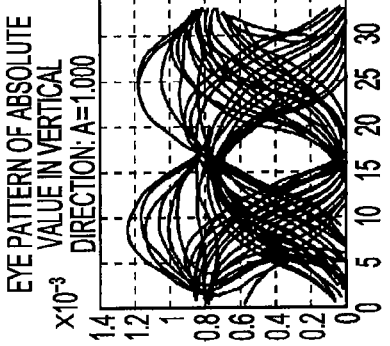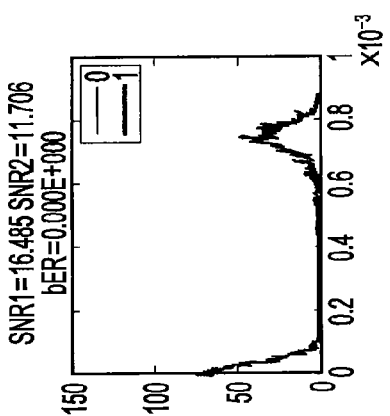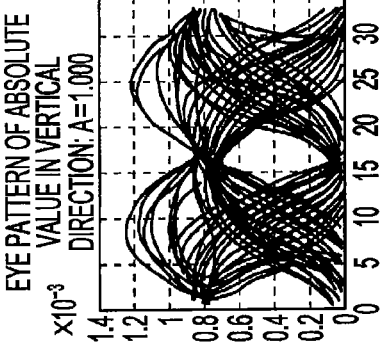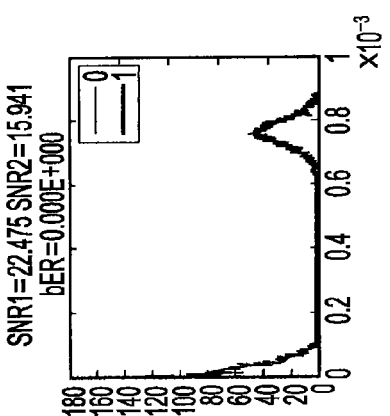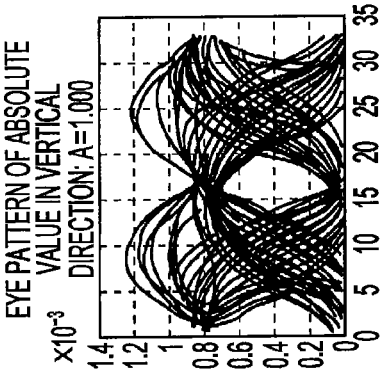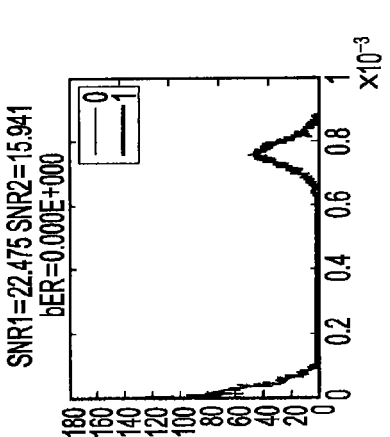

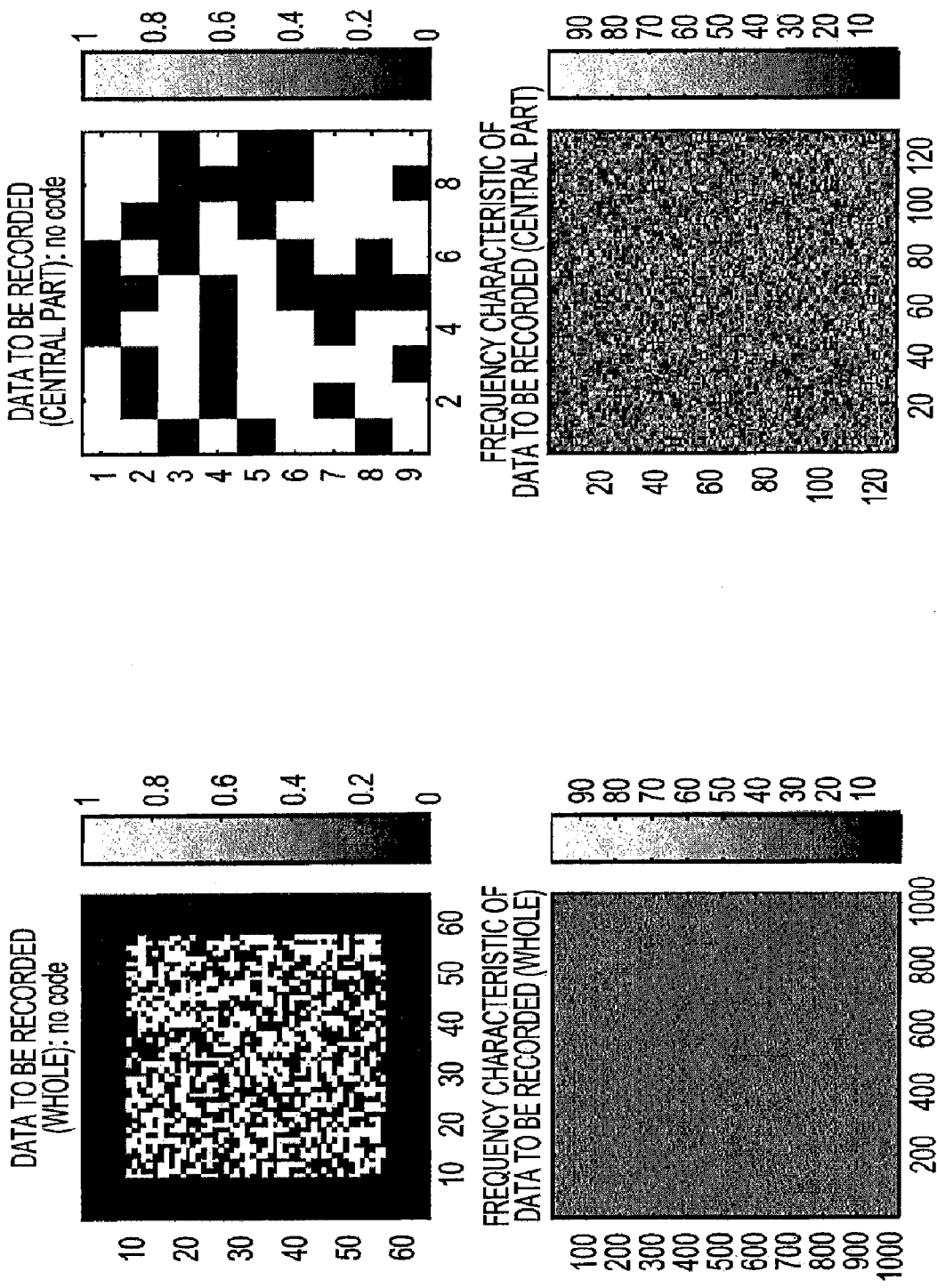

REPRODUCING APPARATUS AND REPRODUCING METHOD

CROSS REFERENCES TO RELATED APPLICATIONS

The present application claims priority to Japanese Patent Application JP 2006-337511 filed in the Japanese Patent Office on Dec. 14, 2006, the entire contents of which are incorporated herein by reference.

BACKGROUND

The present application relates to a reproducing apparatus and a reproducing method for reproducing data, recorded in the form of an interference fringe produced as a result of interference between reference light and signal light, from a holographic recording medium.

In hologram recording/reproducing technology, in particular, in hologram recording/reproducing technology for use in an optical storage, a SLM (spatial light modulator) such as a transmission-type liquid crystal panel or a DMD (Digital Micro mirror Device) is used to modulate light intensity of given signal light, for example, into a sequence of bits having a "1" level (corresponding to, for example, high intensity) or a "0" level (corresponding to, for example, low intensity).

In the light modulation, for example, as shown in FIG. 2, the SLM modulates the light intensity of signal light passing through a central part of the SLM and outputs the resultant modulated signal light such that the modulated signal light is surrounded by reference light passing through a ring-shaped peripheral part of the SLM and output therefrom. The signal light modulated according to the data to be recorded falls, together with the reference light, on a holographic recording medium so that interference between the signal light and the reference light occurs and a resultant interference fringe is recorded as data on the holographic recording medium.

In reproduction of data, only reference light is generated via the SLM, and the holographic recording medium is illuminated with the reference light output from the SLM. As a result, the reference light is diffracted by the interference fringe. An image is then formed by the diffracted light on an image sensor such as a CCD (Charge Coupled Device) or a CMOS (Complementary Oxide Semiconductor) sensor thereby reproducing a sequence of bits of data.

This method, in which signal light and reference light are provided in a coaxial manner, is called a coaxial method.

In the coaxial method, it is known to further perform a phase modulation by applying a phase mask to a real image plane of light obtained as a result of spatial light intensity modulation performed by the SLM (see, for example, Japanese Unexamined Patent Application Publication No. 2006-107663).

The phase modulation using the phase mask is performed on both the signal light and the reference light. The purpose for the phase modulation is to achieve multiplexing in recording data on a holographic recording medium, as with the technique disclosed in Japanese Unexamined Patent Application Publication No. 2006-107663. More specifically, signal light (data) recorded using reference light having a particular phase structure can be read only by illuminating the holographic recording medium with reference light having the same phase structure as that used in the recording. Therefore, if a plurality of data are respectively recorded in a multiplexed manner using reference light having difference phase structures, it is possible to selectively read desired data of the plurality of data by illuminating the holographic recording medium with reference light having the same phase structure as that used in recording the data.

The phase modulation performed on the signal light is to enhance efficiency of interference between the signal light and the reference light and to spread the spectrum of the signal light thereby to suppress a DC component, and thus to increase the recording density.

As for a phase modulation pattern to be applied to the signal light for the above purpose, for example, a binary random pattern is used. More specifically, for example, in the phase modulation pattern, a randomly selected half of pixels are set to provide a phase shift of $\pi$ and the remaining half of pixels are set to provide no phase shift (phase shift=0).

As described above, use of the two-level random pattern allows an improvement in the efficiency of interference between reference light and signal light. Furthermore, the two-level random pattern causes the spectrum to be spread uniformly over a Fourier plane (the image on the medium), which can reduce the DC component included in the signal light.

The suppression of the DC component achieved by use of the phase mask is described in further detail below with reference to FIGS. 28 to 30.

FIG. 28A illustrates recorded data including random values (in an upper part of the figure), and a frequency characteristic thereof (in a lower part of the figure). In FIG. 28B, a central part of the data to be recorded shown in FIG. 28A is shown in an upper part of the figure, and a frequency characteristic thereof is shown in a lower part of the figure.

Note that actual signal light carrying data to be recorded is substantially circular in cross section, although the data to be recorded shown in the figure has a square shape for convenience of illustration. This is also true for other figures such as FIG. 29 and FIG. 30.

In the data shown in the upper parts of respective FIGS. 28A and 28B, white areas have a bit value of "1" and black areas have a bit value of "0". In the lower parts of respective FIGS. 28A and 28B, spectral distributions indicating the frequency characteristics are represented by gray levels.

FIGS. 29A, 29B, 30A, and 30B illustrate images (SLM page images) obtained via modulation performed by the SLM in accordance with the data to be recorded, shown in FIGS. 28A and 28B, and also illustrates frequency characteristics thereof. More specifically, FIG. 29A illustrates an example of a whole SLM page image (in an upper part of the figure) produced without using the phase mask and a frequency characteristic thereof (in a lower part of the figure), and FIG. 29B illustrates central parts of the image and the frequency characteristic shown in FIG. 29A. In the upper parts of FIGS. 29A and 29B, white areas have a value of "1" and gray areas have a value of "0".

In lower parts of FIGS. 29A and 29B, spectral distributions indicating the frequency characteristics are shown. As can be seen, the spectrum of the image produced without using a phase mask has a sharp peak in the center of the image. This means that a DC component appears in the center. Note that such a DC component recorded in a particular area can prevent other hologram pages from being recorded. In such a case, it is necessary to record data such that hologram pages are sufficiently widely spaced. This makes it difficult to achieve high recording density.

FIG. 30A illustrates an example of a whole SLM page image (in an upper part of the figure) produced using a phase mask and a frequency characteristic thereof (in a lower part of the figure), and FIG. 30B illustrates central parts of the image and the frequency characteristic shown in FIG. 30A. In the upper parts of FIGS. 30A and 30B, white areas have a value of "1" and gray areas have a value of "0". In the lower areas of FIGS. 30A and 30B, spectral distributions indicating the frequency characteristics are represented by gray levels.

As can be seen from the figures, bits recorded as "1" in the image produced without using the phase mask are split into "+1" and "−1" in the image produced using the phase mask because the phase modulation causes the phase of each bit "1" to be shifted to either 0 or π. Note that bits "0" remain at "0" without being changed by the phase modulation.

Thus, in the case where the phase mask is used, data is recorded in three levels "0", "+1", and "−1". In FIGS. 30A and 30B, the level "−1" is represented in black.

In the recording of data in three levels, use of the phase mask causes the spectrum to be spread as shown in the lower parts of FIGS. 30A and 30B. In particular, spreading of the spectrum is clearly shown in FIG. 30B. In this specific example, the peak value of the spectrum is reduced to 2.1E+4 from the peak value of 2.6E+5 obtained in the case shown in FIG. 29, that is, the peak value of the spectrum is decreased to $\frac{1}{10}$ as a result of the spreading of the spectrum.

The spreading of the spectrum results in a reduction in the DC component, which allows more data to be recorded as a hologram page. In other words, it becomes possible to reduce a space between hologram pages, which allows an increase in recording density.

SUMMARY

As described above, high-density recording can be achieved by performing a phase modulation on signal light using a phase mask so as to suppress a DC component thereby making it possible to use a medium uniformly. The recording density may also be achieved by reducing the diameter of signal light by passing the signal light through an aperture. The reduction in the diameter of signal light results in a reduction in a hologram page size recorded on a medium, and thus the recording density can be achieved.

It is desirable to achieve a higher recording density by making full use of both approaches described above.

However, the method of achieving a high recording density by suppressing the DC component by using the phase mask causes the spectrum to be uniformly spread and the spatial frequency of the image of the signal light in the Fourier plane to be expanded. Therefore, if the diameter of the signal light is reduced by using an aperture or if the signal light is passed through a filter which rejects high spatial frequency components, the result is the occurrence of great distortion, which can cause intersymbol interference to occur. As a result, the eye pattern of the read signal tends to be collapsed, which makes it difficult to correctly reproduce the recorded data.

A technique to prevent intersymbol interference from occurring and to prevent the eye pattern from being collapsed is to improve the spatial frequency characteristics of the read signal by passing the read signal through a filter (an equalizer filter). The two-dimensional equalization filtering used herein may be realized by extending one-dimensional filtering widely used in recording/reproducing of data to/from an optical disk or used in communication to suppress intersymbol interference.

However, the equalization filtering does not work well for signal light subjected to phase modulation using a fixed modulation pattern such as a binary random pattern. That is, for such signal light, the equalization filtering does not prevent the eye pattern from being collapsed and does not suppress intersymbol interference.

Thus, as long as the above-described techniques are used, one has to select one of the following two approaches: (1) The diameter of signal light is limited by using an aperture to reduce the hologram page size on a holographic recording medium thereby to achieve a high recording density. To achieve this, no phase mask is used, which would cause the spectrum to be spread, or (2) A high recording density is achieved by spreading the spectrum by using a phase mask. To achieve this, reduction of the diameter of signal light using an aperture is not performed. That is, reduction of the hologram page size on a holographic recording medium is not performed.

As described above, there is a tradeoff between (a) achievement of a high recording density by limiting the diameter of signal light by using an aperture thereby to reduce the hologram page size on a holographic recording medium, and (b) achievement of a high recording density by spreading the spectrum by using a phase mask.

The conflict between the two approaches described above originates from the fact that a holographic recording/reproducing system has a nonlinear characteristic which makes it impossible to suppress intersymbol interference by using an equalization filter for the case where the diameter of signal light is limited by using an aperture. More specifically, although the image sensor can detect a reproduced image corresponding to recorded data by sensing intensity of light, the image sensor cannot detect information expressed in three levels "0", "+1", and "−1" produced via the phase mask (that is, the image sensor can detect only an absolute value).

Referring to FIG. 31, the nonlinearity in reading a signal (image) is described in further detail below.

FIG. 31 illustrates an example of an image output from an image sensor for data which has been recorded after being subjected to phase modulation using a phase mask. In FIG. 31, the output image is represented in gray levels (such that a high intensity level is indicated by white, while a low intensity level is represented by black). Note that an area including four pixels all of which are "1" (that is, an area which should be entirely white) has a black part. This is because a plurality of bits "1" at adjacent locations are randomly modulated in phase by "0" or "π", that is, converted into "+1" or "−1" via the phase modulation using a phase mask, and a null area with a 0 amplitude is created at a boundary between "+1" and "−1". However, the image sensor can detect only the absolute value of the amplitude and cannot discriminate "+1" and "−1" from each other. That is, both "+1" and "−1" are detected as having an equal intensity and thus both are detected as "1".

In other words, if it is possible to discriminate (linearly read) data "0", "+1", and "−1" recorded after being subjected to phase modulation using a phase mask, then it becomes possible to achieve an increase in recording density using a phase mask and that using an aperture without conflict. That is, it is possible to use a phase mask and an aperture without conflict if linear reading is possible.

In view of the above, according to an embodiment, there is provided a reproducing apparatus adapted to reproduce data recorded in the form of an interference fringe produced as a result of interference between signal light and reference light on a holographic recording medium, comprising reference light generation means for generating the reference light for illuminating the holographic recording medium to produce reproduced image corresponding to the data recorded on the holographic recording medium, coherent light generation means for generating coherent light having an intensity greater than the absolute value of a minimum amplitude of the reproduced image and having a phase equal to the phase of the reproduced image, an optical system adapted to transmit the reference light and the coherent light to the holographic recording medium, image signal acquisition means for sensing a reproduced image, which corresponds to the data recorded on the holographic recording medium and which is produced as a result of illuminating the holographic recording medium with the reference light and the coherent light via the optical system, and acquiring an image signal based on the reproduced image, square root calculation means for calculating the square root of each of values constituting the image signal acquired by the image signal acquisition means, removal means for removing the component of the coherent light from the square root, calculated by the square root calculation means, of each of values constituting the image signal, and data reproducing means for reproducing the data recorded on the holographic recording medium, on the basis of the image signal supplied from the removal means.

In the hologram recording/reproducing system, as described above, phase information included in a reproduced image is not detected, but only intensity of light can be detected. Note that the intensity of light is given by the absolute value (the square value) of the amplitude of the reproduced image. In view of the above, in the present embodiment of the application, in the operation of reading data by illuminating a medium with reference light, the medium is also illuminated with additional coherent light with an intensity greater than the absolute value of a minimum value of the amplitude of the reproduced image so that a value corresponding to the intensity of the additional coherent light is added to the original amplitude. The square root is then calculated for each of values constituting the image signal obtained by detecting the square of the amplitude of the reproduced image including the additional coherent light component. The coherent light component is then removed thereby obtaining the original data.

That is, if a value (for example, 1.5) greater than the absolute value of a minimum value (for example, −1) of the amplitude of the reproduced image is added to the reproduced image, the square root of the each of the values of the image signal detected as the square value, and if the added coherent light component is removed, then it becomes possible to correctly detect a negative amplitude ("−1"). Thus, in the case where data is recorded in three levels "0", "+1", and "−1" using the phase mask, it is possible to correctly detect, that is, linearly read three levels "0", "+1", and "−1".

In the embodiment, the phase of the additional coherent light is set to be equal to the phase of the reproduced image, because if there is a phase difference, it becomes difficult to correctly add an amplitude corresponding to the coherent light to the reproduced image.

When data is recorded in three levels "0", "+1", and "−1" using a phase mask, it is possible to correctly detect phase information indicating three levels "0", "+1", and "−1", i.e., it is possible to linearly read information according to an embodiment.

The capability of linearly reading data makes it possible to achieve an increase in recording density using a phase mask and that using an aperture without conflict, i.e., it is possible to suppress intersymbol interference by using an equalization filter. Thus, it is possible to achieve a high recording density by using a phase mask to allow a recording medium to be used uniformly, and achieve a high recording density by controlling the diameter of signal light by using an aperture thereby to reduce the hologram page size on a holographic recording medium without encountering conflict between the two approaches.

Additional features and advantages are described herein, and will be apparent from, the following Detailed Description and the figures.

BRIEF DESCRIPTION OF THE FIGURES

FIG. 2 is a diagram illustrating a manner in which holographic data is recorded on a holographic recording medium;

FIGS. 3A and 3B illustrate a method of reproducing data from a holographic recording medium;

FIG. 4 illustrates a reference light area, a signal light area, and a gap area defined in a spatial light modulator;

FIG. 5 is a block diagram illustrating a spatial light modulator and an intensity/phase modulation controller disposed in a recording/reproducing apparatus according to an embodiment;

FIGS. 10A to 10C illustrate an one-dimensional non-ISI Nyquist's first criterion;

FIGS. 12A to 12C illustrate characteristics of a two-dimensional non-IPI Nyquist's criterion;

FIGS. 17A to 17C illustrate experimental results of effects of equalization, for a case where no phase mask is used and no additional coherent light is used;

FIGS. 18A to 18C illustrate experimental results of effects of equalization, for a case where a phase mask is used but no additional coherent light is used;

FIGS. 19A to 19C illustrate experimental results of images output from an image sensor, for a case where an aperture is used but no phase mask is used and no additional coherent light is used;

FIGS. 20A to 20C illustrate experimental results of images output from an image sensor, for a case where an aperture and a phase mask are used but no additional coherent light is used;

FIGS. 21A to 21C illustrate experimental results of effects of equalization, for a case where an aperture is used but no phase mask is used and no additional coherent light is used;

FIGS. 22A to 22C illustrate experimental results of effects of equalization, for a case where an aperture and a phase mask are used but no additional coherent light is used;

FIGS. 23A to 23D illustrate experimental results of effects of the amount of added coherent light on an image output from an image sensor;

FIGS. 24A to 24D illustrate experimental results of images output from an image sensor and eye patterns, for a case where equalization is performed using an equalization filter but subtraction of a value corresponding to added coherent light is not performed;

FIGS. 25A to 25D illustrate absolute-value eye patterns and histograms obtained in experiments in a case where a value corresponding to added coherent light is subtracted;

FIGS. 28A and 28B illustrate recorded data including random values and frequency characteristics thereof;

DETAILED DESCRIPTION

The present application is described in further detail below with reference to specific embodiments, according to the following outlines.

Figure 1:
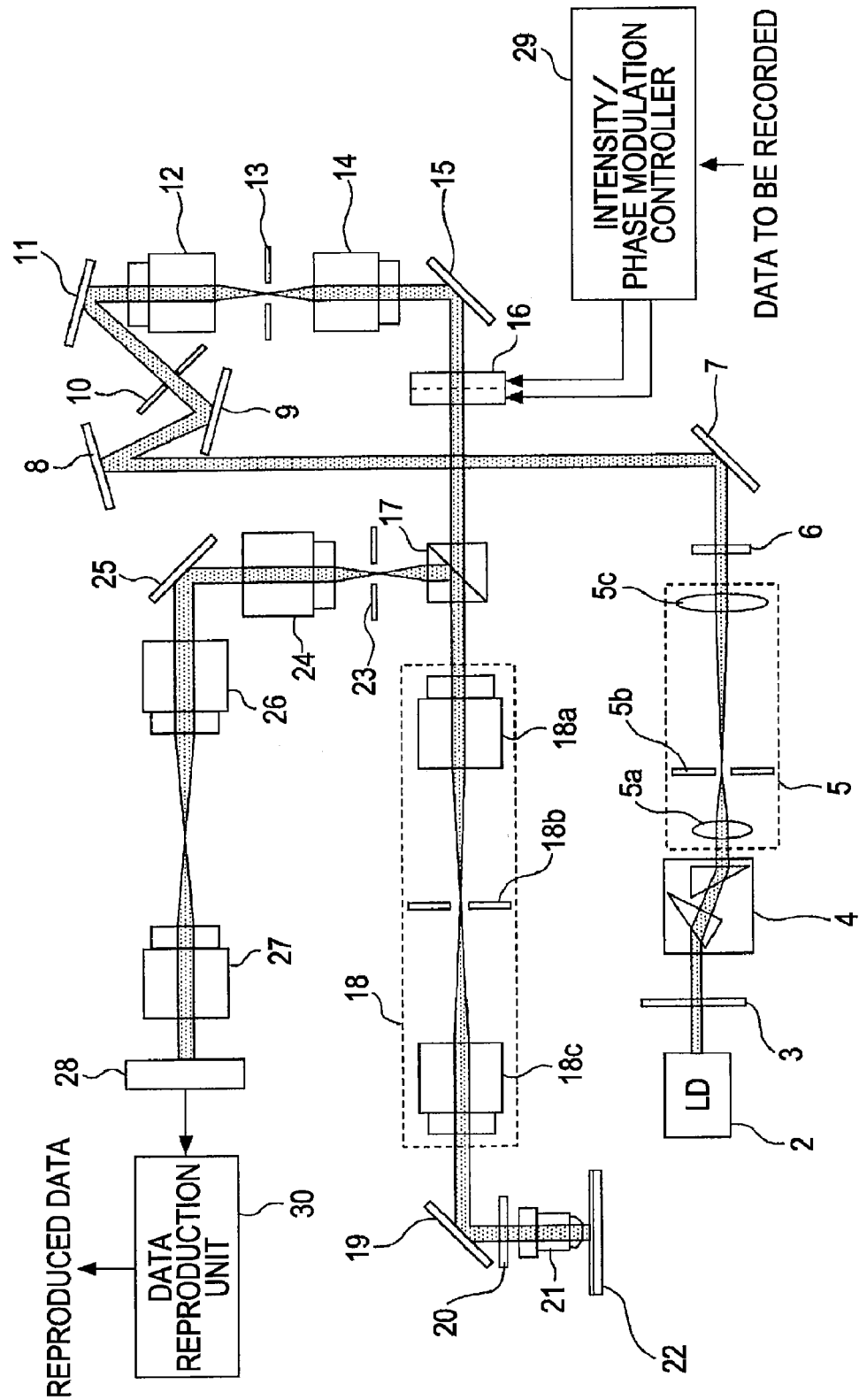
FIG. 1 is a block diagram illustrating an internal configuration of a recording/reproducing apparatus according to an embodiment.

1. Configuration of Recording/Reproducing Apparatus
1.1. General Configuration
1.2. Spatial Light Modulator (SLM) and Intensity/Phase Modulation Controller
1.3. Data Reproducing Unit
2. Reading Operation
3. Experimental Results
4. Modifications 1. Configuration of Recording/Reproducing Apparatus 1.1. General Configuration FIG. 1 is a block diagram illustrating an internal configuration of a recording/reproducing apparatus 1 according to an embodiment. Note that FIG. 1 shows only main parts including an optical system, a data modulation section, and a reproducing section, but other parts are not shown.

In the holographic recording/reproducing apparatus of the present embodiment, the coaxial configuration is used. More specifically, signal light and reference light are provided in a coaxial fashion, and a holographic recording medium 22 placed at a predetermined location is illuminated with both the signal light and the reference light so that an interference fringe is produced on the holographic recording medium 22 whereby data is recorded on the holographic recording medium 22. In the data reproduction mode, the holographic recording medium 22 is illuminated with reference light so that data recorded in the form of the interference fringe is reproduced.

Herein, the holographic recording medium 22 shown in FIG. 1 may be a reflection-type holographic recording medium having a reflective film, and the recording/reproducing apparatus 1 may be configured to handle the reflection-type holographic recording medium 22.

In FIG. 1, a laser diode (LD) 2 serves as a light source for providing laser light for use in the recording/reproducing operation. A specific example of the laser diode 2 is an external cavity laser diode adapted to emit laser light with a wavelength of 410 nm.

The light emitted from the laser diode 2 passes through a shutter 3 and an anamorphic prism 4 and is incident on a spatial filter 5. The spatial filter 5 includes a condenser lens 5a located on a side facing the anamorphic prism 4, an aperture 5b located adjacent to the condenser lens 5a, and a collimator lens 5c located on a side opposite to the condenser lens 5a whereby a central part of laser light (for example, 20% of the laser light in the central part having intensity in a range of 100% to 80% of a peak intensity of the laser light) is extracted and output.

The light output from the spatial filter 5 is passed through a half-wave plate 6 and then reflected by a mirror 7. The light is further reflected by a mirror 8 and a mirror 9 and then passes through an aperture 10. Furthermore, the light is reflected by a mirror 11, and passes through a lens 12, an aperture 13, and a lens 14. The light is then reflected by a mirror 15 and is incident on a spatial light modulator 16.

The spatial light modulator (SLM) 16 performs a spatial light modulation on the incident light. The spatial light modulation performed herein includes a spatial light intensity modulation (hereinafter, referred to simply as a light intensity modulation or an intensity modulation) and a spatial light phase modulation (hereinafter, referred to simply as a light phase modulation or a phase modulation).

The light intensity modulation and the light phase modulation by the spatial light modulator 16 are performed, under the control of an intensity/phase modulation controller 29, in accordance with data to be recorded on the holographic recording medium 22.

In the spatial light modulator 16, the spatial light intensity modulation is performed using a transmission-type liquid crystal panel by controlling the driving voltage applied to each pixel of the liquid crystal panel. Further detailed structures of the spatial light modulator 16 and the intensity/phase modulation controller 29 and operations thereof will be described later.

The light subjected to the spatial light modulation by the spatial light modulator 16 is then passed through a beam splitter 17 and is incident on a relay lens unit 18. The relay lens unit 18 includes a relay lens 18a adapted to condense the light incident via the beam splitter 17, an aperture 18b adapted to limit the diameter of the light output from the relay lens 18a, and a relay lens 18c adapted to collimate the light output from the aperture 18b.

In the optical system shown in FIG. 1, the aperture 18b serves to limit the frequency band to reduce the page size recorded on the holographic recording medium 22.

The light output from the relay lens unit 18 is reflected by a mirror 19 and is passed through a quarter-wave plate 20. The light is then focused by an objective lens 21 onto the holographic recording medium 22.

In the recording operation, the spatial light modulator 16 outputs signal light subjected to the spatial light intensity modulation according to the data to be recorded, and also outputs reference light having a ring shape coaxial with the signal light. The signal light and the reference light are transmitted along the path described above and are finally focused on the holographic recording medium 22.

In the reproducing operation, light emitted from the laser diode 2 is transmitted along the same path as that in the recording operation and is incident on the spatial light modulator 16. The spatial light modulator 16 performs the spatial light intensity modulation on the light to produce reference light for use in the reproducing operation. That is, in the reproducing operation, signal light is not applied to the holographic recording medium 22, but the holographic recording medium 22 is illuminated only with the reference light.

The illumination of the holographic recording medium 22 with the reference light produces diffracted light corresponding to data recorded on the holographic recording medium 22. The diffracted light is reflected from the holographic recording medium 22 and collimated by the objective lens 21. The light is then transmitted to the beam splitter 17 via the quarter-wave plate 20, the mirror 19, and the relay lens unit 18.

The light originating from the holographic recording medium 22 is reflected by the beam splitter 17 and transmitted to an image sensor 28 via an aperture 23, a lens 24, a mirror 25, a lens 26, and a lens 27.

The image sensor 28 is implemented, for example, by a CCD (Charge Coupled Device) sensor or a CMOS (Complementary Oxide Semiconductor) sensor to sense the light (diffracted light) received from the holographic recording medium 22 via the above-described elements and convert the light into an electric signal.

FIG. 2 illustrates a method of recording data on the holographic recording medium 22 via the optical system described above, and FIG. 3 illustrates a method of reproducing data from the holographic recording medium 22.

Note that, of various parts of the optical system shown in FIG. 1, only the spatial light modulator 16 and the objective lens 21 are shown in FIG. 2. Similarly, only the spatial light modulator 16 and the objective lens 21 are shown in FIG. 3A, and only the objective lens 21 and the image sensor 28 are shown in FIG. 3B.

In the present embodiment, in the reproducing operation, the holographic recording medium 22 is illuminated not only with the reference light but also with coherent light as will be described in detail later, although the coherent light is not shown in FIG. 3. Before the method of reproducing data using additional coherent light is described, a method of reproducing data without using additional coherent light is described first.

In the recording operation shown in FIG. 2, the spatial light modulator 16 modulates the intensity of the incident light to produce light (signal light) with an intensity pattern of "0s" and "1s" according to the data to be recorded, and the reference light and the signal light are output in a coaxial manner.

The intensity-modulated light (including the reference light and the signal light) is focused by the objective lens 21 onto the holographic recording medium 22. As a result, interference occurs between the reference light and the signal light and an interference fringe is produced. The resultant interference fringe is recorded as data on the holographic recording medium 22.

In the reproducing operation, first, as shown in FIG. 3A, the spatial light modulator 16 performs the spatial light intensity modulation on the incident light thereby producing reference light. The produced reference light is focused on the holographic recording medium 22 so that the reference light is diffracted by the interference fringe corresponding to the data pattern recorded on the holographic recording medium 22 and is output as reflected light from the holographic recording medium 22. This diffracted light has an intensity pattern corresponding to the recorded data, and thus data can be reproduced by detecting the intensity pattern of the diffracted light by using the image sensor 28.

As described above, the spatial light modulator 16 produces reference light and further signal light depending on whether the operation is in the recording mode or the reproducing mode. For this purpose, a reference light area A1, a signal light area A2, and a gap area A3 are defined in the spatial light modulator 16 as shown in FIG. 4. More specifically, as shown in FIG. 4, the signal light area A2 is defined in a circular area in the center of the spatial light modulator 16, and the reference light area A1 in the form of a ring is defined in an area outside the signal light area A2 such that the reference light area A1 is spaced from the signal light area A2 by the gap area A3 and the reference light area A1 is coaxial with the signal light area A2.

The gap area A3 is formed to prevent the reference light from leaking into the signal light area A2, because such leaking will produce noise.

In the recording operation, predetermined pixels in the reference light area A1 are set to "1" (high intensity level) and the other pixels in the reference light area A1 are set to "0" (low intensity level). Furthermore, all pixels in the gap area A3 and all pixels outside the reference light area A1 are set to "0". In this state, pixels in the signal light area A2 are set to "0" or "1" according to the data to be recorded whereby reference light and signal light are produced in the manner described above with reference to FIG. 2.

In the reproducing operation, the pixels in the reference light area A1 are set to "0" or "1" in the same manner as that in the recording operation, while all bits in the other areas are set to "0" whereby reference light is produced as shown in FIG. 3A.

Referring again to FIG. 1, in addition to the optical system described above, the recording/reproducing apparatus 1 further includes an intensity/phase modulation controller 29 adapted to control the operation of the spatial light modulator 16, and a data reproduction unit 30 adapted to, in the reproducing operation, reproduce recorded data from signals detected by respective pixels of the image sensor 28. In the following section, configurations of the intensity/phase modulation controller 29, the data reproduction unit 30, and the spatial light modulator 16 will be described.

1.2 Spatial Light Modulator (SLM) and Intensity/Phase Modulation Controller

The intensity/phase modulation controller 29 and the spatial light modulator 16 are configured as follows.

FIG. 5 illustrates internal configurations of the spatial light modulator 16 and the intensity/phase modulation controller 29 shown in FIG. 1. FIG. 5 also slows the laser diode 2, the holographic recording medium 22, and light output from the laser diode 2 to the spatial light modulator 16 and transmitted to the holographic recording medium 22 after being passed through the spatial light modulator 16.

As shown in FIG. 5, the spatial light modulator 16 includes an intensity modulator 16a adapted to modulate the intensity of the signal light and the reference light and also includes a phase modulator 16b adapted to modulate the phase of the signal light and the reference light provided from the intensity modulator 16a.

In the present embodiment, the phase modulator 16b is implemented by a liquid crystal panel configured to variably modulate the phase independently for respective pixels.

Figure 6A:
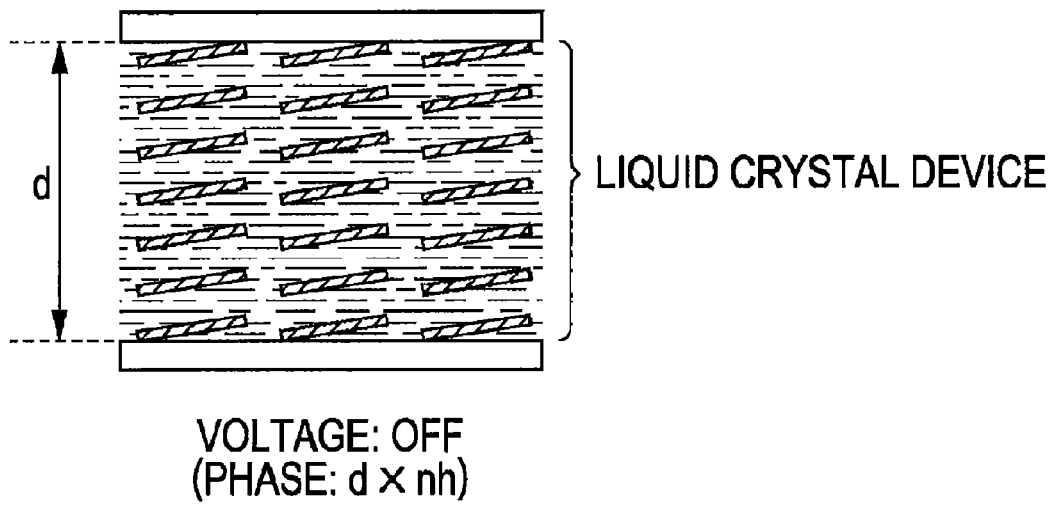
FIGS. 6A and 6B illustrate a liquid crystal device configured to perform phase modulation on a pixel-by-pixel basis.
Figure 6B:
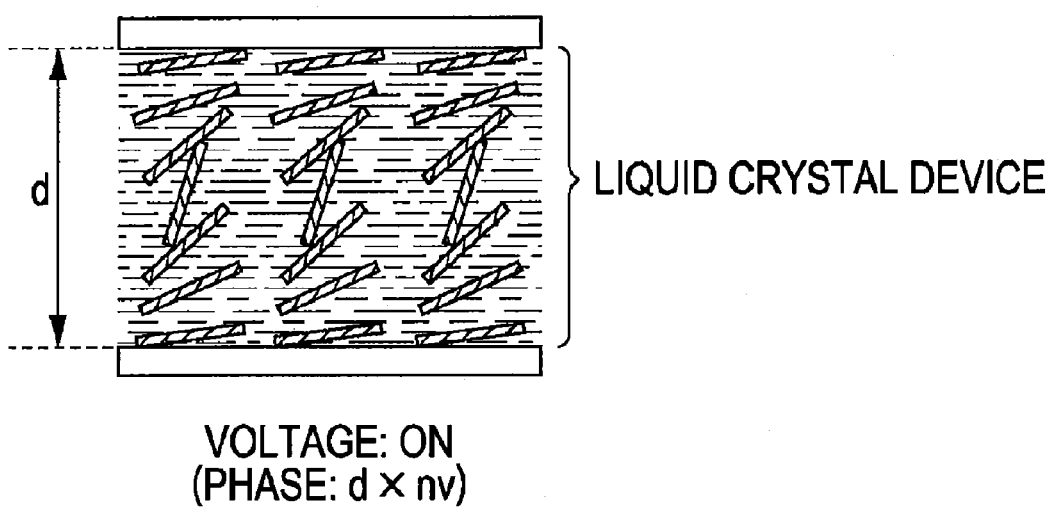

To realize the liquid crystal panel capable of performing the phase modulation independently for each pixel, a liquid crystal device in the liquid crystal panel may be formed so as to operate as shown in FIGS. 6A and 6B.

FIG. 6A shows liquid crystal molecules in a state (off-state) in which no driving voltage is applied to the liquid crystal device in the liquid crystal panel, and FIG. 6B shows liquid crystal molecules in a state (on-state) in which a driving voltage with a predetermined level is applied to the liquid crystal device in the liquid crystal panel.

In the off-state shown in FIG. 6A, liquid crystal molecules are oriented in a horizontal direction, while in the on-state shown in FIG. 6B, liquid crystal molecules are oriented in a vertical direction.

In a case where the liquid crystal device has a refractive index of nh when liquid crystal molecules are oriented in the horizontal direction in the off-state, while the liquid crystal device has a refractive index of nv when liquid crystal molecules are oriented in the vertical direction in the on-state, and furthermore the liquid crystal device has a thickness of d, the phase changes by d×nh in the off-state, while the phase changes by d×nv in the on-state. Thus, a phase difference Δnd=d×nh−d×nv occurs when the driving voltage is switched between the on and off levels.

Because the phase difference is Δnd=d×nh−d×nv, it is possible to obtain a desired phase difference for each pixel by adjusting the thickness d of the liquid crystal device.

In the phase modulator 16b of the present embodiment, the thickens d of the liquid crystal device is adjusted such that the phase difference Δnd is set to be π (Δnd=π), whereby each pixel is subjected to phase modulation of "0" or "Π" depending on whether the driving voltage is turned on or off.

Because the phase is shifted by 0 or π depending on whether the driving voltage with the predetermined level is applied or not, it is possible to change the phase in desired steps in the range from 0 to π by changing the driving voltage in corresponding steps. For example, if the driving voltage is set to a value one-half the voltage which causes the phase to be shifted by π, the phase is shifted by π/2.

Referring again to FIG. 5, the spatial light modulator 16 includes the phase modulator 16b capable of applying a variable phase modulation separately to each pixel and also includes the intensity modulator 16a formed integrally with the phase modulator 16b. Note that the intensity modulator 16a and the phase modulator 16b are precisely positioned such that an exact one-to-one correspondence is achieved between the pixels of the intensity modulator 16a and the pixels of the phase modulator 16b.

The above-described configuration of the spatial light modulator 16 allows the signal light and the reference light output from the intensity modulator 16a to be precisely modulated in phase according to the phase modulation pattern in the pixel-by-pixel basis.

The intensity/phase modulation controller 29 is configured to control the spatial light modulator 16 such that the intensity modulator 16a and the phase modulator 16b operate in the above-described manner. As shown in FIG. 5, the intensity/phase modulation controller 29 includes an encoder 31, a mapping unit 32, an intensity modulation driver 33, a phase modulation pattern generator 34, and a phase modulation driver 35.

In the recording operation, data to be recorded is input to the encoder 31. The encoder 31 encodes the input data into a predetermined recording format. For example, in a case where sparse coding, which is widely used in hologram recording/reproducing systems, is employed, each byte (8 bits) of data to be recorded is converted into a square data block including 4×4=16 bits. Each data block in which 4×4=16 bits are arranged is a minimum unit of data and called a symbol.

The mapping unit 32 maps the data encoded by the encoder 31 into a hologram page according to the recording format. The hologram page refers to a whole data array placed over the entire area of the signal light area A2. That is, a data unit that can be recorded at a time by interference between signal light and reference light is called a hologram page.

In addition to the mapping of data into the signal light area A2, the mapping unit 32 produces a data pattern in which predetermined pixels in the reference light area A1 are set to "1" and the other pixels in the reference light area A1 are set to "0", and all pixels in the gap area A3 and all pixels outside the reference light area A1 are set to "0", and the mapping unit 32 combines this data pattern and the data pattern in the signal light area A2 to produce a data pattern including pixels corresponding to all effective pixels of the intensity modulator 16a.

The resultant data pattern including pixels corresponding to all effective pixels of the intensity modulator 16a is supplied to the intensity modulation driver 33. In accordance with this data pattern, the intensity modulation driver 33 drives the respective pixels of the intensity modulator 16a.

As a result, light to be used as signal light with intensity modulated according to the pattern corresponding to the record data, and light to be used as reference light with intensity modulated according to the predetermined pattern are produced.

Note that, in the recording operation, the mapping unit 32 maps data encoded by the encoder 31 sequentially from one hologram page to another, and thus the data pattern in the signal light area A2 supplied to the intensity modulation driver 33 sequentially varies depending on the content of the data to be recorded while the data pattern in the other areas remains unchanged. That is, the intensity modulation driver 33 sequentially drives the pixels of the intensity modulator 16a in accordance with the data pattern in units of hologram pages. Thus, data is recorded on the holographic recording medium 22 in units of hologram pages.

In the recording operation, the intensity/phase modulation controller 29 also drives the phase modulator 16b, in addition to driving the intensity modulator 16a.

First, in accordance with a predetermined data pattern, the phase modulation pattern generator 34 produces a phase modulation pattern to be set in the signal light area A2 of the phase modulator 16b in the spatial light modulator 16. In the present embodiment, a binary random pattern is used as the phase modulation pattern for use as the phase mask.

The phase modulation pattern generator 34 also produces a phase modulation pattern to be set in the reference light area A1 of the phase modulator 16b.

The phase modulation pattern generator 34 combines the phase modulation patterns (by which to control the respective pixels) of the signal light area A2 and the reference light area A1 to produce a phase modulation pattern by which to control all effective pixels of the phase modulator 16b. Note that the phase modulation pattern is set to have a value corresponding to a phase of "0" for any pixel other than those located in the signal light area A2 or the reference light area A1.

The phase modulation pattern produced in the above-described manner is supplied to the phase modulation driver 35.

In accordance with the phase modulation pattern supplied from the phase modulation pattern generator 34, the phase modulation driver 35 drives the respective pixels of the phase modulator 16b so that the spatial light modulator 16 modulates the phase of the signal light and the reference light in accordance with the phase modulation pattern given as the phase mask. As a result, the signal light and the reference light modulated in the final form are output from the spatial light modulator 16.

Figure 7A:
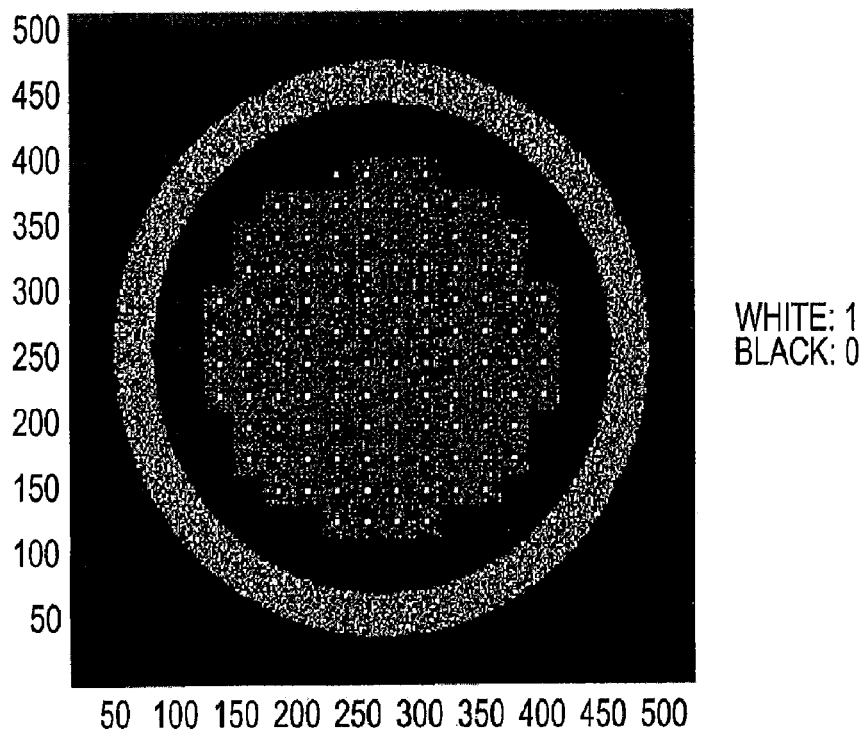
FIG. 7A illustrates an example of an image output from an intensity modulator in a recording operation.
Figure 7B:
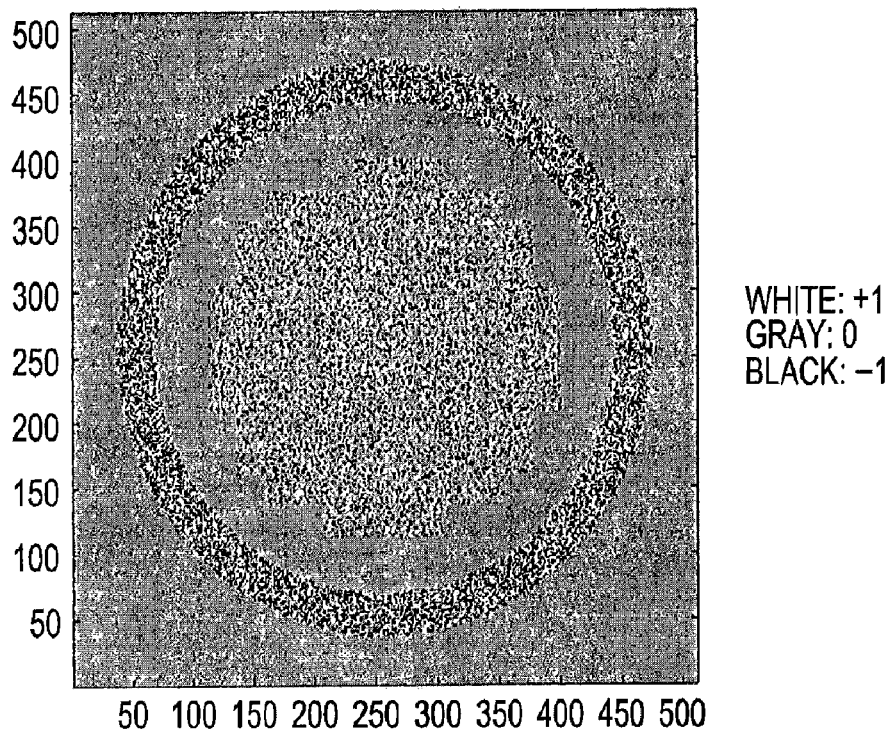
FIG. 7B illustrates an example of an image output from a phase modulator in the recording operation.

FIG. 7A illustrates an example of an image output by the intensity modulator 16a under the control of the intensity/phase modulation controller 29 in the recording operation, and FIG. 7B illustrates an example of a corresponding image output from the phase modulator 16b.

Note that in FIG. 7A, bits "1" are represented in white and bits "0" are represented in black. As shown in FIG. 7A, the signal light area A2 of the image output from the intensity modulator 16a has a pattern of "1s" and "0s" (hereinafter referred to as a 1/0-pattern) obtained as a result of data mapping of signal light, and the reference light area A1 has a pattern of "0s" and "1s" obtained as a result of the intensity modulation performed according to the predetermined pattern of "0s" and In FIG. 7B, bits "+1s", "0s", and "−1s" are represented in white, gray, and black. As a result of the phase modulation performed by the phase modulator 16b functioning as the phase mask on the output (FIG. 7A) of the intensity modulator 16a, a random pattern of "+1s", "0s", and "−1s" occurs in the signal light area A2 as shown in FIG. 7B. Furthermore, as a result of the phase modulation, values in three levels "+1s", "0s", and "−1s" occur in the reference light area A1.

Referring again to FIG. 5, the operation of the intensity/phase modulation controller 29 in the reproducing mode is described below. Note that in a first part of the following description, only a general hologram reproducing operation such as that shown in FIGS. 3A and 3B is discussed, and an operation specific to the present embodiment of the application will be discussed later.

In the reproducing operation, first, the mapping unit 32 produces a data pattern such that the pixels in the reference light area A1 are set to "0" or "1" in the same manner as that in the recording operation, while all bits in the other areas are set to "0", and the mapping unit 32 supplies the resultant data pattern to the intensity modulation driver 33. In accordance with this data pattern, the intensity modulation driver 33 in accordance with the received data pattern, the intensity modulation driver 33 drives the respective pixels of the intensity modulator 16a to produce intensity-modulated light including only a reference light component such as that shown in FIG. 3A.

Figure 8A:
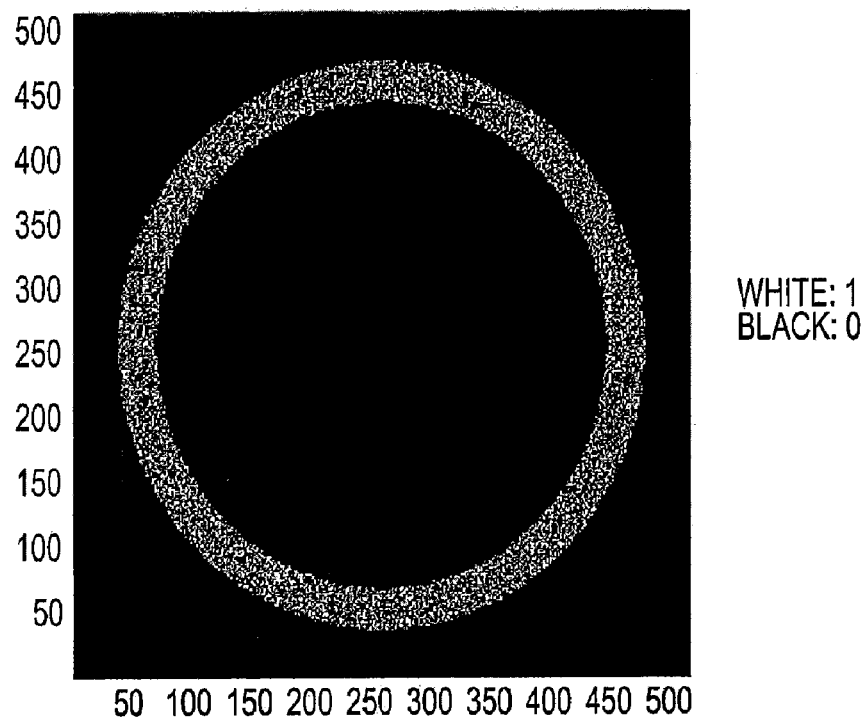
FIG. 8A illustrates an example of an image output from an intensity modulator in a reproducing operation.

FIG. 8A illustrates an example of the intensity-modulated image including only the reference light component output from the light intensity modulator 16.

Note that in FIG. 8A, bits "1" are represented in white and bits "0" are represented in black. As shown in FIG. 8a, the reference light area A1 has a pattern of "0s" and "1s" obtained as a result of the intensity modulation performed according to the same pattern of "0s" and "1s" as that in the recording operation.

Referring again to FIG. 5, in the reproducing operation, a phase modulation is also performed by the phase modulation pattern generator 34 and the phase modulation driver 35.

More specifically, in the reproducing operation, the phase modulation pattern generator 34 produces a phase modulation pattern, similar to that produced in the recording operation, for use in the reference light area A1 of the phase modulator 16b, and the phase modulation pattern generator 34 supplies the produced modulation pattern to the phase modulation driver 35. In accordance with the received modulation pattern, the phase modulation driver 35 performs the phase modulation so that reference light phase-modulated in the similar manner as in the recording operation is finally output from the spatial light modulator 16.

The reference light produced via the above-described process is applied to the holographic recording medium 22. As a result, diffracted light (reproduced image) corresponding to the hologram page data recorded on the holographic recording medium 22 is obtained as shown in FIG. 3B. The reproduced image is then sensed by the image sensor 28 shown in FIG. 1, and a resultant signal is supplied to the data reproduction unit 30.

Figure 8B:
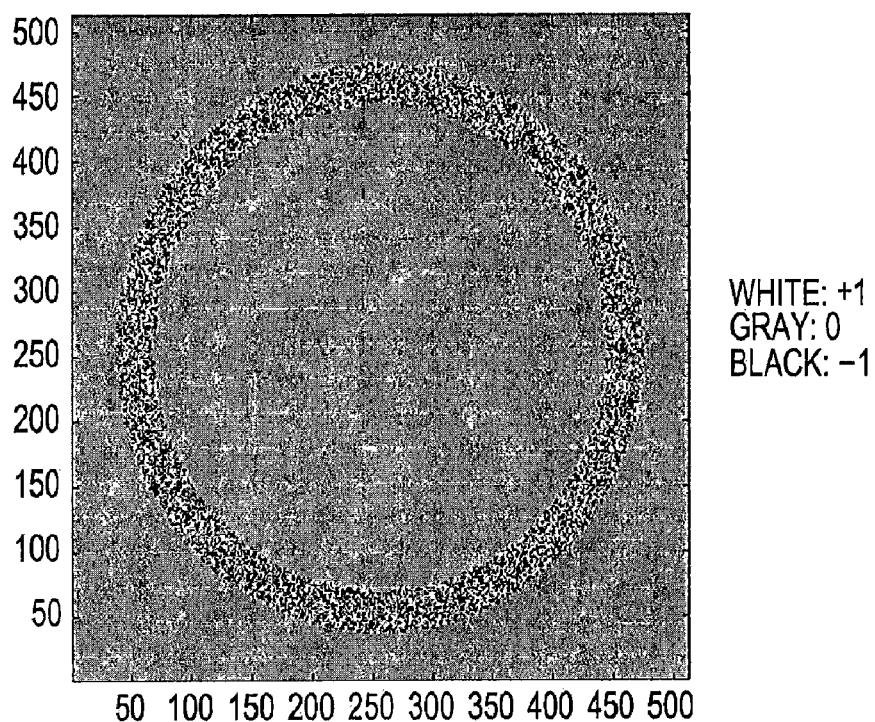
FIG. 8B illustrates an example of an image output from a phase modulator in the reproducing operation.

FIG. 8B illustrates an example of a final output image provided by the spatial light modulator 16.

In FIG. 8B, as in FIG. 7B, bits "+1s", "0s", and "−1s" are represented in white, gray, and black. As can be seen, as a result of the phase modulation, a pattern of "+1s", "0s", and "−1s" occurs in the reference light.

1.3. Data Reproducing Unit

The data reproduction unit 30 is described below.

In FIG. 1, if the data reproduction unit 30 receives the signal (image signal) output from the image sensor 28 in the reproducing operation, the data reproduction unit 30 reproduces data on the basis of values of the image signal.

Figure 9:
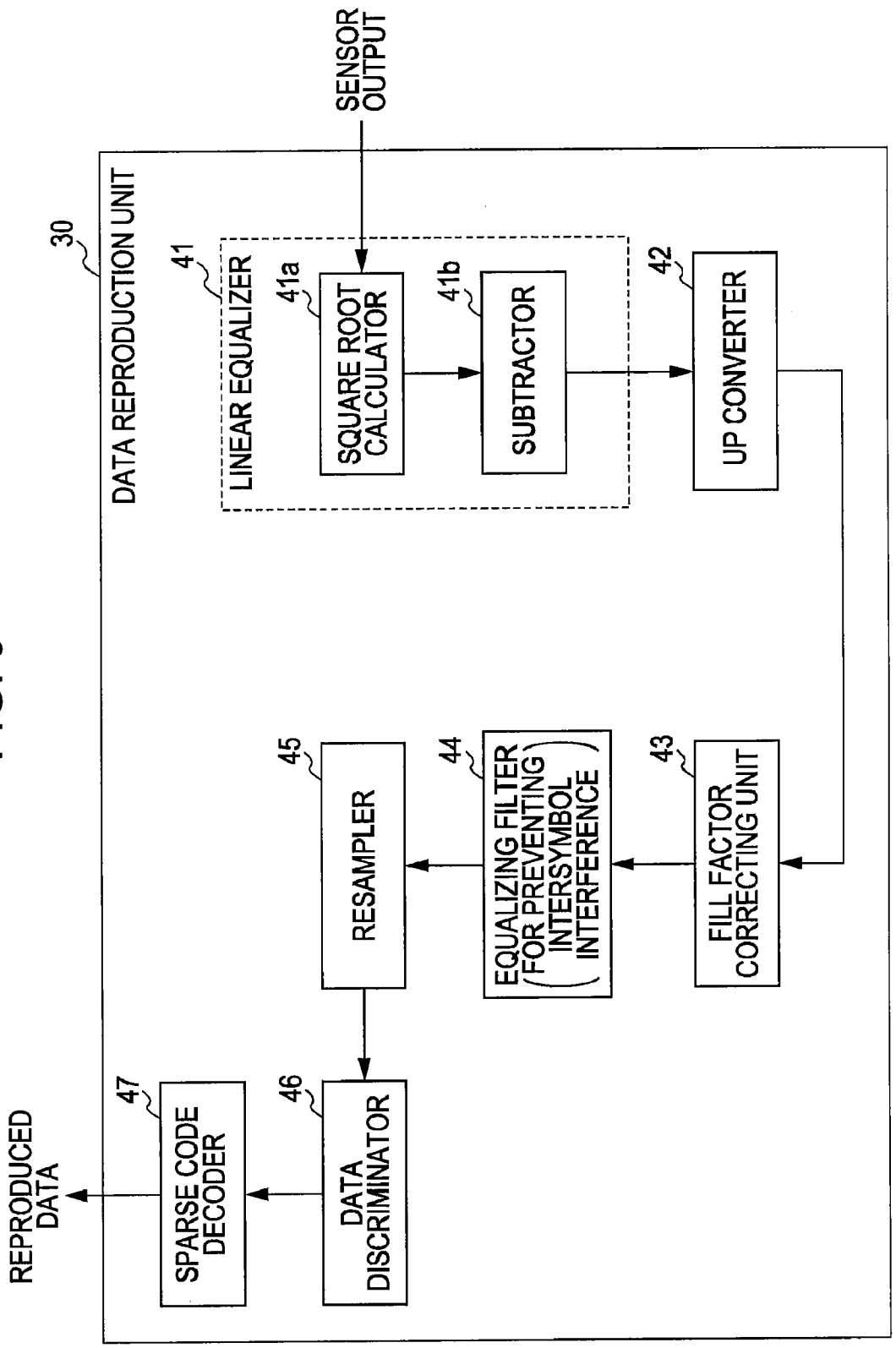
FIG. 9 is a block diagram illustrating an example of an internal configuration of a data reproduction unit in a recording/reproducing apparatus according to an embodiment.

FIG. 9 is a block diagram illustrating an internal configuration of the data reproduction unit 30.

As shown in FIG. 9, the data reproduction unit 30 includes a linearization unit 41, an up converter 42, a fill factor correcting unit 43, an equalizing filter 44, a resampler 45, a data discriminator 46, and a sparse code decoder 47.

The linearization unit 41 reads the signal output from the image sensor 28 in a particular manner according to the present embodiment of the application to obtain a linear read signal corresponding to the signal output from the image sensor 28.

Note that the image sensor 28 represents the intensity of incident light by an amplitude according to a predetermined scale such as a 256-level scale. Accordingly, the signal obtained via the linear reading process has an amplitude represented in the predetermined scale. The amplitude is discriminated into bit value "0" or "1" by the data discriminator 46 as will be described later.

The internal configuration of the linearization unit 41 and the reading operation performed thereby according to the present embodiment will be described in detail later.

Note that in hologram recording/reproducing systems, it is very difficult to register pixels (data pixel) of the spatial light modulator (SLM) 16 precisely in an one-to-one manner with respect to corresponding pixels (detector pixels) of the image sensor 28, because of optical distortion or because of a magnification error. That is, it is very difficult to precisely configure the SLM 16 and the image sensor 28 such that light of each pixel of the reproduced image output from the SLM 16 is incident on a correct pixel of the image sensor 28.

To avoid a problem caused by the alignment error described above, the actual correspondence between the data pixels of the SLM 16 and the detector pixels of the image sensor 28 is determined, and bit values of data pixels are discriminated on the basis of amplitudes of signals output from correctly-corresponding detector pixels.

Although not shown in the figure, to handle the correspondence error caused by the optical distortion or the optical magnification error, the image sensor 28 is configured such that light originating from each pixel of the SLM 16 is sensed by n pixels (n>1) of the image sensor 28 (this technique is called oversampling). For example, light originating from each pixel of the SLM 16 is detected by 4 (=2×2) pixels of the image sensor 28. The oversampling is performed to achieve a high resolution in detecting the produced image so that a correspondence error of an amount less than one pixel in the reproduced image can be handled.

For example, in a case where the oversampling rate is set to 2×2=4, the image sensor 28 outputs an image signal with a resolution 4 times higher than the resolution of the SLM 16. Thus, the signal (image signal) output from the linearization unit 41 also has a resolution 4 times higher than the resolution of the SLM 16.

The image signal output in the above-described manner from the linearization unit 41 is supplied to the up converter 42. The up converter 42 up-converts the received read signal by a predetermined factor, for example, by performing interpolation.

By up-converting the image signal subjected to the oversampling, it is possible to further increase the resolution thereby to achieve a high-accuracy correction of the pixel position in the reproduced image.

The up-converted image signal output from the up converter 42 is supplied to the fill factor correcting unit 43. The fill factor correcting unit 43 performs a correction process according to the fill factor of the SLM 16 and the fill factor of the image sensor 28. Note that because of the difference between the fill factor of the SLM 16 and the fill factor of the image sensor 28, a reduction occurs in intensity of high-frequency components from the original value of the image signal output from the image sensor 28. Thus, the fill factor correcting unit 43 increases the intensity of high-frequency components.

If the equalizing filter 44 receives the corrected image signal from the fill factor correcting unit 43, the equalizing filter 44 performs waveform equalization to prevent intersymbol interference.

As described above, the equalization for preventing the intersymbol interference is based on an extension of waveform equalization of an one-dimensional signal, which is widely used in optical disks, communication, etc., into a two-dimensional signal.

Figure 11:
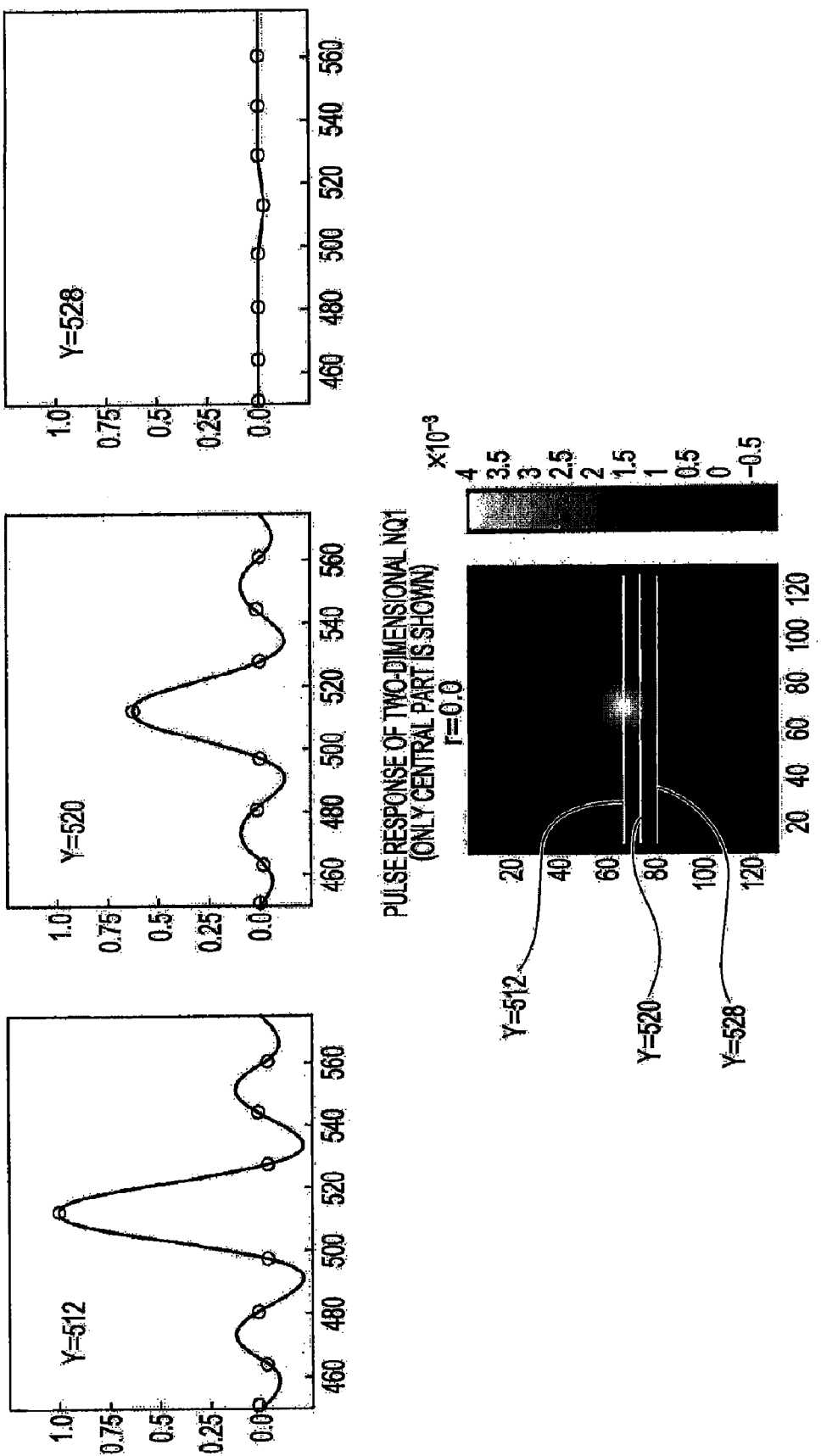
FIG. 11 illustrates cross sections of a two-dimensional non-IPI Nyquist's criterion.

Referring to FIGS. 10 to 12, the waveform equalization performed on the two-dimensional signal (image signal) to prevent intersymbol interference is described below.

For easier understanding of the technical discussion, the one-dimensional waveform equation is described first.

Intersymbol interference in an one-dimensional signal can be prevented by waveform equalization satisfying a criterion called a Nyquist's first criterion.

In FIGS. 10A to 10C, one-dimensional non-ISI (Inter Symbol Interference) pulse responses according to the Nyquist's first criterion are shown in upper parts of the figures, and frequency characteristics are shown in lower parts.

As shown in these figures, in the pulse responses in the time domain, a peak in the center has an amplitude of "1", and the amplitude at any sampling point is equal to "0". A linear superposition of such pulses has a value "1" or "0" at sampling points because no intersymbol interference occurs. In the examples shown in FIGS. 10A to 10C, each pulse response has a length of "1024", and thus the center is located at "512". Because the oversampling rate is set to "16", a sampling point occurs every 16 points, and each sampling point has a value of "0" except for the sampling point at the center.

The frequency characteristic according to the first Nyquist criterion is given by the product of the transfer function of an ideal LPF and an odd function, wherein the transfer function of the ideal LPF has a value of "1" in lower frequencies up to the Nyquist frequency which is one-half the data rate determined by a clock frequency and has a value of "0" in frequencies higher than the Nyquist frequency, and the odd function is point-symmetric about the Nyquist frequency. The frequency characteristics shown in the lower parts of FIGS. 10A to 10C are extractions of central parts of Fourier transforms of the pulse responses including a total of 1024 points, and thus the clock frequency is equal to 1024/16=64, and the Nyquist frequency is equal to 32.

In FIGS. 10A to 10B, the pulse response and the frequency characteristic are for roll-off factors (r) of r=0.0 (FIG. 10A), r=0.5 (FIG. 10B), and r=1.0 (FIG. 10C). As can be seen from FIGS. 10A to 10B, as the roll-off factor r increases from 0 to 1.0, the pulse response has smaller ringing and has a better characteristic. However, the required bandwidth increases with the roll-off factor r.

Now, the equalization criterion based on the one-dimensional Nyquist's first criterion is extended to equalization of two-dimensional signals.

A two-dimensional DPSF (Discrete Point Spread Function) is given by the outer product of two one-dimensional DPSFs (see, for example, H. J Coufal, D. Psaltis, G. T. Sincerbox, "Holographic Data Storage" Springer (2000)).

Therefore, a two-dimensional non-ISI pulse response is given by a N×M matrix given by the product of an N×1 column vector and a 1×N row vector produced from a pulse response vector according to the one-dimensional Nyquist's first criterion.

More specifically, if a row vector h in equation (1) shown below is a 1×N row vector of a pulse response according to the one-dimensional Nyquist's first criterion, h0 is 1 (h0=1) and the other hi are 0 (hi=0 for i≠0).

$$h=[h_{-4},h_{-3},h_{-2},h_{-1},h_0,h_1,h_2,h_3,h_4] \ (h_0=1, h_i=0 \ [i \neq 0]) \quad (1)$$

If this 1×N row vector is transposed, a column vector hT is obtained as shown below.

$$h^T = \begin{bmatrix} h_{-4} \\ h_{-3} \\ h_{-2} \\ h_{-1} \\ h_0 \\ h_1 \\ h_2 \\ h_3 \\ h_4 \end{bmatrix} \quad (2)$$

The outer product of hT and h is given by equation (3) shown below.

$$h^T h = \begin{bmatrix} h_{-4}h_{-4}, \ldots, h_0 h_{-4}, \ldots, h_4 h_{-4} \\ \ldots \\ h_{-4}h_0, \ldots, h_0 h_0, \ldots, h_4 h_0 \\ \ldots \\ h_{-4}h_4, \ldots, h_0 h_4, \ldots, h_4 h_4 \end{bmatrix} \quad (3)$$

As can be seen, the outer product of hT and h is given by a N×N matrix whose elements are equal to 0 except for h0h0. Thus, this gives a two-dimensional non-ISI pulse response.

In the hologram recording/reproducing system, the SLM 16 and the image sensor 28 are configured to include a set of discrete pixels. Therefore, hereinafter, the two-dimensional intersymbol interference will be referred to as inter-pixel interference or IPI in short.

FIG. 11 illustrates various cross sections (at sampling points Y=512, Y=520, and Y=527) of a pulse response (in a lower part of the figure) satisfying the two-dimensional non-IPI Nyquist's first criterion.

In the cross section at the sampling point Y=512, the response has a value of "1" at the middle of X the direction (at a sampling point=512), and the response has a value of "0" at any other sampling point in the X direction. In the cross section at the point Y=520 between sampling points Y=512 and Y=528, the response has a non-zero value smaller than 1 at a sampling point X=512 which is the center in the X direction, and the response has a value of 0 at any other sampling point in the X direction. In the cross section at the sampling point Y=528, the response has a value substantially equal to 0 at all sampling points.

FIGS. 12A to 12C illustrate pulse responses (in upper parts of the figures) and frequency characteristics (in lower parts of the figures) of equalization according to the two-dimensional non-IPI Nyquist's first criterion, for a roll-off factor r=0.0 (FIG. 12A), for r=0.5 (FIG. 12B), and for r=1.0 (FIG. 12C). In these figures, it is assumed that the oversampling rate is 16×16.

In the case of r=0.0, as shown in FIG. 12A, the characteristic has a narrowest bandwidth and a square-shape frequency characteristic. When r=0.5, as shown in FIG. 12B, corners of the square of the frequency characteristic are rounded. When r=1.0, as shown in FIG. 12C, the characteristic has a loosest restriction on the bandwidth, and the square is rounded into a nearly circular shape.

Referring again to FIG. 9, the equalizing filter 44 performs the waveform equalization on the image signal subjected to the correction performed by the fill factor correcting unit 43, so as to achieve characteristics according to the two-dimensional non-IPI Nyquist's first criterion.

The resultant image signal is supplied to the resampler 45.

The resampler 45 identifies the position of each data pixel of the SLM 16 in the equalized image signal supplied from the equalizing filter 44, and acquires the amplitude of each identified data pixel (this process is called resampling).

To make it possible to identify data pixel position in the image signal, predetermined pattern data called a sync may be embedded in recorded data. In this case, the resampler 45 searches the image signal for the sync embedded as the predetermined pattern and identifies each data pixel position on the basis of the detected sync.

The method of identifying data pixel positions is not an essential part of the present embodiment of the application, and there is no particular restriction on the method. Thus, a further detailed description thereof is omitted herein.

After each data pixel position is identified, the amplitude of each data pixel is determined, for example, by calculating the amplitude of each data pixel from values of nearby data pixels using interpolation. The interpolation is widely used in the image processing technology, and known interpolation techniques include a bi-linear interpolation method, a cubic convolution method, and a bicubic spline method.

Instead of calculating the amplitude, a signal value closest in timing to each identified pixel position may be employed as the amplitude of the data pixel. This method is known as a nearest neighbor method.

The amplitude of each data pixel may be determined in various manners, and there is no particular restriction on the method of determining the amplitude.

The data discriminator 46 discriminates data (determines the bit value of data) on the basis of the amplitude of each data pixel supplied from the resampler 46.

As described above, in the recording operation, each 8 bits of data to be recorded is converted by sparse coding into a data array (a symbol) in the form of a block including 4×4=16 bits, and resultant each symbol is mapped onto a hologram page.

The sparse coding is performed, for example, such that m bits of a total of 16 bits of the resultant code are set to "1" and the other bits are set to "0". Correspondingly, the data discriminator 46 extracts m data pixels from each symbol in the order of decreasing amplitude starting from the highest amplitude, and determines that these extracted data pixels have a bit value of "1" and the other data pixels in the symbol of interest have a bit value of "0". This discrimination method is called a sort detection method.

The bit values detected in units of symbols via the sort detection process are supplied to the sparse code decoder 47.

If the sparse code decoder 47 receives the bit values of each symbol, the sparse code decoder 47 decodes the sparse code of each symbol such that each symbol including 4×4=16 bits is converted into an original 8-bit data thereby reproducing the recorded data. Thus, reproduced data is obtained.

2. Reading Operation

In the present embodiment, as described above, spectrum is spread using the phase mask, and a page area size is reduced by limiting the band of signal light by using the aperture 18b, thereby to achieve a high recording density.

Furthermore, distortion of the read signal caused by the phase mask and/or the aperture is handled by performing the waveform equation using the equalizing filter 44 thereby preventing intersymbol interference from occurring.

However, in the hologram recording/reproducing process, as described above, the image sensor 28 is not capable of detecting phase information, and thus the image sensor 28 is not capable of linearly reading "+1" and "−1" recorded by phase modulation using the phase mask. Therefore, even if the waveform equalization is performed using the equalizing filter 44 to prevent intersymbol interference, an effective improvement in frequency characteristic is not achieved. That is, it is difficult to achieve both high recording density by spreading the spectrum using the phase mask thereby to allow the recording medium to be used uniformly, and high recording density by reducing the page area size by limiting the band using the aperture.

In view of the above, the present embodiment provides a technique of linearly reading phased-modulated data thereby making it possible to perform equalization for preventing intersymbol interference in an effective manner thereby to achieve high recording density.

To make it possible to linearly read data, the present application includes a following process in the reproducing operation.

That is, in the reproducing operation according to the present embodiment, in addition to reference light applied to the holographic recording medium 22, coherent light is also applied which has the same phase as that of the reproduced image obtained in the form of diffracted light from the holographic recording medium 22.

More specifically, in the reading process, coherent light having the same phase as the phase of the reproduced image and having intensity greater than the absolute value of the minimum value of the amplitude of the reproduced image is applied together with the reference light to the holographic recording medium 22.

For the above purpose, the intensity/phase modulation controller 29 shown in FIG. 5 performs the following process in the reproducing operation.

In the method using no additional coherent light described above, in the reproduction operation, the mapping unit 32 in the intensity/phase modulation controller 29 produces a data pattern such that the reference light area A1 has the same pattern of 0s and 1s as the pattern used in the recording operation but the other area is filled with "0", and the intensity modulation driver 33 drives each pixel of the intensity modulator 16a in accordance with the produced data pattern. In contrast, in the present embodiment, light is also passed through the signal light area A2 to generate coherent light with a uniform intensity.

More specifically, the mapping unit 32 produces a data pattern such that the reference light area A1 has the same pattern of "0"s and "1s" as that used in the recording operation, the entire signal light area A2 is filled with a predetermined value other than "0", and other area is entirely filled with "0". The resultant data pattern is supplied to the intensity modulation driver 33.

As described above, the intensity modulator 16a is capable of changing the transmittance in accordance with the driving voltage applied to each pixel. That is, the transmittance can be changed not only discretely between "0" and "1" but can also be changed continuously within the range from "0" to "1".

In accordance with the data pattern supplied from the mapping unit 32, the intensity modulation driver 33 drives the pixels such that pixels corresponding to "1" in the data pattern are driven by a voltage that causes the light to have a highest intensity (for example, intensity corresponding to the level of "255" in the 256-level scale), pixels corresponding to "0" are driven by a voltage that causes the light to have a lowest intensity, and pixels in the signal light area A2 are driven by a voltage corresponding to the assigned value other than "0" thereby to obtain coherent light with intensity corresponding to the value assigned by the mapping unit 32 to the signal light area A2.

As described above, the intensity of coherent light can be variably set according to the value assigned by the mapping unit 32 to the signal light area A2. Note that as described above, the intensity of the coherent light is needed to be greater than the absolute value of the minimum value of the amplitude of the reproduced image. To satisfy this requirement, the correspondence between the value specified by the mapping unit 32 and the obtained intensity of coherent light is determined in advance, and the value to be assigned to the signal light area A2 is determined in accordance with the determined correspondence.

Figure 13A:
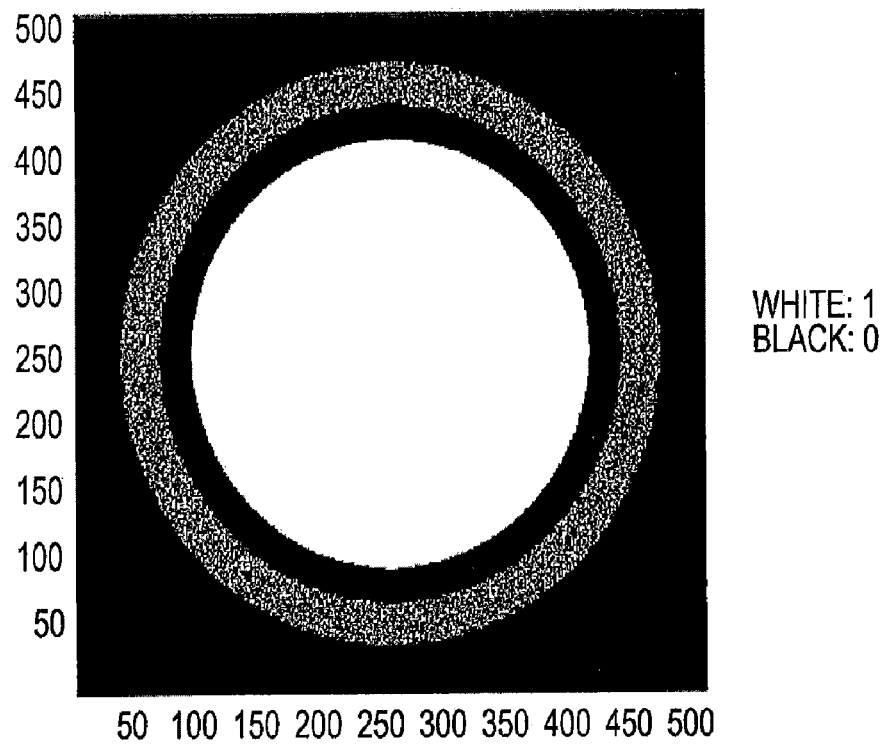
FIG. 13A illustrates an example of an image output from an intensity modulator in a state in which additional coherent light is applied.

FIG. 13A illustrates an example of an image which is output from the intensity modulator 16a as a result of the above-described operation of the mapping unit 32 and the intensity modulation driver 33.

In FIG. 13A, bits "1" are represented in white and bits "0" are represented in black. As can be seen, the driving of the signal light area A2 with the predetermined driving voltage causes light to pass through the signal light area A2. In this specific example shown in FIG. 13A, the signal light area A2 has a value of "1" over the entire area thereof, and thus the entire area of the signal light area A2 is expressed in white in the figure.

Note that the reference light area A1 has the same pattern of "0s" and "1s" as that used in the recording operation.

Referring again to FIG. 5, in reproducing operation, the following process is performed by the phase modulation pattern generator 34.

The phase modulation pattern generator 34 produces the data pattern such that the reference light area A1 of the phase modulator 16b has the same phase modulation pattern as that used in the recording operation, and the signal light area A2 is entirely filled with a predetermined value. The phase modulation pattern generator 34 produces data corresponding to the data pattern for all effective pixels of the phase modulator 16b, and the phase modulation pattern generator 34 supplies the produced data to the phase modulation driver 35.

As with the intensity modulator 16a, the phase modulator 16b may also be configured to variably drive each pixel according to the driving voltage so that the phase of each pixel is modulated in the range from "0" to "π" according to the driving voltage. Correspondingly, the phase modulation driver 35 may be configured to drive each pixel of the phase modulator 16b by applying thereto a driving voltage corresponding to the value in the range from "0" to "1" (0 to 255 in the case of the 256-level scale) supplied from the phase modulation pattern generator 34.

In the case where the phase modulation pattern generator 34 produces the data pattern such that the signal light area A2 is filled with the predetermined value, the phase modulation driver 35 drives each pixel in the signal light area A2 of the phase modulator 16b by applying thereto the voltage corresponding to the value, assigned to each pixel such that the phase of the coherent light passing through the signal light area A2 is variably set to the specified value.

Note that as described above, the phase of the coherent light is needed to be equal to the phase of the reproduced image. To achieve the coincidence of the phase in the case in which reference light is phase-modulated by 0 or π as in the present embodiment, the phase of the coherent light may be modulated by π/2 (see, for example, Kogelnik, H "Coupled wave theory for thick hologram grating", Bell System Technical Journal, 48, 2909-47).

To achieve phase modulation by π/2, the phase modulation pattern generator 34 assigns a value of 0.5 (127 in the case of the 256-level scale) to the signal light area A2.

Figure 13B:
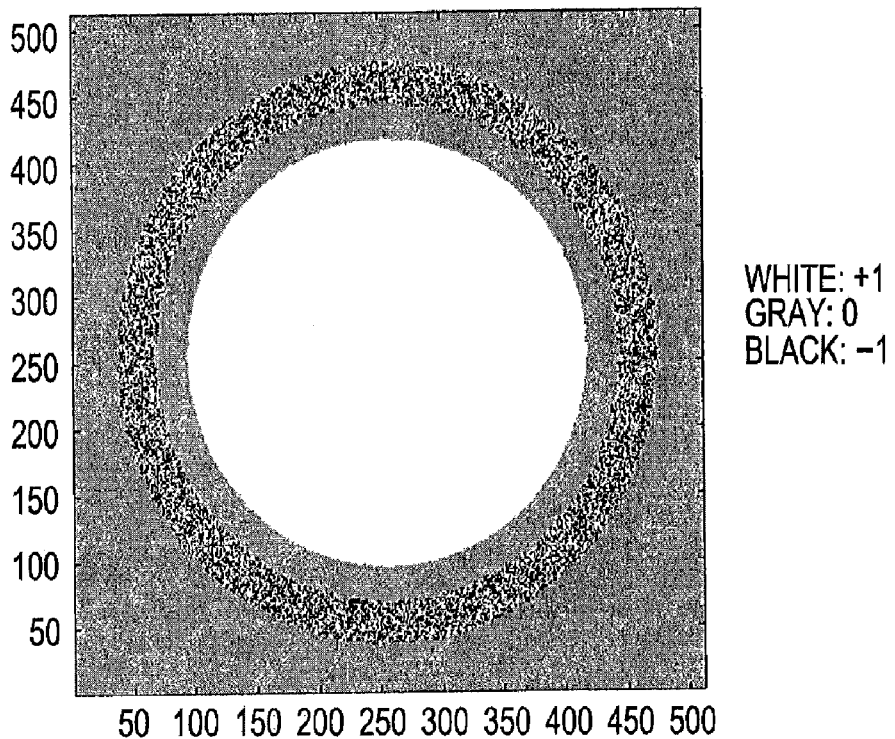
FIG. 13B illustrates an example of an image output from a phase modulator in the state in which additional coherent light is applied.

FIG. 13B illustrates an example of an image which is output from the phase modulator 16b as a result of the above-described operation of the phase modulation pattern generator 34 and the phase modulation driver 35. In FIG. 13B, as in FIG. 7B, bits "+1s", "0s", and "−1s" are represented in white, gray, and black.

In the reproducing operation, as a result of the process performed by the intensity/phase modulation controller 29, the reference light and the coherent light having the same phase as the phase of the reproduced image and having intensity greater than the absolute value of the minimum value of the amplitude of the reproduced image are applied to the holographic recording medium 22. Thus, in the present embodiment, as a result of illumination of the holographic recording medium 22 with the coherent light and the reference light, diffracted light (reproduced image) corresponding to the recorded data is obtained, and the diffracted light is sensed by the image sensor 28 whereby the data is finally read.

Figure 14:
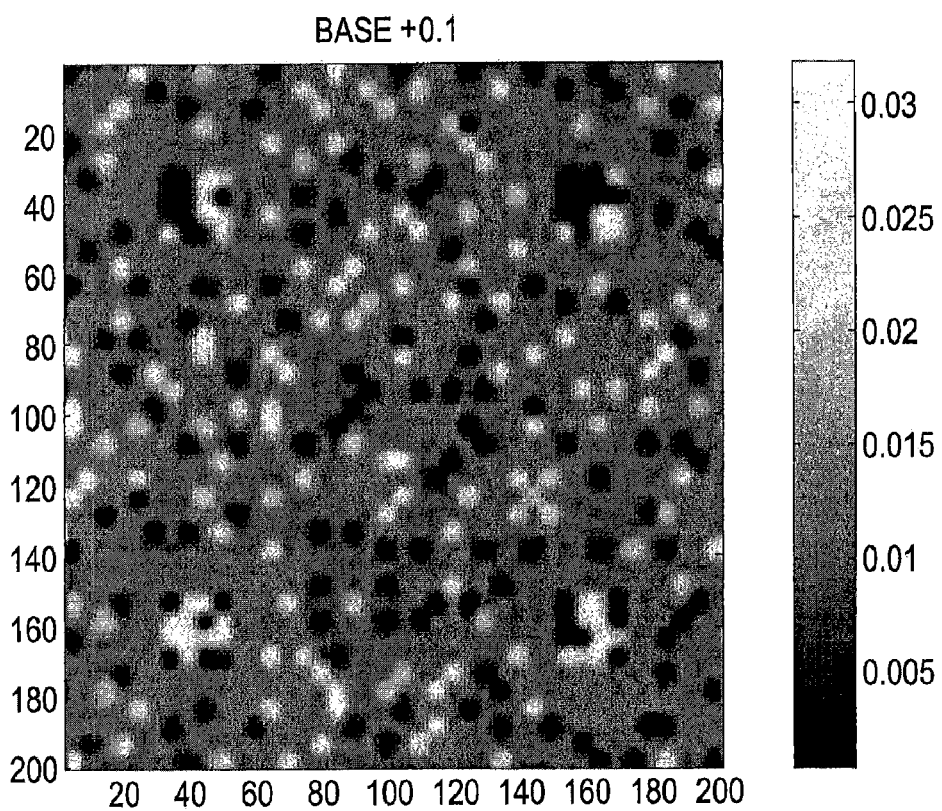
FIG. 14 illustrates an example of a reproduced image obtained in a state in which additional coherent light with an intensity of 0.1 is applied.
Figure 15:
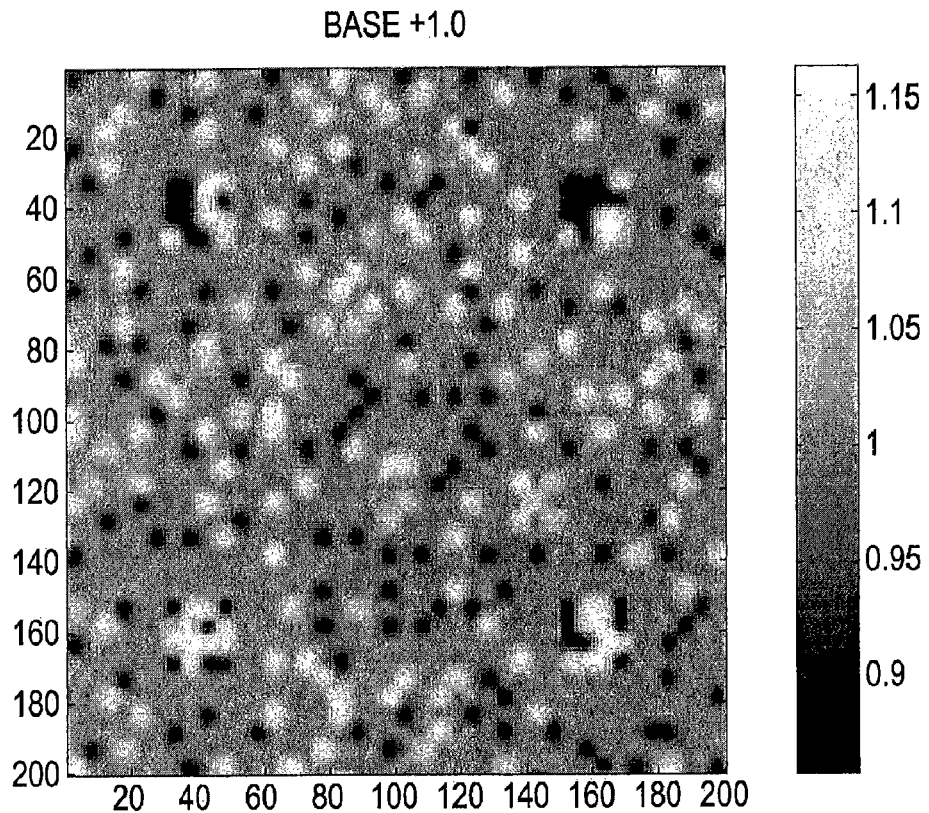
FIG. 15 illustrates an example of a reproduced image obtained in a state in which additional coherent light with an intensity of 1.0 is applied.

FIGS. 14 and 15 illustrate examples of reproduced images obtained when the coherent light is additionally applied to the holographic recording medium 22 in the above-described manner, for the case where the coherent light has an intensity of 0.1 (FIG. 14) and for the case where the coherent light has an intensity of 1.0 (FIG. 15).

In these figures, amplitudes (light intensity) of reproduced images are represented by gray levels. The darker the gray level, the lower the intensity.

As can be seen from these figures, also in the case where additional coherent light is applied to the holographic recording medium 22, a pattern corresponding to the recorded data is obtained in the reproduced image.

Furthermore, as can be seen comparison between FIGS. 14 and 15, the increase in the intensity of added coherent light causes the center of the contrast to be shifted toward white. This means that it is possible to increase the amplitude of the reproduced image by the same amount over the entire area by increasing the intensity of the coherent light.

In the present embodiment, the reproduced image obtained by applying the coherent light in addition to the reference light to the holographic recording medium 22 is then detected by the image sensor 28. The resultant image signal output from the image sensor 28 is then subjected to a process including calculating the square root of the image signal and subtracting a value corresponding to the coherent light from the square root.

For the above purpose, the data reproduction unit 30 includes the linearization unit 41 as shown in FIG. 9.

As shown in FIG. 9, the linearization unit 41 includes a square root calculator 41a and a subtractor 41b.

The square root calculator 41a calculates the square root of each pixel value of the image signal output from the image sensor 28 and supplies the result to the subtractor 41b.

The subtractor 41b subtracts a value corresponding to the intensity of the added coherent light from the square root supplied from the square root calculator 41a. More specifically, the value corresponding to the intensity of the coherent light set to be greater than the absolute value of the minimum value of the amplitude of the reproduced image is determined in advance, and this value is subtracted in the subtraction process described above.

For example, when the minimum amplitude of the reproduced image is −0.078, the intensity of the coherent light is set to a value, for example, 0.1, greater than the absolute value 0.078 of −0.078, 0.1 is subtracted from the square root.

The image signal subjected to the subtraction performed by the subtractor 41b is output from the linearization unit 41 and supplied to the up converter 21.

The linear reading operation is achieved by the sequence of processes including the addition of the coherent light, the calculation of the square root, and the subtraction of the value corresponding to the added coherent light, as described in further detail below.

The optical system of the recording/reproducing apparatus 1 shown in FIG. 1 (and also an optical system of a general hologram recording/reproducing system) includes the SLM, the objective lens, the medium, the eye lens, and the image sensor disposed in a form called a 4f optical system in which the elements are spaced from each other by a distance equal to the focal length of the lens. This configuration is also called a Fourier transform hologram system.

In the Fourier transform hologram system, the recording/reproducing operation is performed as follows.

The data pattern to be recorded is Fourier-transformed by the SLM 16 and projected onto the holographic recording medium 22. Conversely, the signal (reproduced image) read from the holographic recording medium 22 is subjected to the inverse Fourier transform and projected onto the image sensor. The image sensor detects the intensity of light corresponding to square of the absolute value of the amplitude of the wave front of light incident on the image sensor.

In the hologram recording/reproducing system, if reading is performed by applying only reference light to the holographic recording medium 22 without applying no additional coherent light, then the following problems can occur. In the following discussion, it is assumed by way of example that the maximum and minimum values are 0.078 and −0.078 in terms of the amplitude of the reproduced image corresponding to bits of "+1" and "−1" produced as a result of phase modulation by the phase mask.

In this case, the signal output from the image sensor 28 corresponding to the maximum value of the amplitude of the reproduced image has a value of 6.1E−3 which is equal to the square of the maximum value of the amplitude 0.078, and the signal output from the image sensor 28 corresponding to the minimum value of the amplitude of the reproduced image also has a value of 6.1E−3 which is equal to the square of the minimum value of the amplitude −0.078. Because both bits "+1" and "−1" are detected as the same value by the image sensor 28, it is difficult to correctly reproduce the original information even if any further signal processing is performed. That is, nonlinear distortion occurs.

In contrast, in the present embodiment in which the holographic recording medium 22 is illuminated with reference light and additional coherent light having the same phase as that of the reproduced image and having an intensity greater than the absolute value of the minimum value of the amplitude of the reproduced image, a value corresponding to the intensity of the additional coherent light is added to the reproduced image. Because the coherent light provides a DC component having no variation in amplitude and phase, the coherent light is focused onto one point on the holographic recording medium 22 without causing interference with a recorded hologram page. After the coherent light strikes the holographic recording medium 22, the coherent light having the same phase as that of the reproduced image is added to the reproduced image when the reproduced image obtained as a result of illumination of the holographic recording medium 22 with the reference light is focused on the image sensor 28. As a result, a particular value is added to the amplitude of the reproduced image.

This can be seen from comparison between FIGS. 14 and 15.

For example, if the intensity of the additional coherent light is set to 0.1 which is greater than the minimum value of the amplitude of the reproduced image, 0.1 is added to the reproduced image. As a result, the maximum value 0.078 increases to 0.1782 which is detected as 0.032 by the image sensor 28, and the minimum value −0.078 increases to 0.0222 which is detected as 4.8E−4 by the image sensor 28. The square root of each value output from the image sensor 28 is calculated and the added value is subtracted from the calculated square root. Thus, both the maximum value of the amplitude 0.078 (0.178−0.1=0.078) and the minimum value −0.078 (0.022−0.1=−0.078) are correctly reproduced.

In the present embodiment, as described above, phase information given by the phase mask can be correctly reproduced, that is, information can be linearly read.

In the example described above with reference to FIG. 15, the intensity of the added coherent light is set to 1.0. In this case, the intensity is detected by the image sensor 28 as $(0.078+1.0)^2 = 1.162$ and also as $(-0.078+1.0)^2 = 0.850$. The square roots thereof are calculated as 1.078 and 0.922, and the results of subtraction of the added value are given as 1.078−1.0=0.078 and as 0.922−1.0=−0.078. Thus, original two values 0.078 and −0.078 are correctly reproduced.

Thus, the intensity of the added coherent light is determined such that no negative values are detected as positive squared values by the image sensor 28. That is, the intensity of the added coherent light is set to be greater than the absolute value of the minimum value of the amplitude of the reproduced image.

In the present embodiment, as described above, for data recorded in three levels "+1", "0", and "−1" using a phase mask thereby spreading the spectrum to achieve high recording density, it is possible to correctly read not only "0" but also "−1" and "+1" including phase information, that is, it is possible to linearly read information.

Thus, the linear reading capability makes it possible to effectively perform the waveform equalization using the equalization filter 44 to prevent intersymbol interference (interpixel interference), which makes it possible to effectively limit the band using the aperture 18b. Thus, the present embodiment of the application makes it possible to achieve high recording density by spreading the spectrum using the phase mask thereby to allow the recording medium to be used uniformly, and high recording density by reducing the page area size by limiting the band using the aperture, without encountering any conflict between the two approaches.

3. Experimental Results

FIGS. 17 to 27 illustrate results of experiments (simulations) performed to check effectiveness of the embodiments described above.

It is difficult to perform physical experiments for various parameters or various conditions. Therefore, instead, the hologram recording/reproducing operation has been simulated for various parameters and various conditions. Results are described below.

Figure 16:
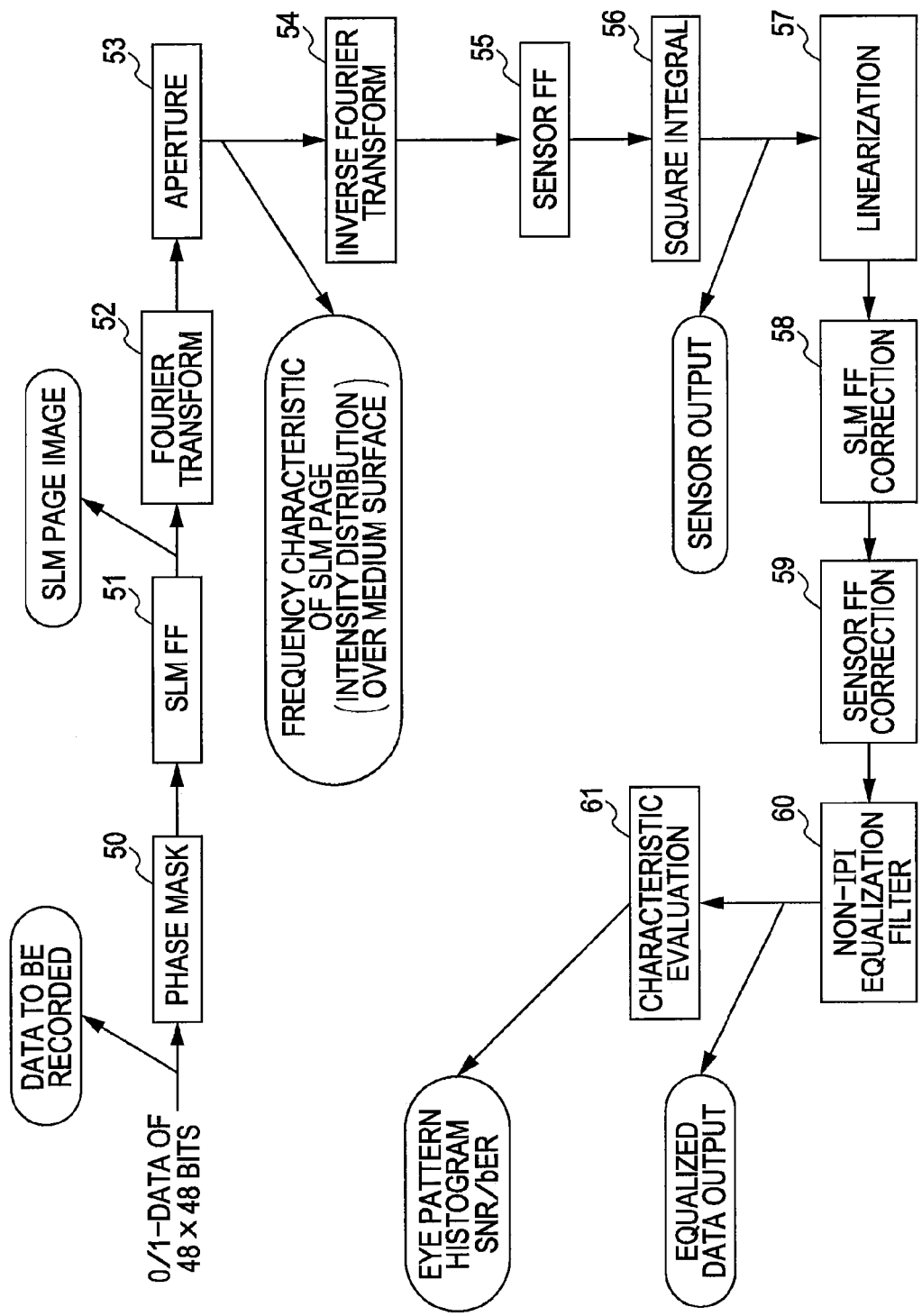
FIG. 16 illustrates a simulator used in experiments.

First, referring to FIG. 16, a simulator used to perform the simulation is described. FIG. 16 illustrates the procedure of calculation performed by the simulator.

As shown in FIG. 16, data to be recorded is given in the form of a 48 bits×48 bits square. Two levels "0" and "1" of the data to be recorded are converted into three levels "+1", "0", and "−1" via a phase mask process 50, and then convoluted with a characteristic corresponding to the fill factor of the SLM 16 in a SLM-FF process 51. As a result of the SLM_FF process 51, an SLM page image is obtained.

The SLM page image obtained via the SLM_FF process 51 is Fourier-transformed in a Fourier transform process 52 and is subjected to a high-frequency band rejection in an aperture process 53. As a result of the aperture process 53, a signal component to be recorded on the holographic recording medium 22 is obtained. In the present simulation, the frequency characteristic (intensity distribution over the surface of the medium) of the SLM page is analyzed based on the result of the aperture process 53.

In the present simulation, the medium is assumed to be ideal, and thus the signal subjected to the high-frequency band rejection in the aperture process 53 is assumed to be inverse-Fourier-transformed into the correct original signal in an inverse Fourier transform process 54. After the inverse Fourier transform, the signal is convoluted with a characteristic corresponding to the fill factor of the image sensor 28 in a sensor_FF process 55. Thereafter, the square integral of the resultant signal is determined in a square integral calculation process 56. The result corresponds to the signal output from the image sensor 28.

Furthermore, to simulate the reading operation of the present embodiment, the square root of the square integral is calculated and the value corresponding to the added coherent light is subtracted from the result in a linearization process 57.

In a SLM_FF process 58, a correction associated with the fill factor of the SLM 16 is performed. In a sensor_FF process 59, a correction associated with the fill factor of the image sensor 28 is performed. Thereafter, equalization is performed in a non-IPI equalization filtering process 60 to obtain a non-IPI characteristic with roll-off corresponding to the aperture 18b. In a characteristic evaluation process 61, an eye pattern and a histogram are produced and SNR (signal-to-noise ratio) and bER (bit error rate) are evaluated.

In the simulation, the fill factor of the SLM 16 was assumed to be 0.95 (0.90 as measured in area) and the fill factor of the image sensor 28 was assumed to be 0.65 (0.42 as measured in area).

Results of experiments by simulation are described below.

FIGS. 17 to 22 illustrate results of simulations of the hologram recording/reproducing operation using no additional coherent light for the case where the phase mask is not used and for the case where the phase mask is used. These results will be compared with results of the hologram recording/reproducing operation according to the embodiments of the application described later.

FIGS. 17 and 18 illustrate simulated effects of the waveform equalization using the two-dimensional non-IPI equalizer described above for the case where no phase mask is used (FIG. 17) and for the case where the phase mask is used (FIG. 18).

Note that FIGS. 17 and 18 illustrate only effects of the waveform equation using two-dimensional non-IPI equalizer, and the effect of the high-frequency band rejection by the aperture is not included.

In FIGS. 17A to 17C, to illustrate the effects of the equalization using no phase mask, a central part of an image output from the sensor is shown in an upper part of each figure and an eye pattern taken in a horizontal direction of the image is shown in a lower part of each figure for a roll-off factor r=0.0 (FIG. 17A), r=0.5 (FIG. 17B), and r=1.0 (FIG. 17C).

In FIGS. 17A to 17C and also in other figures representing images, intensity of images is represented by gray levels. Darker gray levels indicate lower intensities, and brighter gray levels indicate higher intensities.

In the case of the equalizer with roll-off factor r=1.0, the equalizer has a widest bandwidth, and the image has clear edges as shown in the upper part of FIG. 17C, which means that the data is recorded in a very good manner. In this case, the eye pattern has a large opening as shown in the lower part of FIG. 17C. As the roll-off factor r decrease (as shown in FIG. 17B and FIG. 17C), blur of the image increases. However, as can be seen from eye patterns shown in the lower parts of FIGS. 17B and 17C, the image has an amplitude of 4E−3 corresponding to "1" or an amplitude of 0.0 corresponding to "0" at sampling points which occur every 16 points, which indicates that no IPI occurs. Although not shown in the figures, similar eye patterns are obtained also in a vertical direction.

In FIGS. 18A to 18C, to illustrate the effects of the equalization using a phase mask, a central part of an image output from the sensor is shown in an upper part of each figure and an eye pattern taken in a horizontal direction of the image is shown in a lower part of each figure for a roll-off factor r=0.0 (FIG. 18A), r=0.5 (FIG. 18B), and r=1.0 (FIG. 18C).

In the case where the phase mask is used in the conventional hologram recording process, the phase is randomly modulated by "0" or "π", and thus data is recorded in three levels "+1", "0", and "−1". In this case, even for the roll-off factor r=1.0 with the widest bandwidth, the central part of the image is greatly different from an original image, and black areas with an amplitude of −4E−3 corresponding to "−1" appear. When the roll-off factor is small, the image is further different from the original image. The difference is so large that it is difficult to guess the original image. However, as can be seen from eye patterns having three levels, the image has an amplitude of +4E−3 corresponding to "1", an amplitude of 0.0 corresponding to "0", or an amplitude of −4E−3 corresponding to "−1", at sampling points which occur every 16 points, which indicates that no IPI occurs.

FIGS. 19 and 20 illustrate results of simulation of the hologram recording/reproducing process using the aperture for reducing the page area size on the medium, for the case where no phase mask is used (FIGS. 19A to 19C) and for the case where the phase mask is used (FIGS. 20A to 20). FIGS. 19A and 20A illustrate images output from the sensor when the aperture was set to 1.0, FIGS. 19B and 20B illustrate images output from the sensor when the aperture was set to 1.5, and FIGS. 19C and 20C illustrate images output from the sensor when the aperture was set to 2.0. The central part of the image output from the image sensor is shown in the upper part of each figure, and the square root thereof is shown in the lower part.

Note that the images shown in these figures have a size greater than the original size of the images output from the image sensor by a factor equal to the fill factor to simulate the effect of the up converter.

As for the aperture size, "aperture=1.0" denotes a square-shape aperture with the Nyquist size, and "aperture=2.0" denotes a size 2 times greater (4 times greater in area) than "aperture=1.0".

As can be seen from FIGS. 19A to 19C, in the case where no phase mask is used, the images output from the sensor are similar to the SLM page image, although blur increases with decreasing the aperture size.

On the other hand, as shown in FIGS. 20A to 20C, in the case where the phase mask is used, white areas with high intensity have smaller sizes than those shown in FIGS. 19A to 19C in which no phase mask is used. This is because two adjacent areas having the same high intensity but corresponding to different levels "+1" and "−1" in the image produced using no phase mask are divided by an area having a low intensity which appears in the image produced using the phase mask.

Blur of white areas increases with decreasing aperture size, but the increase in blur does not cause the black area with low intensity between each two white areas with high intensity to disappear. As can be seen from FIGS. 20A to 20C, blur of the image increases with decreasing aperture size while maintaining original continuity and discontinuity among areas, although the image produced with the aperture with the size of 1.0 is very different from the image output from the SLM.

FIGS. 21 and 22 illustrate effects of the equalization using the equalization filter for the case where high-frequency band rejection is performed with "aperture=1.0" (FIGS. 21A and 22A), with "aperture=1.5" (FIGS. 21B and 22B), and with "aperture=2.0" (FIGS. 21C and 22C). In these figures, a central part of an image output from the image sensor is shown in the upper part of each figure, and an eye pattern of the absolute value taken in a horizontal direction is shown in the lower part of each figure.

In these figures, the square root of the image output from the sensor is calculated, the correction is made on the resultant image in terms of the fill factor of the SLM and the fill factor of the image sensor, the equalization is further performed using the equalization filter having the two-dimensional non-IPI characteristic, and the final result is shown.

FIGS. 21A to 21C illustrate the effects of the equalization using the equalization filter for the case where no phase mask is used.

In this case, because negative amplitudes are folded into positive amplitudes, large scattering is observed in eye patterns in the case where the aperture size is small, compared with the eye patterns shown in FIGS. 17A to 17C. However, eye patterns have a large enough opening. Therefore, in the case where no phase mask is used, when the aperture is used to reduce the page area size thereby to achieve high recording density, it is possible to suppress interpixel interference by performing the equalization using the equalization filter.

FIGS. 22A to 22C illustrate the effects of the equalization using the equalization filter for the case where the phase mask is used.

Also in this case, negative amplitudes are folded into positive amplitudes, and thus the equalization does not provide good effects when the aperture size is small, and large scattering is observed in eye patterns. For example, although the eye pattern has a large opening when the aperture size is large as shown in FIG. 22C, large scattering is observed in the eye pattern and thus SNR is low, compared with that obtained when no phase mask is used (FIG. 21).

FIGS. 23 to 26 illustrate results of simulation of the hologram recording/reproducing process using additional coherent light according to the embodiments of the application.

FIGS. 23A to 23D illustrate the effects of the amount of added coherent light on the image output from the image sensor. FIG. 23A illustrates an image output from the image sensor when the amount of added coherent light is 0.0, FIG. 23B illustrates an image when the amount is 0.5, FIG. 23C illustrates an image when the amount is 1.0, and FIG. 23D illustrates an image when the amount is 1.5. In these figures, a central part of the image is shown in the upper part of each figure, and the central part of the image represented in square root is shown in the lower part of each figure.

In the simulation shown in FIGS. 23A to 23D, the aperture size was set to a minimum value, i.e., 1.0.

In these figures (and also in FIGS. 24A to 24D and in FIGS. 25A to 25D), FIG. 23A illustrates an image output from the image sensor when the amount of added coherent light is 0.0, FIG. 23B illustrates an image when the amount is 0.5, FIG. 23C illustrates an image when the amount is 1.0, and FIG. 23D illustrates an image when the amount is 1.5.

As can be seen from FIGS. 23A to 23D, the amplitude simply increases with increasing amount of added coherent light. When the amount of added coherent light is 0.0, as shown in FIG. 23A, because negative values are folded into positive values when the square root is calculated, there is a great difference between the image shown in the upper part and the image shown in the lower part. If the amount of added coherent light is increased, negative values disappear, and thus the difference between the image shown in the upper part and the image shown in the lower part decreases with increasing amount of added coherent light. That is, the addition of a sufficiently large amount of coherent light makes it possible to linearly read data.

FIGS. 24A to 24D illustrate the effects of the equalization using the equalization filter according to the embodiment of the application. In these figures, a central part of an image subjected to the equalization using the equalization filter is shown in the upper part of each figure, and an eye pattern of the absolute value of the image taken in a horizontal direction is shown in the lower part of each figure. Note that the results shown in these figures are for those obtained in the case where the subtraction of the value corresponding to the added coherent light is not performed.

In the case where no coherent light is added, as shown in FIG. 24A, nonlinear distortion occurs due to folding of negative values into positive values. With increasing amount of added coherent light, the image and the eye pattern become more similar to those obtained in the case where no aperture is used (FIGS. 18A to 18C). Because the images and the eye patterns shown in FIGS. 24A to 24D are for those obtained in the case where the subtraction of the value corresponding to the added coherent light is not performed, the eye patters are of the absolute values. Note that there is no negative value, the eye patterns have three levels.

FIGS. 25A to 25D illustrate absolute-value eye patterns (in upper parts) and histograms (in lower parts) for the case where the value corresponding to the added coherent light is subtracted.

More specifically, the equalization using the equation filter is performed on the image subjected to the subtraction of the value corresponding to the added coherent light, and the absolute values of the results are further calculated and shown in FIGS. 25A to 25D. As a result, both "+1" and "−1" are treated as "1%".

In FIGS. 25A to 25D, in addition to histograms, SNR and bER are also shown in the lower parts of the figures. In FIGS.

25A to 25D (and also in FIGS. 26A and 26B), SNR denotes the linear SNR which is widely used in the hologram recording/reproducing systems and which is given by SNR=$(\mu 1-\mu 0)/\sqrt{(\sigma 0^2+\sigma 1^2)}$, where $\mu 1$ and $\mu 0$ are respectively average values of "1" and "0", and $\sigma 0$ and $\sigma 1$ are standard deviations of "1" and "0". bER denotes the bit error rate in binary value discrimination using average values $\mu 1$ and $\mu 0$ as threshold values.

Figure 26A:
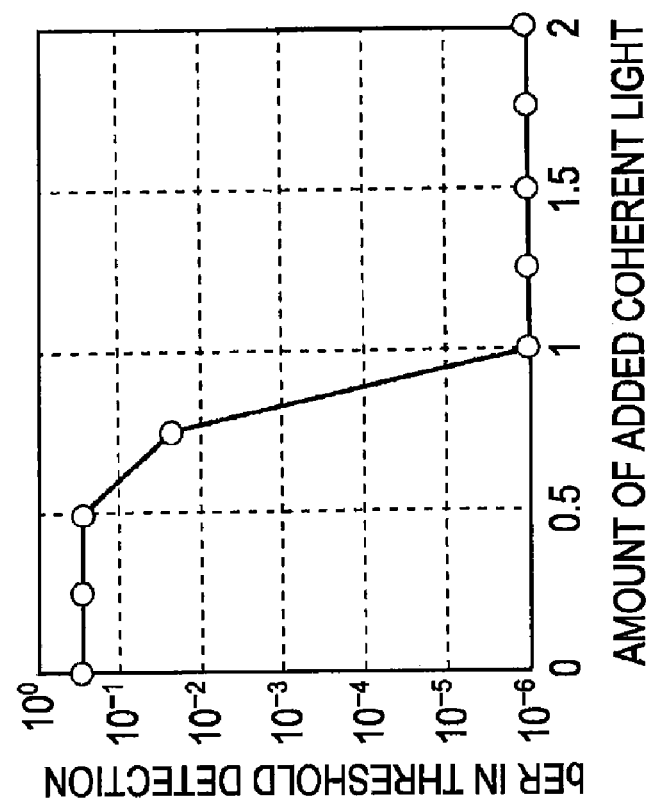
FIG. 26A shows SNR as a function of the amount of added coherent light and FIG. 26B shows bER as a function of the amount of added coherent light, for a case where data is linearly read according to an embodiment.
Figure 26B:
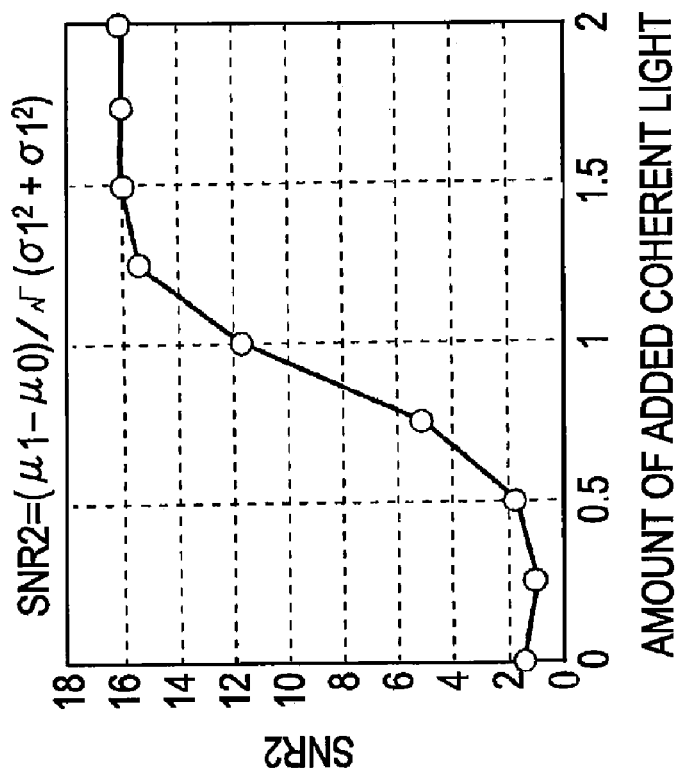

FIG. 26A shows SNR as a function of the amount of added coherent light and FIG. 26B shows bER as a function of the amount of added coherent light in the reading operation according to the embodiment of the application.

As shown in FIGS. 26A and 26B, the embodiment of the application provides excellent characteristics in terms of SNR and bER. In particular, as shown in FIG. 26B, by adding coherent light with intensity of 1.0 or greater, it is possible to achieve an error-free reading operation. On the other hand, the SNR reaches a substantially saturated value at an amount of added coherent light of 1.5, and no further increase in SNR occurs with further increasing amount of added coherent light.

As described above, the embodiment of the application makes it possible to linearly read data and also provides very high SNR and very low bER.

4. Modifications

Although the present application has been described above with reference to specific embodiments, the present application is not limited to those embodiments.

For example, in the embodiments described above, the present application is applied to a recording/reproducing apparatus capable of recording and reproducing data. The present application is also applicable to a reproducing apparatus dedicated to reproducing data.

In the embodiments according to the application described above, by way of example, the holographic recording medium 22 is assumed to be a reflection-type holographic recording medium having a reflective film. However, the present application is also applicable to a transmission-type holographic recording medium having no reflective film.

In this case, the reproducing section does not need to include the beam splitter (17) for directing diffracted light produced as a result of illumination by reference light to the image sensor. In this case, an objective lens may be disposed on a side opposite to a side on which laser light is incident so that diffracted light produced as a result of illumination of the holographic recording medium with the reference light passes through the holographic recording medium and is incident on the objection lens thereby to transmit the diffracted light to the image sensor via the objective lens.

In the embodiments described above, by way of example, the present application is applied to the coaxial configuration in which reference light and signal light are provided in a coaxial fashion. The application may also be applied to other configurations such as a two-beam configuration in which signal light and reference light are separately provided in the recording operation.

In the two-beam configuration, in the recording operation, signal light and reference light are separately provided such that they are incident at different angles on the holographic recording medium 22. However, in the reproducing operation, reference light and additional coherent light are provided coaxially in a similar manner to the embodiments described above. More specifically, in a case where the two-beam configuration is employed in a recording/reproducing apparatus capable of recording and reproducing data such as the recording/reproducing apparatus 1 according to the embodiment, a set of a first laser diode for generating signal light and a first SLM for performing intensity modulation and phase modulation in the recording operation, and a set of a second laser diode for generating reference light and a second SLM for performing intensity modulation and phase modulation may be disposed separately, and an optical system may be disposed such that the signal light and the reference light are incident at different angles on the holographic recording medium 22 via the optical system. In the reproducing operation, the reference light and additional coherent light may be generated in the coaxial manner by the SLM, which is used to generate reference light in the recording operation, in a similar manner to the embodiments described above.

As can be understood from the above discussion, an apparatus dedicated to reproduction may be realized by configuring the apparatus in a similar manner to the reproduction section in the recording/reproducing apparatus shown in FIG. 1.

In the embodiments described above, by way of example, the intensity modulator for performing the spatial light intensity modulation thereby to generate signal light and/or reference light is formed integrally with the phase modulator for performing the spatial light phase modulation on the signal light and/or the reference light. Alternatively, they may be formed separately, for example, as shown in FIG. 27.

Figure 27:
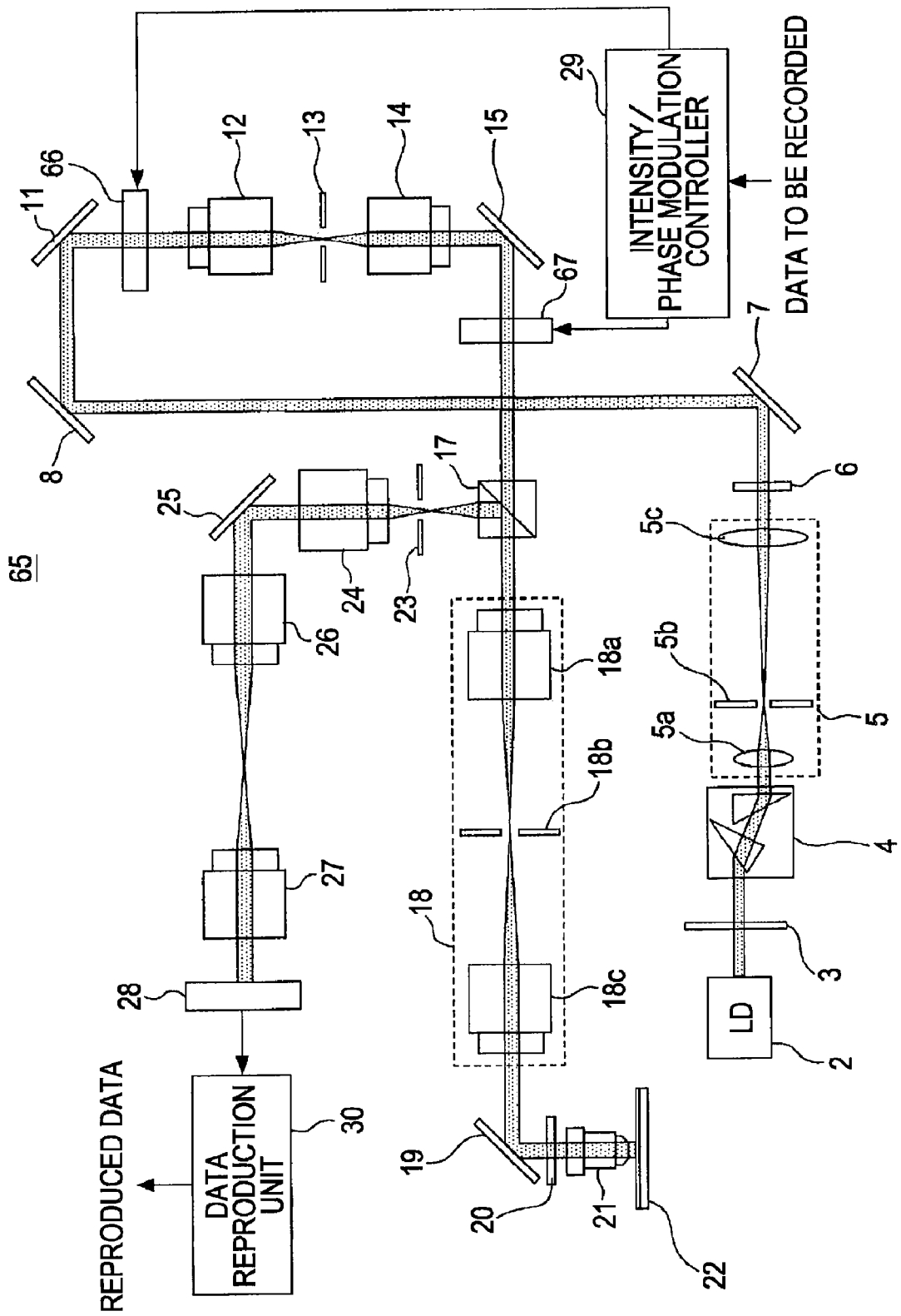
FIG. 27 is a block diagram illustrating an internal configuration of a recording/reproducing apparatus according to an embodiment.
Figure 29B:
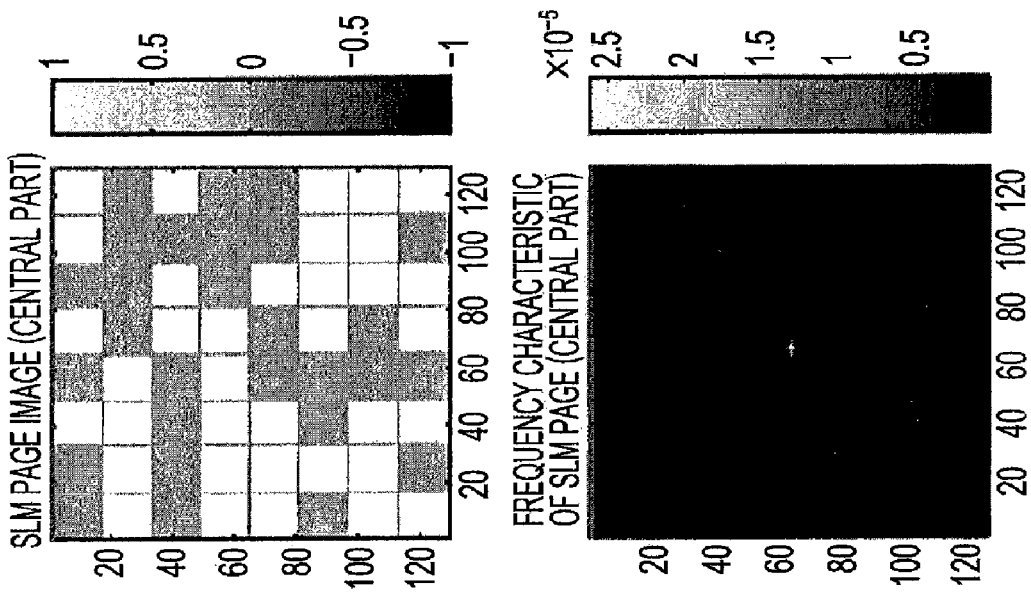
FIGS. 29A and 29B illustrate a SLM page image produced without using a phase mask and a frequency characteristic thereof.
Figure 29A:
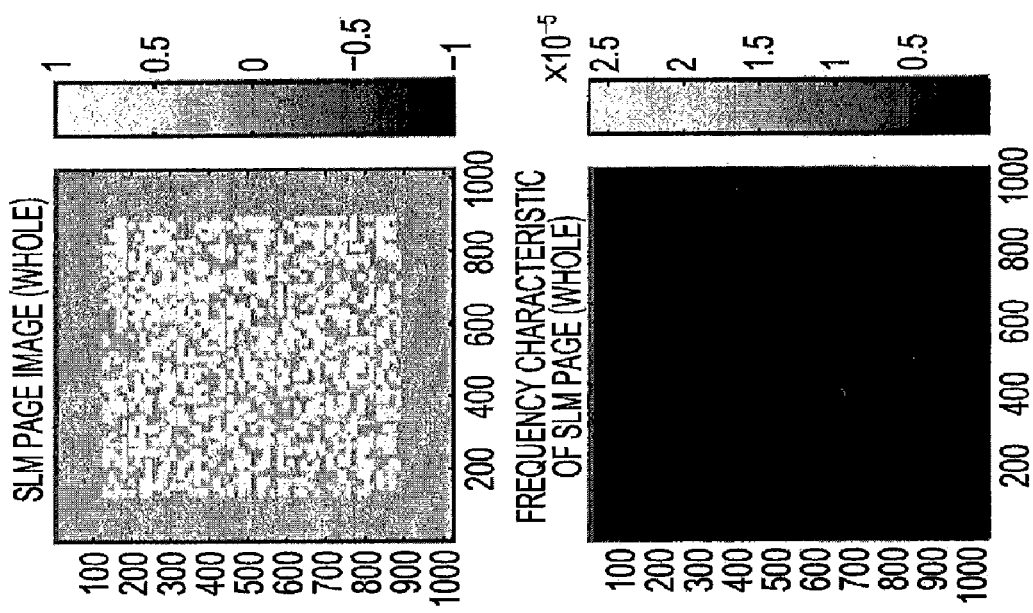
Figure 30B:
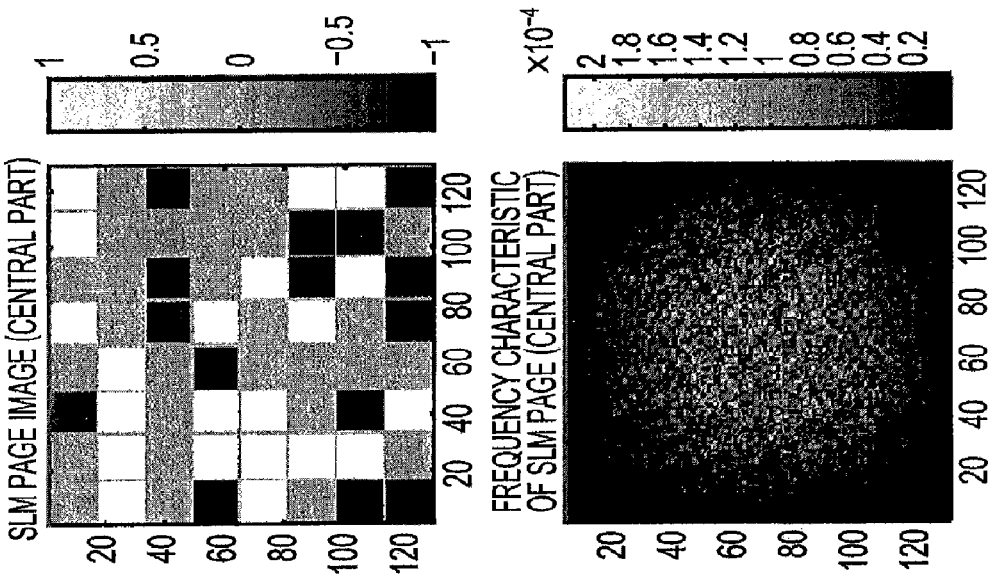
FIGS. 30A and 30B illustrate a SLM page image produced using a phase mask and a frequency characteristic thereof.
Figure 30A:
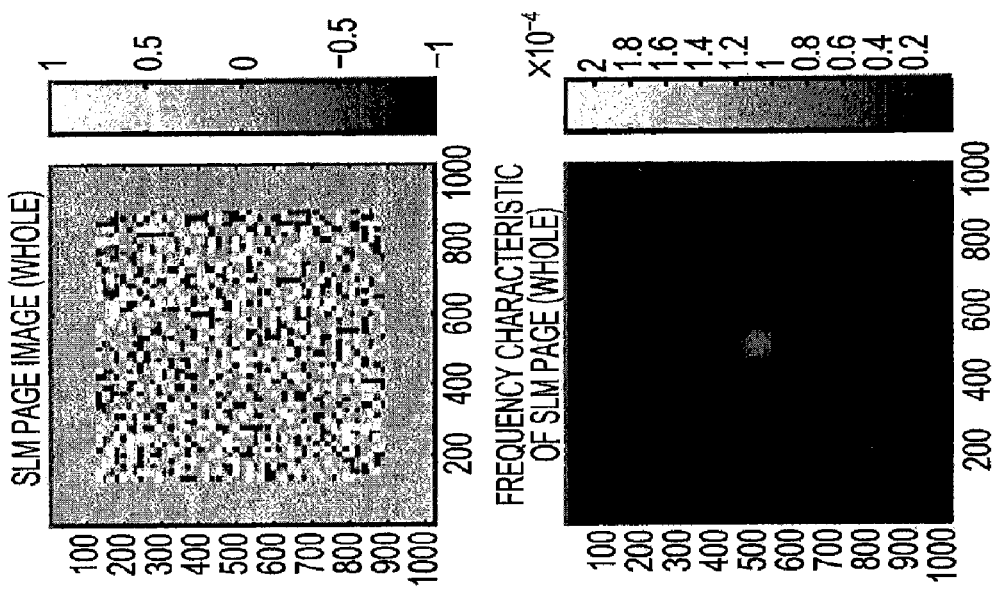
Figure 31:
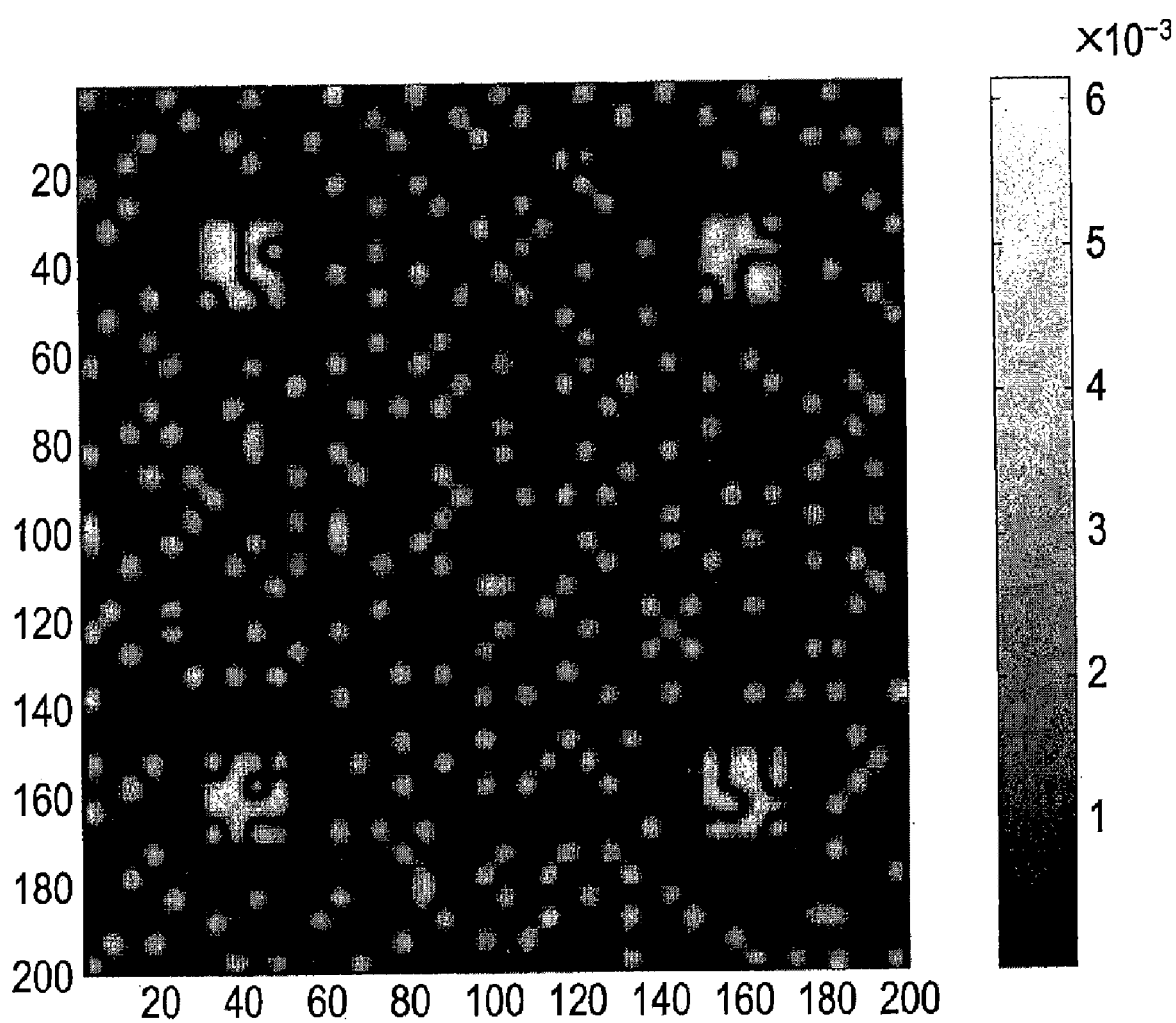
FIG. 31 illustrates nonlinearity in a hologram recording/reproducing system.

FIG. 27 illustrates an example of a recording/reproducing apparatus 65 including an intensity modulator and a phase modulator formed separately. In FIG. 27, similar parts to those in FIG. 1 are denoted by similar reference numerals, and a duplicated explanation thereof is omitted herein.

The recording/reproducing apparatus 65 does not include the mirror 9 and the aperture 10, which are disposed between the mirror 8 and the mirror 11 in the configuration shown in FIG. 1, but the recording/reproducing apparatus 65 is configured such that light reflected from the mirror 8 is directly reflected by the mirror 11 so as to transmit the light to the lens 12.

The recording/reproducing apparatus 65 includes a transmission-type intensity modulator 66 disposed between the mirror 11 and the lens 12. The transmission-type intensity modulator 66 may be implemented using a transmission-type liquid crystal panel as with the intensity modulator 16a.

A phase modulator 67 is disposed at a location corresponding to the spatial light modulator 16 in the apparatus shown in FIG. 1. The phase modulator 67 may also be implemented using a transmission-type liquid crystal panel as with the phase modulator 16b shown in FIG. 1.

In this configuration, the intensity/phase modulation controller 29 controls the intensity modulator 66 in a similar manner to the controlling of the intensity modulator 16a, and the intensity/phase modulation controller 29 controls the phase modulator 67 in a similar manner to the controlling of the phase modulator 16b.

Also in the case where the intensity modulator and the phase modulator are separately formed, it is required that an exact one-to-one pixel correspondence should be achieved between the intensity modulator and the phase modulator. That is, it is required that the intensity modulator and the phase modulator should be precisely positioned and optical magnification thereof should be precisely adjusted so that exact one-to-one pixel correspondence should be achieved between the intensity modulator and the phase modulator.

In the embodiments described above, by way of example, the intensity modulator is implemented using a liquid crystal panel capable of variably modulating the light intensity in accordance with the driving voltage applied thereto. For example, to produce additional coherent light with an intensity of "1.0", it is sufficient that the intensity modulator is capable of simply turning on/off the light. In such a case, for example, a DMD may be used as the intensity modulator.

Instead of using a transmission-type liquid crystal panel as the intensity modulator, a reflection-type liquid crystal panel may be used.

Instead of using a transmission-type liquid crystal panel as the phase modulator, other devices may be used as long as it is possible to variably control the phase by 0 to $\pi$ on a pixel-by-pixel basis in accordance with the driving voltage applied to each pixel.

In the embodiments described above, by way of example, the value corresponding to the added coherent light is removed by first calculating the square root of the output from the image sensor and then subtracting the value corresponding to the added coherent light from the calculated square root. Alternatively, instead of explicitly performing the subtraction, the component originating from the added coherent light may be removed using a DC-rejection filter or the like.

In the embodiments described above, by way of example, the bit value of each data pixel is determined (discriminated) from the amplitude finally detected for each data pixel via the resampling, by using the sort detection scheme. Alternatively, in a case where sparse coding is not performed, the bit value ("0" or "1") of each data pixel may be simply determined on the basis of the amplitude of each data pixel. The determination of the bit value of each data pixel may be performed in other many ways depending on the modulation/coding method used in the recording operation.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A reproducing apparatus adapted to reproduce data recorded in the form of an interference fringe produced as a result of interference between signal light and reference light on a holographic recording medium, comprising:
   reference light generation means for generating the reference light for illuminating the holographic recording medium to produce reproduced image corresponding to the data recorded on the holographic recording medium;
   coherent light generation means for generating coherent light having an intensity greater than the absolute value of a minimum amplitude of the reproduced image and having a phase equal to the phase of the reproduced image;
   an optical system adapted to transmit the reference light and the coherent light to the holographic recording medium;
   image signal acquisition means for sensing a reproduced image, which corresponds to the data recorded on the holographic recording medium and which is produced as a result of illuminating the holographic recording medium with the reference light and the coherent light via the optical system, and acquiring an image signal based on the reproduced image;
   square root calculation means for calculating the square root of each of values constituting the image signal acquired by the image signal acquisition means;
   removal means for removing the component of the coherent light from the square root, calculated by the square root calculation means, for each of values constituting the image signal; and
   data reproducing means for reproducing the data recorded on the holographic recording medium, on the basis of the image signal supplied from the removal means.

2. The reproducing apparatus according to claim 1, wherein the removal means is adapted to remove the component of the coherent light by subtracting a value corresponding to the intensity of the coherent light from the calculated square root of each of values constituting the image signal.

3. The reproducing apparatus according to claim 1, wherein the reference light generation means and the coherent light generation means are adapted to generate the reference light and the coherent light by modulating the intensity and the phase of common incident light by using a common spatial light modulator.

4. The reproducing apparatus according to claim 3, wherein the spatial light modulator includes a combination of an intensity modulator adapted to perform a spatial light intensity modulation on the incident light in units of pixels and a phase modulator adapted to perform a spatial phase modulation on the incident light in units of pixels.

5. The reproducing apparatus according to claim 3, wherein the spatial light modulator includes an intensity modulator adapted to perform a spatial light intensity modulation on the incident light in units of pixels and a phase modulator adapted to perform a spatial phase modulation on the incident light in units of pixels, the intensity modulator and the phase modulator being formed integrally.

6. The reproducing apparatus according to claim 3, wherein
   the spatial light modulator includes a combination of an intensity modulator adapted to perform a spatial light intensity modulation on the incident light in units of pixels and a phase modulator adapted to perform a spatial phase modulation on the incident light in units of pixels,
   the intensity modulator includes a liquid crystal panel adapted to change the intensity of incident light in accordance with a driving voltage level applied to each pixel, and
   the phase modulator includes a liquid crystal panel adapted to change the phase of incident light in accordance with a driving voltage level applied to each pixel.

7. The reproducing apparatus according to claim 6, wherein the liquid crystal panel serving as the phase modulator includes liquid crystal device elements corresponding to respective pixels, each liquid crystal device including liquid crystal molecules disposed in the liquid crystal device, each liquid crystal device having a thickness of d, the liquid crystal molecules having a refractive index of nh in a state in which the liquid crystal molecules are oriented horizontally and having a refractive index of nv in a state in which the liquid crystal molecules are oriented vertically, each liquid crystal device element being capable of changing the phase of light passing through the liquid crystal device element by an amount of $\Delta nd = nh \times d - nv \times d$, the thickness d of the liquid crystal device elements being set such that each liquid crystal device element is capable of variably controlling the phase of the incident light in accordance with the driving voltage level applied to each pixel.

8. A method of reproducing data recorded in the form of an interference fringe produced as a result of interference between signal light and reference light on a holographic recording medium, comprising the steps of:
   generating the reference light for illuminating the holographic recording medium to produce reproduced image corresponding to the data recorded on the holographic recording medium;

generating coherent light having an intensity greater than the absolute value of a minimum amplitude of the reproduced image and having a phase equal to the phase of the reproduced image;

sensing a reproduced image, which corresponds to the data recorded on the holographic recording medium and which is produced as a result of illuminating the holographic recording medium with the reference light and the coherent light, and acquiring an image signal based on the reproduced image;

calculating the square root of each of values constituting the image signal acquired in the image signal acquisition step;

removing the component of the coherent light from the square root, calculated in the square root calculation step, for each of values constituting the image signal; and reproducing the data recorded on the holographic recording medium, on the basis of the image signal obtained via the removal step.

9. A reproducing apparatus adapted to reproduce data recorded in the form of an interference fringe produced as a result of interference between signal light and reference light on a holographic recording medium, comprising:

a reference light generator adapted to generate the reference light for illuminating the holographic recording medium to produce reproduced image corresponding to the data recorded on the holographic recording medium;

a coherent light generator adapted to generate coherent light having an intensity greater than the absolute value of a minimum amplitude of the reproduced image and having a phase equal to the phase of the reproduced image;

an optical system adapted to transmit the reference light and the coherent light to the holographic recording medium;

an image signal acquisition unit adapted to sense a reproduced image, which corresponds to the data recorded on the holographic recording medium and which is produced as a result of illuminating the holographic recording medium with the reference light and the coherent light via the optical system, and acquire an image signal based on the reproduced image;

a square root calculation unit adapted to calculate the square root of each of values constituting the image signal acquired by the image signal acquisition unit;

a removal unit adapted to remove the component of the coherent light from the square root, calculated by the square root calculation unit, of each of values constituting the image signal; and a data reproducing unit adapted to reproduce the data recorded on the holographic recording medium, on the basis of the image signal supplied from the removal unit.

* * * * *